(12) United States Patent
Kent et al.

(10) Patent No.: US 11,693,623 B1
(45) Date of Patent: Jul. 4, 2023

(54) SINGLE-STAGE HARDWARE SORTING BLOCKS AND ASSOCIATED MULTIWAY MERGE SORTING NETWORKS

(71) Applicant: UNM Rainforest Innovations, Albuquerque, NM (US)

(72) Inventors: Robert Bernard Kent, Albuquerque, NM (US); Marios Stephanou Pattichis, Albuquerque, NM (US)

( * ) Notice: Subject to any disclaimer, the term of this patent is extended or adjusted under 35 U.S.C. 154(b) by 0 days.

(21) Appl. No.: 17/732,914

(22) Filed: Apr. 29, 2022

Related U.S. Application Data

(63) Continuation of application No. 17/190,843, filed on Mar. 3, 2021, now Pat. No. 11,360,740.

(60) Provisional application No. 62/984,880, filed on Mar. 4, 2020.

(51) Int. Cl.
*G06F 7/16* (2006.01)
*G06F 7/544* (2006.01)
*G06F 7/02* (2006.01)

(52) U.S. Cl.
CPC .............. *G06F 7/16* (2013.01); *G06F 7/026* (2013.01); *G06F 7/5443* (2013.01)

(58) Field of Classification Search
CPC ..... G06F 7/06; G06F 7/08; G06F 7/14; G06F 7/16; G06F 7/026; G06F 7/5443
USPC ........................................................ 708/446
See application file for complete search history.

(56) References Cited

U.S. PATENT DOCUMENTS

| | | | |
|---|---|---|---|
| 6,757,284 B1 * | 6/2004 | Galles ................... | H04L 49/552 370/394 |
| 9,928,261 B2 * | 3/2018 | Bordawekar ....... | G06F 12/0238 |
| 2017/0168827 A1 * | 6/2017 | Mishra ................ | G06F 9/30192 |
| 2020/0050640 A1 * | 2/2020 | Inoue ........................ | G06F 7/22 |

* cited by examiner

*Primary Examiner* — Tan V Mai
(74) *Attorney, Agent, or Firm* — Valauskas Corder LLC

(57) ABSTRACT

A system and methods for designing single-stage hardware sorting blocks, and further using the single-stage hardware sorting blocks to reduce the number of stages in multistage sorting processes, or to define multiway merge sorting networks.

13 Claims, 40 Drawing Sheets

```
module sort_9_values_8_bits

#( parameter  MAX_BIT_INDEX    =    7    )

( input  [ MAX_BIT_INDEX : 0 ]  In_8  ,
  input  [ MAX_BIT_INDEX : 0 ]  In_7  ,
  input  [ MAX_BIT_INDEX : 0 ]  In_6  ,
  input  [ MAX_BIT_INDEX : 0 ]  In_5  ,
  input  [ MAX_BIT_INDEX : 0 ]  In_4  ,
  input  [ MAX_BIT_INDEX : 0 ]  In_3  ,
  input  [ MAX_BIT_INDEX : 0 ]  In_2  ,
  input  [ MAX_BIT_INDEX : 0 ]  In_1  ,
  input  [ MAX_BIT_INDEX : 0 ]  In_0  , // the max value
  output [ MAX_BIT_INDEX : 0 ]  Out_8 ,
  output [ MAX_BIT_INDEX : 0 ]  Out_7 ,
  output [ MAX_BIT_INDEX : 0 ]  Out_6 ,
  output [ MAX_BIT_INDEX : 0 ]  Out_5 ,
  output [ MAX_BIT_INDEX : 0 ]  Out_4 ,
  output [ MAX_BIT_INDEX : 0 ]  Out_3 ,
  output [ MAX_BIT_INDEX : 0 ]  Out_2 ,
  output [ MAX_BIT_INDEX : 0 ]  Out_1 ,
  output [ MAX_BIT_INDEX : 0 ]  Out_0
  // the min value

```
// ~~~~~~~~~~~~~~~~~~~~~~~~~~~~~~~~~~~~~~~~~
// The comparison signals ; "ge" for ">=, greater than or equal"
// ~~~~~~~~~~~~~~~~~~~~~~~~~~~~~~~~~~~~~~~~~

// 36 comparisons for 9-sorter
wire    ge_8_7 = ( In_8 >= In_7 ) ;
wire    ge_8_6 = ( In_8 >= In_6 ) ;
wire    ge_8_5 = ( In_8 >= In_5 ) ;
wire    ge_8_4 = ( In_8 >= In_4 ) ;
wire    ge_8_3 = ( In_8 >= In_3 ) ;
wire    ge_8_2 = ( In_8 >= In_2 ) ;
wire    ge_8_1 = ( In_8 >= In_1 ) ;
wire    ge_8_0 = ( In_8 >= In_0 ) ;

// 28 comparisons for 8-sorter
wire    ge_7_6 = ( In_7 >= In_6 ) ;
wire    ge_7_5 = ( In_7 >= In_5 ) ;
wire    ge_7_4 = ( In_7 >= In_4 ) ;
wire    ge_7_3 = ( In_7 >= In_3 ) ;
wire    ge_7_2 = ( In_7 >= In_2 ) ;
wire    ge_7_1 = ( In_7 >= In_1 ) ;
wire    ge_7_0 = ( In_7 >= In_0 ) ;

// 21 comparisons for 7-sorter
wire    ge_6_5 = ( In_6 >= In_5 ) ;
wire    ge_6_4 = ( In_6 >= In_4 ) ;
wire    ge_6_3 = ( In_6 >= In_3 ) ;
wire    ge_6_2 = ( In_6 >= In_2 ) ;
wire    ge_6_1 = ( In_6 >= In_1 ) ;
wire    ge_6_0 = ( In_6 >= In_0 ) ;

// 15 comparisons for 6-sorter
wire    ge_5_4 = ( In_5 >= In_4 ) ;
wire    ge_5_3 = ( In_5 >= In_3 ) ;
wire    ge_5_2 = ( In_5 >= In_2 ) ;
wire    ge_5_1 = ( In_5 >= In_1 ) ;
wire    ge_5_0 = ( In_5 >= In_0 ) ;

// 10 comparisons for 5-sorter
wire    ge_4_3 = ( In_4 >= In_3 ) ;
wire    ge_4_2 = ( In_4 >= In_2 ) ;
wire    ge_4_1 = ( In_4 >= In_1 ) ;
wire    ge_4_0 = ( In_4 >= In_0 ) ;

// 6 comparisons for 4-sorter
wire    ge_3_2 = ( In_3 >= In_2 ) ;
wire    ge_3_1 = ( In_3 >= In_1 ) ;
wire    ge_3_0 = ( In_3 >= In_0 ) ;

// 3 comparisons for 3-sorter
wire    ge_2_1 = ( In_2 >= In_1 ) ;
wire    ge_2_0 = ( In_2 >= In_0 ) ;

// 1 comparison for 2-sorter
wire    ge_1_0 = ( In_1 >= In_0 ) ;
```

FIG. 5

```
assign  Out_2
    =
        ( In_8_goes_to_Out_2 ? In_8 :
        ( In_7_goes_to_Out_2 ? In_7 :
        ( In_6_goes_to_Out_2 ? In_6 :
        ( In_5_goes_to_Out_2 ? In_5 :
        ( In_4_goes_to_Out_2 ? In_4 :
        ( In_3_goes_to_Out_2 ? In_3 :
        ( In_2_goes_to_Out_2 ? In_2 :
        ( In_1_goes_to_Out_2 ? In_1 :  In_0 ) ) ) ) ) ) ) ) ;
```

FIG. 6

```
wire    In_5_goes_to_Out_5 = //  56 product terms
  (   ge_8_5  &&    ge_7_5  &&    ge_6_5  &&    ge_5_4  &&    ge_5_3  &&    ge_5_2  &&    ge_5_1  &&    ge_5_0  ) ||
  (   ge_8_5  &&    ge_7_5  && !  ge_6_5  &&    ge_5_4  &&    ge_5_3  &&    ge_5_2  &&    ge_5_1  && !  ge_5_0  ) ||
  (   ge_8_5  &&    ge_7_5  && !  ge_6_5  &&    ge_5_4  &&    ge_5_3  &&    ge_5_2  && !  ge_5_1  &&    ge_5_0  ) ||
  (   ge_8_5  &&    ge_7_5  && !  ge_6_5  &&    ge_5_4  &&    ge_5_3  && !  ge_5_2  &&    ge_5_1  &&    ge_5_0  ) ||
  (   ge_8_5  &&    ge_7_5  && !  ge_6_5  &&    ge_5_4  && !  ge_5_3  &&    ge_5_2  &&    ge_5_1  &&    ge_5_0  ) ||
  (   ge_8_5  &&    ge_7_5  && !  ge_6_5  && !  ge_5_4  &&    ge_5_3  &&    ge_5_2  &&    ge_5_1  &&    ge_5_0  ) ||

```verilog
module sort_3_values_8_bits

( parameter                             MAX_BIT_INDEX  =   7  )
  (
    input  [ MAX_BIT_INDEX : 0 ] In_2  ,
    input  [ MAX_BIT_INDEX : 0 ] In_1  ,
    input  [ MAX_BIT_INDEX : 0 ] In_0  , // the max value
    output [ MAX_BIT_INDEX : 0 ] Out_2 ,
    output [ MAX_BIT_INDEX : 0 ] Out_1 ,
    output [ MAX_BIT_INDEX : 0 ] Out_0
    // the min value
  ) ;
  // ~~~~~~~~~~~~~~~~~~~~~~~~~~~~~~~~~~~~~~~~~~~~~
  // The comparison signals
  // ~~~~~~~~~~~~~~~~~~~~~~~~~~~~~~~~~~~~~~~~~~~~~

// 3 comparisons for 3-sorter
  wire    ge_2_1 = ( In_2 >= In_1 ) ;
  wire    ge_2_0 = ( In_2 >= In_0 ) ;

// 1 comparison for 2-sorter
  wire    ge_1_0 = ( In_1 >= In_0 ) ;

// ~~~~~~~~~~~~~~~~~~~~~~~~~~~~~~~~~~~~~~~~~~~~~
  // In_X_goes_to_Out_Y multiplexer select line signals
  // ~~~~~~~~~~~~~~~~~~~~~~~~~~~~~~~~~~~~~~~~~~~~~ wire    In_2_goes_to_Out_2 =  (   ge_2_1 &&   ge_2_0 )       ;

wire    In_2_goes_to_Out_1 =  (   ge_2_1 && ! ge_2_0 ) ||
                                ( ! ge_2_1 &&   ge_2_0 )       ;

wire    In_2_goes_to_Out_0 =  ( ! ge_2_1 && ! ge_2_0 )       ;

// ~~~~~~~~~~~~~~~~~~~~~~~~~~~~~~~~~~~~~~~~~~~~~ wire    In_1_goes_to_Out_2 =  ( ! ge_2_1 &&   ge_1_0 )       ;

wire    In_1_goes_to_Out_1 =  (   ge_2_1 &&   ge_1_0 ) ||
                                ( ! ge_2_1 && ! ge_1_0 )       ;

wire    In_1_goes_to_Out_0 =  (   ge_2_1 && ! ge_1_0 )       ;

// ~~~~~~~~~~~~~~~~~~~~~~~~~~~~~~~~~~~~~~~~~~~~~
  // The output port multiplexer assignments
  // ~~~~~~~~~~~~~~~~~~~~~~~~~~~~~~~~~~~~~~~~~~~~~ assign  Out_2 =       ( In_2_goes_to_Out_2 ? In_2 :
                        ( In_1_goes_to_Out_2 ? In_1 : In_0 ) ) ;

assign  Out_1 =       ( In_2_goes_to_Out_1 ? In_2 :
                        ( In_1_goes_to_Out_1 ? In_1 : In_0 ) ) ;

assign  Out_0 =       ( In_2_goes_to_Out_0 ? In_2 :
                        ( In_1_goes_to_Out_0 ? In_1 : In_0 ) ) ;

endmodule // sort_3_values_8_bits
```

FIG. 9

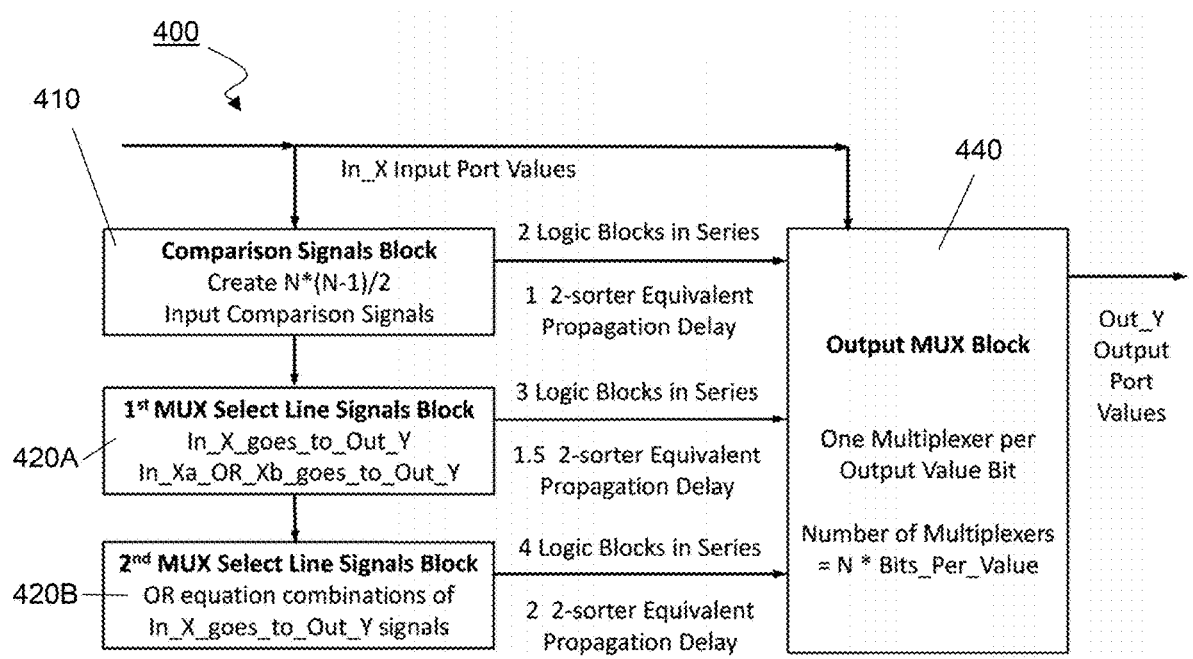

FIG. 10

| Row | Row Data | Prior Art 2- | 3- | 4- | 5- | 6- | 7- | 8- | 9- | 10- |
|---|---|---|---|---|---|---|---|---|---|---|
| | *General Hardware Sorter Embodiment* | | | | | | | | | |
| 1 | Data Inputs (and Outputs in a Full List Sorter) | 2 | 3 | 4 | 5 | 6 | 7 | 8 | 9 | 10 |
| 2 | Comparisons | 1 | 3 | 6 | 10 | 15 | 21 | 28 | 36 | 45 |
| 3 | Data Inputs + Comparisons | 3 | 6 | 10 | 15 | 21 | 28 | 36 | 45 | 55 |
| 4 | In_X_goes_to_Out_Y Select Inputs for Output Mux | 1 | 2 | 3 | 4 | 5 | 6 | 7 | 8 | 9 |
| 5 | Data Inputs + In_X_goes_to_Out_Y Select Inputs | 3 | 5 | 7 | 9 | 11 | 13 | 15 | 17 | 19 |
| 6 | Comparisons in In_X_goes_to_Out_Y Product Term | 1 | 2 | 3 | 4 | 5 | 6 | 7 | 8 | 9 |
| | *Hardware Sorter Embodiment Utilizing Design Block With Four or Eight 6-Input LUTs* | | | | | | | | | |
| 7 | 6-input LUTs per In_X_goes_to_Out_Y Product Term | 1 | 1 | 1 | 1 | 1 | 1 | 2 | 4 | 8 |
| 8 | Logic Block Stages in Series | 2 | 2 | 3 | 3 | 3 | 3 | 4 | 4 | 4 |
| 9 | Sorter Propagation Delay (2-sorter Equivalent) | 1 | 1 | 1.5 | 1.5 | 1.5 | 1.5 | 2 | 2 | 2 |
| 10 | Inputs Per Output Bit Multiplexer | 3 | 6 | 6 | 9 | 11 | 12 | 13 | 17 | 18 |
| 11 | LUTs Per Output Bit Mux (3* Effectively May Be 4) | 1 | 1 | 1 | 2 | 2 | 2 | 2 | 3* | 3* |

FIG. 11

| Full N-Sorter: N-to-N | 2-<br>2-sorter | 3-<br>3-sorter | 4-<br>4-sorter | 5-<br>5-sorter | 6-<br>6-sorter | 7-<br>7-sorter | 8-<br>8-sorter | 9-<br>9-sorter |
|---|---|---|---|---|---|---|---|---|
| Slice blocks in series | 2 | 2 | 3 | 3 | 3 | 3 | 4 | 4 |
| 2-sorter Propagation Delay | 1 | 1 | 1.5 | 1.5 | 1.5 | 1.5 | 2 | 2 |
| Physcial LUTs | 20 | 36 | 60 | 136 | 189 | 272 | 488 | 738 |
| 2-sorter LUT Resources | 1 | 1.8 | 3 | 6.8 | 9.45 | 13.6 | 24.4 | 36.9 |
| N-Max Filter: N-to-1 | 2-max | 3-max | 4-max | 5-max | 6-max | 7-max | 8-max | 9-max |
| Slice blocks in series | 2 | 2 | 2 | 2 | 3 | 3 | 3 | 4 |
| 2-sorter Propagation Delay | 1 | 1 | 1 | 1 | 1.5 | 1.5 | 1.5 | 2 |
| Physcial LUTs | 12 | 20 | 40 | 72 | 83 | 110 | 156 | 210 |
| 2-sorter LUT Resources | 0.6 | 1 | 2 | 3.6 | 4.15 | 5.5 | 7.8 | 10.5 |

The 9-median filter has the same propagation delay and hardware resource usage as the 9-max filter.

All LUT resource usage numbers assume that the data values are 8-bit unsigned numbers.

FIG. 12

```
// ~~~~~~~~~~~~~~~~~~~~~~~~~~~~~~~~~~~~~~~~~~~~~~~~~~~~~~~~~~~~~~~~~~~~~~~~~~
// 4-sorter general hardware design equation has 7 inputs ; won't fit in a 6-input LUT
//
// Combine three In_3* In_2* In_1* signals into two In_3_OR_In_2* In_3_OR_In_1* signals
// ~~~~~~~~~~~~~~~~~~~~~~~~~~~~~~~~~~~~~~~~~~~~~~~~~~~~~~~~~~~~~~~~~~~~~~~~~~
// assign  Out_2
//    =
//      ( In_3_goes_to_Out_2 ? In_3 :
//      ( In_2_goes_to_Out_2 ? In_2 :
//      ( In_1_goes_to_Out_2 ? In_1 : In_0 ) ) ) ;
// ~~~~~~~~~~~~~~~~~~~~~~~~~~~~~~~~~~~~~~~~~~~~~~~~~~~~~~~~~~~~~~~~~~~~~~~~~~
// General Hardware Design |            | 4-to-1 LUT Multiplexer Design
// *_goes_to_Out_2          |            |       *_goes_to_Out_2
//  In_3  In_2  In_1         | Out_2 |  In_3_OR_In_2   In_3_OR_In_1
// ~~~~~~~~~~~~~~~~~~~~~~~~~~~~~~~~~~~~~~~~~~~~~~~~~~~~~~~~~~~~~~~~~~~~~~~~~~
//   1      .     .           | In_3  |       1              1
//   .      1     .           | In_2  |       1              .
//   .      .     1           | In_1  |       .              1
//   .      .     .           | In_0  |       .              .
// ~~~~~~~~~~~~~~~~~~~~~~~~~~~~~~~~~~~~~~~~~~~~~~~~~~~~~~~~~~~~~~~~~~~~~~~~~~
// Periods, '.'s, replace 0's in the above truth tables
// ~~~~~~~~~~~~~~~~~~~~~~~~~~~~~~~~~~~~~~~~~~~~~~~~~~~~~~~~~~~~~~~~~~~~~~~~~~
// Code implementation for the 4-to-1 multiplexer, using 2 mux select lines
// ~~~~~~~~~~~~~~~~~~~~~~~~~~~~~~~~~~~~~ wire    In_3_OR_In_2_goes_to_Out_2
      =
      (   ge_3_2  &&    ge_3_1  && ! ge_3_0                                              ) ||   // In_3
      (   ge_3_2  && !  ge_3_1  &&   ge_3_0                                              ) ||
      ( ! ge_3_2  &&    ge_3_1  &&   ge_3_0                                              ) ||

(   ge_3_2  &&                                  ge_2_1  &&   ge_2_0                ) ||   // In_2
      ( ! ge_3_2  &&                                  ge_2_1  && ! ge_2_0                ) ||
      ( ! ge_3_2  &&                                ! ge_2_1  &&   ge_2_0                )  ;

wire    In_3_OR_In_1_goes_to_Out_2
      =
      (   ge_3_2  &&    ge_3_1  && ! ge_3_0                                              ) ||   // In_3
      (   ge_3_2  && !  ge_3_1  &&   ge_3_0                                              ) ||
      ( ! ge_3_2  &&    ge_3_1  &&   ge_3_0                                              ) ||

(                 ge_3_1  &&                  ! ge_2_1  &&                  ge_1_0 ) ||   // In_1
      (               ! ge_3_1  &&                    ge_2_1  &&                  ge_1_0 ) ||
      (               ! ge_3_1  &&                  ! ge_2_1  &&                ! ge_1_0 )  ;

// ~~~~~~~~~~~~~~~~~~~~~~~~~~~~~~~~~~~~ wire   [ 1 : 0 ]  mux_selects_Out_2

= { In_3_OR_In_2_goes_to_Out_2 , In_3_OR_In_1_goes_to_Out_2 } ;

// ~~~~~~~~~~~~~~~~~~~~~~~~~~~~~~~~~~~~ assign  Out_2 =
      ( mux_selects_Out_2 == 2'b11 ? In_3 :
      ( mux_selects_Out_2 == 2'b10 ? In_2 :
      ( mux_selects_Out_2 == 2'b01 ? In_1 : In_0  ) ) ) ;
```

FIG. 13

```
// ~~~~~~~~~~~~~~~~~~~~~~~~~~~~~
// 5-sorter general hardware design Out_2 equation has 9 inputs,
//   5 data inputs and 4 mux select line inputs
//
// Commented out below.
//
// Requires 2 LUTs, plus their common MUX, for each output bit multiplexer
// ~~~~~~~~~~~~~~~~~~~~~~~~~

// assign  Out_2
//   =
//        ( In_4_goes_to_Out_2 ? In_4 :
//        ( In_3_goes_to_Out_2 ? In_3 :
//        ( In_2_goes_to_Out_2 ? In_2 :
//        ( In_1_goes_to_Out_2 ? In_1 :  In_0  ) ) ) ) ;

// ~~~~~~~~~~~~~~~~~~~~~~~~~~~~~~~
// LUT_B assignment ; 3-to-1 multiplexer, as in a 3-sorter
// ~~~~~~~~~~~~~~~~~~~~~~~~~~~~~~~ wire [ MAX_BIT_INDEX : 0 ]   LUT_B_Out_2_data_from_In_2_OR_1_OR_0
      =
        ( In_2_goes_to_Out_2 ?  In_2 :
        ( In_1_goes_to_Out_2 ?  In_1 : In_0 ) ) ;

// ~~~~~~~~~~~~~~~~~~~~~~~~~~~~~~~
// LUT_A assignment ; 2-to-1 multiplexer, as in a 2-sorter
// ~~~~~~~~~~~~~~~~~~~~~~~~~~~~~~~ wire [ MAX_BIT_INDEX : 0 ]   LUT_A_Out_2_data_from_In_4_OR_3
      =
        ( In_4_goes_to_Out_2 ?  In_4 : In_3 )   ;

// ~~~~~~~~~~~~~~~~~~~~~~~~~~~~~~~
// MUXF7_AB assignment ; 2-to-1 bit multiplexers; Inputs are LUT_A and LUT_B outputs
// ~~~~~~~~~~~~~~~~~~~~~~~~~~~~~~~ genvar  bit_index ;

generate for ( bit_index =  0                        ;
            bit_index <= MAX_BIT_INDEX            ;
            bit_index =  bit_index + 1     ) begin MUXF7 muxf7_AB_Out_2_inst
        (
          .O( Out_2[                                bit_index ] ),  // 1-bit data  output
          .I0( LUT_B_Out_2_data_from_In_2_OR_1_OR_0[ bit_index ] ),  // 1-bit data  input
          .I1( LUT_A_Out_2_data_from_In_4_OR_3[      bit_index ] ),  // 1-bit data  input
          .S(                           In_4_OR_3_goes_to_Out_2   ) ); // 1-bit select input end endgenerate
```

FIG. 14

```
// ~~~~~~~~~~~~~~~~~~~~~~~~~~~~~~~
// 5-sorter In_4_OR_3_goes_to_Out_Y product terms have 7 separate comparison signals
//
// Can't fit in a single 6-input LUT
//
// Use 2 LUTs plus their common MUX to create a 7-input LUT
// ~~~~~~~~~~~~~~~~~~~~~~~~~~~~~~~

// wire    In_4_OR_3_goes_to_Out_2  =
//
//     (   ge_4_3  &&   ge_4_2  &&  ! ge_4_1  &&  ! ge_4_0                                          )  ||  //_4
//     (   ge_4_3  &&  ! ge_4_2  &&    ge_4_1  &&  ! ge_4_0                                          )  ||
//     (   ge_4_3  &&  ! ge_4_2  &&  ! ge_4_1  &&    ge_4_0                                          )  ||
//     ( ! ge_4_3  &&   ge_4_2  &&    ge_4_1  &&  ! ge_4_0                                          )  ||
//     ( ! ge_4_3  &&   ge_4_2  &&  ! ge_4_1  &&    ge_4_0                                          )  ||
//     ( ! ge_4_3  &&  ! ge_4_2  &&    ge_4_1  &&    ge_4_0                                          )  ||
//
//     (   ge_4_3  &&                                          ge_3_2  &&   ge_3_1  &&  ! ge_3_0  )  ||  //_3
//     (   ge_4_3  &&                                          ge_3_2  &&  ! ge_3_1  &&    ge_3_0  )  ||
//     (   ge_4_3  &&                                        ! ge_3_2  &&    ge_3_1  &&    ge_3_0  )  ||
//     ( ! ge_4_3  &&                                          ge_3_2  &&  ! ge_3_1  &&  ! ge_3_0  )  ||
//     ( ! ge_4_3  &&                                        ! ge_3_2  &&    ge_3_1  &&  ! ge_3_0  )  ||
//     ( ! ge_4_3  &&                                        ! ge_3_2  &&  ! ge_3_1  &&    ge_3_0  )      ;

// ~~~~~~~~~~~~~~~~~~~~~~~~~~~~~~~
// There are now a total of 6 separate comparison signals in the 2 LUT product terms
//
// Common signal ge_4_3 removed ; will become the 2-to-1 mux select signal
// ~~~~~~~~~~~~~~~~~~~~~~~~~~~~~~~ wire    LUT_A_ge_4_3_1_In_4_OR_3_goes_to_Out_2
     =
     (             ge_4_2  &&  ! ge_4_1  &&  ! ge_4_0                                          )  ||  //_4
     (           ! ge_4_2  &&    ge_4_1  &&  ! ge_4_0                                          )  ||
     (           ! ge_4_2  &&  ! ge_4_1  &&    ge_4_0                                          )  ||
     (                                          ge_3_2  &&    ge_3_1  &&  ! ge_3_0  )  ||  //_3
     (                                          ge_3_2  &&  ! ge_3_1  &&    ge_3_0  )  ||
     (                                        ! ge_3_2  &&    ge_3_1  &&    ge_3_0  )      ;

wire    LUT_B_ge_4_3_0_In_4_OR_3_goes_to_Out_2
     =
     (             ge_4_2  &&    ge_4_1  &&  ! ge_4_0                                          )  ||  //_4
     (             ge_4_2  &&  ! ge_4_1  &&    ge_4_0                                          )  ||
     (           ! ge_4_2  &&    ge_4_1  &&    ge_4_0                                          )  ||
     (                                          ge_3_2  &&  ! ge_3_1  &&  ! ge_3_0  )  ||  //_3
     (                                        ! ge_3_2  &&    ge_3_1  &&  ! ge_3_0  )  ||
     (                                        ! ge_3_2  &&  ! ge_3_1  &&    ge_3_0  )      ;

// ~~~~~~~~~~~~~~~~~~~~~~~~~~~~~~~
// 2-to-1 multiplexer to finally create In_4_OR_3_goes_to_Out_2 signal
// ~~~~~~~~~~~~~~~~~~~~~~~~~~~~~~~

MUXF7 muxf7_AB_Out_2_inst
     (
       .O(                      In_4_OR_3_goes_to_Out_2   ),   // 1-bit data  output
       .I0( LUT_B_ge_4_3_0_In_4_OR_3_goes_to_Out_2   ),   // 1-bit data  input
       .I1( LUT_A_ge_4_3_1_In_4_OR_3_goes_to_Out_2   ),   // 1-bit data  input
       .S(           ge_4_3                                           )  );  // 1-bit select input
```

FIG. 15

Each of these select line signals is created in the "2ⁿᵈ MUX Select Lines Block"

They are all 'OR' functions of several In_X_goes_to_Out_Y signals

The signals for all associated sorters propagate through 4 logic blocks

```
// ~~~~~~~~~~~~~~~~~~~~~~~~~~~~~~~~~~~~~~~~~~~~~~~~
// 6-sorter 2-to-1 Select line signal for MUXF7 in Output MUX Block
// ~~~~~~~~~~~~~~~~~~~~~~~~~~~~~~~~~~~~~~~~~~~~~~~~ wire    In_5_OR_4_OR_3_goes_to_Out_2
        =
        ( In_5_goes_to_Out_2  ||  In_4_goes_to_Out_2  ||  In_3_goes_to_Out_2 ) ;

// ~~~~~~~~~~~~~~~~~~~~~~~~~~~~~~~~~~~~~~~~~~~~~~~~
// 7-sorter 2-to-1 Select line signal for MUXF7 in Output MUX Block
// ~~~~~~~~~~~~~~~~~~~~~~~~~~~~~~~~~~~~~~~~~~~~~~~~ wire    In_6_OR_5_OR_4_goes_to_Out_2
        =
        ( In_6_goes_to_Out_2  ||  In_5_goes_to_Out_2  ||  In_4_goes_to_Out_2 ) ;

// ~~~~~~~~~~~~~~~~~~~~~~~~~~~~~~~~~~~~~~~~~~~~~~~~
// 8-sorter 2-to-1 Select line signal for MUXF7 in Output MUX Block
// ~~~~~~~~~~~~~~~~~~~~~~~~~~~~~~~~~~~~~~~~~~~~~~~~ wire    In_7_OR_6_OR_5_OR_4_goes_to_Out_2
        =
        ( In_7_goes_to_Out_2  ||  In_6_goes_to_Out_2  ||
          In_5_goes_to_Out_2  ||  In_4_goes_to_Out_2      ) ;

// ~~~~~~~~~~~~~~~~~~~~~~~~~~~~~~~~~~~~~~~~~~~~~~~~
// 9-sorter 2-to-1 Select line signal for MUXF7 in Output MUX Block
// ~~~~~~~~~~~~~~~~~~~~~~~~~~~~~~~~~~~~~~~~~~~~~~~~ wire    In_5_OR_4_OR_3_goes_to_Out_2
        =
        ( In_5_goes_to_Out_2  ||  In_4_goes_to_Out_2  ||  In_3_goes_to_Out_2 ) ;

// ~~~~~~~~~~~~~~~~~~~~~~~~~~~~~~~~~~~~~~~~~~~~~~~~
// 9-sorter 2-to-1 Select line signal for MUXF8 in Output MUX Block
// ~~~~~~~~~~~~~~~~~~~~~~~~~~~~~~~~~~~~~~~~~~~~~~~~ wire    In_8_OR_7_OR_6_goes_to_Out_2
        =
        ( In_8_goes_to_Out_2  ||  In_7_goes_to_Out_2  ||  In_6_goes_to_Out_2 ) ;
```

FIG. 16

```
wire   LUT_A_In_5_goes_to_Out_5_ge85_1_ge75_1 =

(     ge_6_5 &&    ge_5_4 &&    ge_5_3 &&    ge_5_2 &&    ge_5_1 &&    ge_5_0 ) ||
    ( !   ge_6_5 &&    ge_5_4 &&    ge_5_3 &&    ge_5_2 &&    ge_5_1 && !  ge_5_0 ) ||
    ( !   ge_6_5 &&    ge_5_4 &&    ge_5_3 &&    ge_5_2 && !  ge_5_1 &&    ge_5_0 ) ||
    ( !   ge_6_5 &&    ge_5_4 &&    ge_5_3 && !  ge_5_2 &&    ge_5_1 &&    ge_5_0 ) ||
    ( !   ge_6_5 &&    ge_5_4 && !  ge_5_3 &&    ge_5_2 &&    ge_5_1 &&    ge_5_0 ) ||
    ( !   ge_6_5 && !  ge_5_4 &&    ge_5_3 &&    ge_5_2 &&    ge_5_1 &&    ge_5_0 )  ;

wire   LUT_B_In_5_goes_to_Out_5_ge85_1_ge75_0 =

(     ge_6_5 &&    ge_5_4 &&    ge_5_3 &&    ge_5_2 &&    ge_5_1 && !  ge_5_0 ) ||
    (     ge_6_5 &&    ge_5_4 &&    ge_5_3 &&    ge_5_2 && !  ge_5_1 &&    ge_5_0 ) ||
    (     ge_6_5 &&    ge_5_4 &&    ge_5_3 && !  ge_5_2 &&    ge_5_1 &&    ge_5_0 ) ||
    (     ge_6_5 &&    ge_5_4 && !  ge_5_3 &&    ge_5_2 &&    ge_5_1 &&    ge_5_0 ) ||
    (     ge_6_5 && !  ge_5_4 &&    ge_5_3 &&    ge_5_2 &&    ge_5_1 &&    ge_5_0 ) ||
    ( !   ge_6_5 &&    ge_5_4 &&    ge_5_3 &&    ge_5_2 && !  ge_5_1 && !  ge_5_0 ) ||
    ( !   ge_6_5 &&    ge_5_4 &&    ge_5_3 && !  ge_5_2 &&    ge_5_1 && !  ge_5_0 ) ||
    ( !   ge_6_5 &&    ge_5_4 &&    ge_5_3 && !  ge_5_2 && !  ge_5_1 &&    ge_5_0 ) ||
    ( !   ge_6_5 &&    ge_5_4 && !  ge_5_3 &&    ge_5_2 &&    ge_5_1 && !  ge_5_0 ) ||
    ( !   ge_6_5 &&    ge_5_4 && !  ge_5_3 &&    ge_5_2 && !  ge_5_1 &&    ge_5_0 ) ||
    ( !   ge_6_5 &&    ge_5_4 && !  ge_5_3 && !  ge_5_2 &&    ge_5_1 &&    ge_5_0 ) ||
    ( !   ge_6_5 && !  ge_5_4 &&    ge_5_3 &&    ge_5_2 &&    ge_5_1 && !  ge_5_0 ) ||
    ( !   ge_6_5 && !  ge_5_4 &&    ge_5_3 &&    ge_5_2 && !  ge_5_1 &&    ge_5_0 ) ||
    ( !   ge_6_5 && !  ge_5_4 &&    ge_5_3 && !  ge_5_2 &&    ge_5_1 &&    ge_5_0 ) ||
    ( !   ge_6_5 && !  ge_5_4 && !  ge_5_3 &&    ge_5_2 &&    ge_5_1 &&    ge_5_0 )  ;

wire   LUT_C_In_5_goes_to_Out_5_ge85_0_ge75_1 =

(     ge_6_5 &&    ge_5_4 &&    ge_5_3 &&    ge_5_2 &&    ge_5_1 && !  ge_5_0 ) ||
    (     ge_6_5 &&    ge_5_4 &&    ge_5_3 &&    ge_5_2 && !  ge_5_1 &&    ge_5_0 ) ||
    (     ge_6_5 &&    ge_5_4 &&    ge_5_3 && !  ge_5_2 &&    ge_5_1 &&    ge_5_0 ) ||
    (     ge_6_5 &&    ge_5_4 && !  ge_5_3 &&    ge_5_2 &&    ge_5_1 &&    ge_5_0 ) ||
    (     ge_6_5 && !  ge_5_4 &&    ge_5_3 &&    ge_5_2 &&    ge_5_1 &&    ge_5_0 ) ||
    ( !   ge_6_5 &&    ge_5_4 &&    ge_5_3 &&    ge_5_2 && !  ge_5_1 && !  ge_5_0 ) ||
    ( !   ge_6_5 &&    ge_5_4 &&    ge_5_3 && !  ge_5_2 &&    ge_5_1 && !  ge_5_0 ) ||
    ( !   ge_6_5 &&    ge_5_4 &&    ge_5_3 && !  ge_5_2 && !  ge_5_1 &&    ge_5_0 ) ||
    ( !   ge_6_5 &&    ge_5_4 && !  ge_5_3 &&    ge_5_2 &&    ge_5_1 && !  ge_5_0 ) ||
    ( !   ge_6_5 &&    ge_5_4 && !  ge_5_3 &&    ge_5_2 && !  ge_5_1 &&    ge_5_0 ) ||
    ( !   ge_6_5 &&    ge_5_4 && !  ge_5_3 && !  ge_5_2 &&    ge_5_1 &&    ge_5_0 ) ||
    ( !   ge_6_5 && !  ge_5_4 &&    ge_5_3 &&    ge_5_2 &&    ge_5_1 && !  ge_5_0 ) ||
    ( !   ge_6_5 && !  ge_5_4 &&    ge_5_3 &&    ge_5_2 && !  ge_5_1 &&    ge_5_0 ) ||
    ( !   ge_6_5 && !  ge_5_4 &&    ge_5_3 && !  ge_5_2 &&    ge_5_1 &&    ge_5_0 ) ||
    ( !   ge_6_5 && !  ge_5_4 && !  ge_5_3 &&    ge_5_2 &&    ge_5_1 &&    ge_5_0 )  ;

wire   LUT_D_In_5_goes_to_Out_5_ge85_0_ge75_0 =

```
// ~~~~~~~~~~~~~~~~~~~~~~~~~~~~~~~~~~
// 2-to-1 mux ; two LUTs with ge_8_5 == 1 ; ge_7_5 is the mux select line
//
// behavioral equivalent:
//
// wire    MUX_AB_In_5_to_Out_5_ge_8_5_1 =
//      ( ge_7_5 ? LUT_A_In_5_goes_to_Out_5_ge_8_5_1_ge_7_5_1
//               : LUT_B_In_5_goes_to_Out_5_ge_8_5_1_ge_7_5_0  ) ;
// ~~~~~~~~~~~~~~~~~~~~~~~~~~~~~~~~~~ wire    MUX_AB_In_5_to_Out_5_ge_8_5_1 ;

MUXF7 muxf7_In_5_to_Out_5_ge_8_5_1_inst
(
 .O(    MUX_AB_In_5_to_Out_5_ge_8_5_1              ),   // 1-bit data  output
 .I0( LUT_B_In_5_goes_to_Out_5_ge_8_5_1_ge_7_5_0 ),     // 1-bit data  input
 .I1( LUT_A_In_5_goes_to_Out_5_ge_8_5_1_ge_7_5_1 ),     // 1-bit data  input
 .S(                                   ge_7_5    ) );  // 1-bit select input // ~~~~~~~~~~~~~~~~~~~~~~~~~~~~~~~~~~
// 2-to-1 mux ; two LUTs with ge_8_5 == 0 ; ge_7_5 is the mux select line
// ~~~~~~~~~~~~~~~~~~~~~~~~~~~~~~~~~~ wire    MUX_CD_In_5_to_Out_5_ge_8_5_0 ;

MUXF7 muxf7_In_5_to_Out_5_ge_8_5_0_inst
(
 .O(    MUX_CD_In_5_to_Out_5_ge_8_5_0              ),   // 1-bit data  output
 .I0( LUT_D_In_5_goes_to_Out_5_ge_8_5_0_ge_7_5_0 ),     // 1-bit data  input
 .I1( LUT_C_In_5_goes_to_Out_5_ge_8_5_0_ge_7_5_1 ),     // 1-bit data  input
 .S(                                   ge_7_5    ) );  // 1-bit select input // ~~~~~~~~~~~~~~~~~~~~~~~~~~~~~~~~~~
// 2-to-1 mux ; combine the outputs of the 2 muxes above
//              using ge_8_5 as the mux select line
// ~~~~~~~~~~~~~~~~~~~~~~~~~~~~~~~~~~ wire    In_5_to_Out_5 ;

MUXF8 muxf8_In_5_to_Out_5_inst
(
 .O(  In_5_to_Out_5                    ),   // 1-bit data  output
 .I0( MUX_CD_In_5_to_Out_5_ge_8_5_0 ),      // 1-bit data  input
 .I1( MUX_AB_In_5_to_Out_5_ge_8_5_1 ),      // 1-bit data  input
 .S(                       ge_8_5    ) );  // 1-bit select input
```

FIG. 18

```
// ~~~~~~~~~~~~~~~~~~~~~~~~~~~~~~~~~~~~~~~~~~~~~~~~
// 9-Sorter Out_2 Output Multiplexer LUTs: Behavioral Code
// ~~~~~~~~~~~~~~~~~~~~~~~~~~~~~~~~~~~~~~~~~~~~~~~~ wire   [ MAX_BIT_INDEX : 0 ]   LUT_8_Out_2_from_In_2_OR_1_OR_0
   =
     ( In_2_goes_to_Out_2  ?  In_2 :
     ( In_1_goes_to_Out_2  ?  In_1 : In_0 ) ) ;

wire   [ MAX_BIT_INDEX : 0 ]   LUT_A_Out_2_from_In_5_OR_4_OR_3
   =
     ( In_5_goes_to_Out_2  ?  In_5 :
     ( In_4_goes_to_Out_2  ?  In_4 : In_3 ) ) ;

wire   [ MAX_BIT_INDEX : 0 ]   LUT_C_Out_2_from_In_8_OR_7_OR_6
   =
     ( In_8_goes_to_Out_2  ?  In_8 :
     ( In_7_goes_to_Out_2  ?  In_7 : In_6 ) ) ;

// ~~~~~~~~~~~~~~~~~~~~~~~~~~~~~~~~~~~~~~~~~~~~~~~~
// 9-Sorter Out_2 Output Bit MUXF*s : Structural Code in a generate block
// ~~~~~~~~~~~~~~~~~~~~~~~~~~~~~~~~~~~~~~~~~~~~~~~~ wire   [ MAX_BIT_INDEX : 0 ]   MUX_AB_Out_2  ;
wire   [ MAX_BIT_INDEX : 0 ]   MUX_CD_Out_2  ;

genvar  bit_index ;

generate for ( bit_index =  0                       ;
        bit_index <= MAX_BIT_INDEX            ;
        bit_index =  bit_index + 1     ) begin MUXF7 muxf7_AB_Out_2_inst
       (
          .O( MUXF7_AB_Out_2 [                    bit_index ] ),  // 1-bit data  output
          .I0( LUT_8_Out_2_from_In_2_OR_1_OR_0[ bit_index ] ),    // 1-bit data  input
          .I1( LUT_A_Out_2_from_In_5_OR_4_OR_3[ bit_index ] ),    // 1-bit data  input
          .S(                   In_5_OR_4_OR_3_goes_to_Out_2 ) ); // 1-bit select input MUXF7 muxf7_CD_Out_2_inst
       (
          .O( MUXF7_CD_Out_2 [                    bit_index ] ),  // 1-bit data  output
          .I0( 1'b0                                         ),    // 1-bit data  input
          .I1( LUT_C_Out_2_from_In_8_OR_7_OR_6[ bit_index ] ),    // 1-bit data  input
          .S( 1'b1                                          ) ); // 1-bit select input MUXF8 muxf8_Out_2_inst
       (
          .O(                        Out_2[ bit_index ] ),   // 1-bit data  output
          .I0(              MUXF7_AB_Out_2[ bit_index ] ),   // 1-bit data  input
          .I1(              MUXF7_CD_Out_2[ bit_index ] ),   // 1-bit data  input
          .S( In_8_OR_7_OR_6_goes_to_Out_2               ) ); // 1-bit select input end // for ( bit_index = 0                      ;

endgenerate
```

FIG. 19

```verilog
// ~~~~~~~~~~~~~~~~~~~~~~~~~~~~~~~~
// The behavioral code for these 8 LUT equations needs no modification
// ~~~~~~~~~~~~~~~~~~~~~~~~~~~~~~~~ wire [ MAX_BIT_INDEX : 0 ]  LUT_A_Out_2_ge_3_2_ge_2_1_ge_1_0_111
        =                                                                          In_2              ;

wire [ MAX_BIT_INDEX : 0 ]  LUT_B_Out_2_ge_3_2_ge_2_1_ge_1_0_110
        =                           (    ge_2_0 ?  In_2 : ( ! ge_3_0 ?  In_3 : In_0 ) )              ;

wire [ MAX_BIT_INDEX : 0 ]  LUT_C_Out_2_ge_3_2_ge_2_1_ge_1_0_101
        =                           (    ge_3_1 ?  In_1 : (   ge_3_0 ?  In_3 : In_0 ) )              ;

wire [ MAX_BIT_INDEX : 0 ]  LUT_D_Out_2_ge_3_2_ge_2_1_ge_1_0_100
        =                           ( !  ge_3_1 ?  In_1 : ( ! ge_3_0 ?  In_3 : In_0 ) )              ;

wire [ MAX_BIT_INDEX : 0 ]  LUT_E_Out_2_ge_3_2_ge_2_1_ge_1_0_011
        =                           (    ge_3_1 ?  In_3 :                   In_1 )                   ;

wire [ MAX_BIT_INDEX : 0 ]  LUT_F_Out_2_ge_3_2_ge_2_1_ge_1_0_010
        =                           (    ge_3_0 ?  In_3 : ( ! ge_2_0 ?  In_2 : In_0 ) )              ;

wire [ MAX_BIT_INDEX : 0 ]  LUT_G_Out_2_ge_3_2_ge_2_1_ge_1_0_001
        =                           (    ge_2_0 ?  In_2 :                   In_0 )                   ;

wire [ MAX_BIT_INDEX : 0 ]  LUT_H_Out_2_ge_3_2_ge_2_1_ge_1_0_000
        =                                                                          In_1              ;

// ~~~~~~~~~~~~~~~~~~~~~~~~~~~~~~~~
// The behavioral code below needs to be replaced with separate wire declarations,
//    a generate block, and structural instantiations of MUXF7/8/9 primitives
// ~~~~~~~~~~~~~~~~~~~~~~~~~~~~~~~~ wire [ MAX_BIT_INDEX : 0 ]  MUXF7_AB_Out_2_ge_3_2_ge_2_1_11
        = (   ge_1_0 ?  LUT_A_Out_2_ge_3_2_ge_2_1_ge_1_0_111 : LUT_B_Out_2_ge_3_2_ge_2_1_ge_1_0_110 ) ;

wire [ MAX_BIT_INDEX : 0 ]  MUXF7_CD_Out_2_ge_3_2_ge_2_1_10
        = (   ge_1_0 ?  LUT_C_Out_2_ge_3_2_ge_2_1_ge_1_0_101 : LUT_D_Out_2_ge_3_2_ge_2_1_ge_1_0_100 ) ;

wire [ MAX_BIT_INDEX : 0 ]  MUXF7_EF_Out_2_ge_3_2_ge_2_1_01
        = (   ge_1_0 ?  LUT_E_Out_2_ge_3_2_ge_2_1_ge_1_0_011 : LUT_F_Out_2_ge_3_2_ge_2_1_ge_1_0_010 ) ;

wire [ MAX_BIT_INDEX : 0 ]  MUXF7_GH_Out_2_ge_3_2_ge_2_1_00
        = (   ge_1_0 ?  LUT_G_Out_2_ge_3_2_ge_2_1_ge_1_0_001 : LUT_H_Out_2_ge_3_2_ge_2_1_ge_1_0_000 ) ;

// ~~~~~~~~~~~~~~~~~~~~~~~~~~~~~~~~ wire [ MAX_BIT_INDEX : 0 ]  MUXF8_ABCD_Out_2_ge_3_2_1
        = (   ge_2_1 ?  MUXF7_AB_Out_2_ge_3_2_ge_2_1_11 : MUXF7_CD_Out_2_ge_3_2_ge_2_1_10 ) ;

wire [ MAX_BIT_INDEX : 0 ]  MUXF8_EFGH_Out_2_ge_3_2_0
        = (   ge_2_1 ?  MUXF7_EF_Out_2_ge_3_2_ge_2_1_01 : MUXF7_GH_Out_2_ge_3_2_ge_2_1_00 ) ;

// ~~~~~~~~~~~~~~~~~~~~~~~~~~~~~~~~ assign  Out_2                                                         //  MUXF9_ALL_Out_2
        = (   ge_3_2 ?  MUXF8_ABCD_Out_2_ge_3_2_1 : MUXF8_EFGH_Out_2_ge_3_2_0 ) ;
```

FIG. 20

```
// <<<<<<<<<<<<<<<<<<<<<<<<<<<<<<<<<<<<<<<<<<<<<<<<<<<<<<<<<<<<<<<
// SV Pseudocode ; From previous examples, one skilled in the art can implement
//   -- "wire" declarations as needed
//   -- "assign" statements as needed
//   -- a generate block as needed
//   -- MUXF* structural instantiations as needed
// <<<<<<<<<<<<<<<<<<<<<<<<<<<<<<<<<<<<<<<<<<<<<<<<<<<<<<<<<<<<<<<
// 4-max
// ~~~~~~~~~~~~~~~~~~~~~~~~~~~~~~~~~~~
// In_X_goes_to_Out_Y and ge* signals always have a bit width of 1
// ~~~~~~~~~~~~~~~~~~~~~~~~~~~~~~

// In_3_goes_to_Out_3 = (   ge_3_2  &&   ge_3_1  &&   ge_3_0                                                       ) ;
// In_2_goes_to_Out_3 = ( ! ge_3_2  &&                            ge_2_1  &&   ge_2_0                              ) ;
// In_1_goes_to_Out_3 = (              ! ge_3_1  &&             ! ge_2_1  &&                           ge_1_0      ) ;
// In_0_goes_to_Out_3 = (                              ! ge_3_0  &&                   ! ge_2_0  && ! ge_1_0        ) ;

// These bit output multiplexer signals all have a bit width of ( MAX_BIT_INDEX + 1 )

LUT_A_Out_3_ge_3_2_1 = ( { ge_3_1, ge_3_0 } == 2'b11 ? In_3 : ( ge_1_0 ? In_1 : In_0 ) ) ;
LUT_B_Out_3_ge_3_2_0 = ( { ge_2_1, ge_2_0 } == 2'b11 ? In_2 : ( ge_1_0 ? In_1 : In_0 ) ) ;

Out_3 = ( ge_3_2 ? LUT_A_Out_3_ge_3_2_1 : LUT_B_Out_3_ge_3_2_0 ) ;  // MUXF7_AB_Out_3

// <<<<<<<<<<<<<<<<<<<<<<<<<<<<<<<<<<<<<<<<<<<<<<<<<<<<<<<<<<<<<<<
// The max In_X_goes_to_Out_3 signals and states can be put into the following diagram:
// "Compact Table"
// For readability, a '0' state is shown as an '@' state
// ~~~~~~~~~~~~~~~~~~~~~~~~~~~~~~~~~~~
//
//            g g g   g g   g
//            e e e   e e   e
//            _ _ _   _ _   _
//            3 3 3   2 2   1
//            _ _ _   _ _   _
//            2 1 0   1 0   0
//           ---------------
// In_3 :     1 1 1
// In_2 :     @       1 1
// In_1 :       @       @   1
// In_0 :         @       @   @
//           ---------------
//
// <<<<<<<<<<<<<<<<<<<<<<<<<<<<<<<<<<<<<<<<<<<<<<<<<<<<<<<<<<<<<<<
// 4-min
// ~~~~~~~~~~~~~~~~~~~~~~~~~~~~~~~~~~~
// In_X_goes_to_Out_Y and ge* signals always have a bit width of 1
// ~~~~~~~~~~~~~~~~~~~~~~~~~~~~~~

// In_3_goes_to_Out_0 = ( ! ge_3_2  && ! ge_3_1  && ! ge_3_0                                                       ) ;
// In_2_goes_to_Out_0 = (   ge_3_2  &&                          ! ge_2_1  && ! ge_2_0                              ) ;
// In_1_goes_to_Out_0 = (                ge_3_1  &&               ge_2_1  &&                         ! ge_1_0      ) ;
// In_0_goes_to_Out_0 = (                                ge_3_0  &&                     ge_2_0  &&   ge_1_0        ) ;

// These bit output multiplexer signals all have a bit width of ( MAX_BIT_INDEX + 1 )

LUT_A_Out_0_ge_3_2_0 = ( { ge_3_1, ge_3_0 } == 2'b00 ? In_3 : ( ! ge_1_0 ? In_1 : In_0 ) ) ;
LUT_B_Out_0_ge_3_2_1 = ( { ge_2_1, ge_2_0 } == 2'b00 ? In_2 : ( ! ge_1_0 ? In_1 : In_0 ) ) ;

Out_0 = ( ge_3_2 ? LUT_B_Out_0_ge_3_2_1 : LUT_A_Out_0_ge_3_2_0 ) ;  // MUXF7_AB_Out_0
```

FIG. 21

```
// <<<<<<<<<<<<<<<<<<<<<<<<<<<<<<<<<<<<<<<<<<<<<<<<<<<<<<<<<<<
// SV Pseudocode ; From previous examples, one skilled in the art can implement
//   -- "wire" declarations as needed
//   -- "assign" statements as needed
//   -- a generate block as needed
//   -- MUXF* structural instantiations as neewded
// <<<<<<<<<<<<<<<<<<<<<<<<<<<<<<<<<<<<<<<<<<<<<<<<<<<<<<<<<<<
// 5-max
// ~~~~~~~~~~~~~~~~~~~~~~~~~~~~~~~~~~~~
// For readability, a '0' state is shown as an '@' state in the following table
//
// ge_4_3 will be the MUXF8 select line signal
//
// ge_2_1 will be the select line signal for the two MUXF7s
// ~~~~~~~~~~~~~~~~~~~~~~~~~~~~~~~~~~~~
//
//           g g g g   g g g   g g   g
//           e e e e   e e e   e e   e
//           _ _ _ _   _ _ _   _ _   _
//           4 4 4 4   3 3 3   2 2   1
//           _ _ _ _   _ _ _   _ _   _
//           3 2 1 0   2 1 0   1 0   0
//           ---------------------------
// In_4 :    1 1 1 1
// In_3 :    @         1 1 1
// In_2 :      @         @     1 1
// In_1 :        @         @     @   1
// In_0 :          @         @     @   @
//           ---------------------------
//
//
// ~~~~~~~~~~~~~~~~~~~~~~~~~~~~~~~~~~~~

LUT_A_Out_4_ge_4_3_ge_2_1_11 = ( { ge_4_2, ge_4_0 } == 2'b11 ? In_4 : ( ge_2_0 ? In_2 : In_0 ) ) ;

LUT_B_Out_4_ge_4_3_ge_2_1_10 = ( { ge_4_1, ge_4_0 } == 2'b11 ? In_4 : ( ge_1_0 ? In_1 : In_0 ) ) ;

// ~~~~~~~~~~~~~~~~~~~~~~~~~~~~~~~~~~~~

LUT_C_Out_4_ge_4_3_ge_2_1_01 = ( { ge_3_2, ge_3_0 } == 2'b11 ? In_3 : ( ge_2_0 ? In_2 : In_0 ) ) ;

LUT_D_Out_4_ge_4_3_ge_2_1_00 = ( { ge_3_1, ge_3_0 } == 2'b11 ? In_3 : ( ge_1_0 ? In_1 : In_0 ) ) ;

// ~~~~~~~~~~~~~~~~~~~~~~~~~~~~~~~~~~~~

MUXF7_AB_Out_4_ge_4_3_1  = ( ge_2_1 ? LUT_A_Out_4_ge_4_3_ge_2_1_11 : LUT_B_Out_4_ge_4_3_ge_2_1_10 ) ;

MUXF7_CD_Out_4_ge_4_3_0  = ( ge_2_1 ? LUT_C_Out_4_ge_4_3_ge_2_1_01 : LUT_D_Out_4_ge_4_3_ge_2_1_00 ) ;

// ~~~~~~~~~~~~~~~~~~~~~~~~~~~~~~~~~~~~

MUXF8_ABCD_Out_4         = ( ge_4_3 ? MUXF7_AB_Out_4_ge_4_3_1    : MUXF7_CD_Out_4_ge_4_3_0    ) ;

Out_4 = MUXF8_ABCD_Out_4 ;
```

FIG. 22

```
// <<<<<<<<<<<<<<<<<<<<<<<<<<<<<<<<<<<<<<<<<<<<<<<<<<<<<<<<
// SV Pseudocode: No "wire", "assign", "generate" statements, or MUXF* instantiations
// <<<<<<<<<<<<<<<<<<<<<<<<<<<<<<<<<<<<<<<<<<<<<<<<<<<<<<<<
// 8-max
// ~~~~~~~~~~~~~~~~~~~~~~~~~~~~~~~~~~~~~~~~~~~~~~~~~~~~~~~~
//
//           g g g g g g g   g g g g g g   g g g g g   g g g g   g g g   g g   g
//           e e e e e e e   e e e e e e   e e e e e   e e e e   e e e   e e   e
//           - - - - - - -   - - - - - -   - - - - -   - - - -   - - -   - -   -
//           7 7 7 7 7 7 7   6 6 6 6 6 6   5 5 5 5 5   4 4 4 4   3 3 3   2 2   1
//           - - - - - - -   - - - - - -   - - - - -   - - - -   - - -   - -   -
//           6 5 4 3 2 1 0   5 4 3 2 1 0   4 3 2 1 0   3 2 1 0   2 1 0   1 0   0
//           ~~~~~~~~~~~~~~~~~~~~~~~~~~~~~~~~~~~~~~~~~~~~~~~~~~~~~~~~~~~~~~~~~~
// In_7 :    1 1 1 1 1 1 1
// In_6 :    @               1 1 1 1 1 1
// In_5 :      @               @           1 1 1 1 1
// In_4 :        @               @           @         1 1 1 1
// In_3 :          @               @           @         @       1 1 1
// In_2 :            @               @           @         @       @     1 1
// In_1 :              @               @           @         @       @     @   1
// In_0 :                @               @           @         @       @     @   @
//           ~~~~~~~~~~~~~~~~~~~~~~~~~~~~~~~~~~~~~~~~~~~~~~~~~~~~~~~~~~~~~~~~~~
//
// ~~~~~~~~~~~~~~~~~~~~~~~~~~~~~~~~~~~~~~~~~~~~~~~~~~~
// In_*_goes_to_Out_7 signals have a bit width of 1
// ~~~~~~~~~~~~~~~~~~~~~~~~~~~~~~~~~~~~~~~~~~~~~~~~~~~
//
//   In_5_goes_to_Out_7
//   In_7_goes_to_Out_7
//
// OR's of 2 In_X_goes_to_Out_7 signals:
//
//   In_3_OR_2_goes_to_Out_7 -- left  bit in mux_selects_Out_7_LUT_B
//   In_3_OR_1_goes_to_Out_7 -- right bit in mux_selects_Out_7_LUT_B
//   In_5_OR_4_goes_to_Out_7 -- select line for MUXF7_AB_Out_7
//   In_7_OR_6_goes_to_Out_7 -- select line for MUXF8_ABCD_Out_7
//
// ~~~~~~~~~~~~~~~~~~~~~~~~~~~~~~~~~~~~~~~~~~~~~~~~~~~~~~~~~
// Output MUX Blocks signals with bit width == ( MAX_BIT_INDEX + 1 )
// ~~~~~~~~~~~~~~~~~~~~~~~~~~~~~~~~~~~~~~~~~~~~~~~~~~~~~~~~~

LUT_B_Out_7
    = ( mux_selects_Out_7_LUT_B == 2'b11 ? In_3 :
      ( mux_selects_Out_7_LUT_B == 2'b10 ? In_2 :
      ( mux_selects_Out_7_LUT_B == 2'b01 ? In_1 : In_0 ) ) ) ;

LUT_A_Out_7 = ( In_5_goes_to_Out_7 ? In_5 : In_4 ) ;

MUXF7_AB_Out_7
    = ( In_5_OR_4_goes_to_Out_7 ? LUT_A_Out_7 : LUT_B_Out_7 ) ;

// ~~~~~~~~~~~~~~~~~~~~~~~~~~~~~~~~~~~~~~~~~~~~~~~~~~

LUT_C_Out_7 = ( In_7_goes_to_Out_7 ? In_7 : In_6 ) ;

MUXF7_CD_Out_7
    = ( 1'b1 ? LUT_C_Out_7 : 1'b0 ) ;

// ~~~~~~~~~~~~~~~~~~~~~~~~~~~~~~~~~~~~~~~~~~~~~~~~~~

Out_7                                                    // MUXF8_ABCD_Out_7
    = ( In_7_OR_6_goes_to_Out_7 ? MUXF7_CD_Out_7 : MUXF7_AB_Out_7 ) ;
```

FIG. 23

| Row | 3 | 2 | 1 | 0 |
|---|---|---|---|---|
| 7 | --- | 32 | 31 | 30 | 29 |
| 6 | --- | 28 | 27 | 26 | 25 |
| 5 | --- | 24 | 23 | 22 | 21 |
| 4 | --- | 20 | 19 | 18 | 17 |
| 3 | --- | 16 | 15 | 14 | 13 |
| 2 | --- | 12 | 11 | 10 | 9 |
| 1 | --- | 8 | 7 | 6 | 5 |
| 0 | --- | 4 | 3 | 2 | 1 |

Ncols = 4
q is the sequence number
$Nrows_q$ = 8
$N_q$ = Ncols * $Nrows_q$ = 32
Top row = ( $Nrows_q$ -1 )
Bottom row = 0
Left column = ( Ncols-1 )
Right column = 0

FIG. 25

| Symbol | Definition |
|---|---|
| | *Equation (1) Parameter Definitions* |
| $N_{final}$ | The total number of values to be sorted in the full UCMS network |
| | The length of the unsorted input list and the sorted output list |
| Ncols | The number of sorted lists to be merged in each UCMS merge sequence |
| | The number of columns in a UCMS rectangle |
| $Nrows_0$ | The number of rows in the Sequence 0 2-D array; $2 \leq Nrows_0 \leq Ncols$ |
| | Each column of the Sequence 0 2-D array is sorted by an $Nrows_0$-sorter |
| $q_{final}$ | $q_{final} \geq 1$; The number of the merge sort sequences in the network |
| | Sequence $q_{final}$ is the last sequence in the sorting network |
| | *Rectangle Definitions, q ≥ 1 ; See the figure immediately above* |
| $N_q$ | The number of values in a Sequence q rectangle |
| $Nrows_q$ | The number of rows in a Sequence q rectangle |
| $Num\_rectangles_q$ | The number of rectangles in Sequence q |
| | *Time and Resource Units for Sorter and Network Normalization* |
| 2-sorter Equivalent Time | Propagation delay of one 2-sorter, or of a stage with only 2-sorters |
| 2-sorter Equivalent Rsrc | Resources used for a 2-sorter in a particular hardware type |
| O-EMS | Odd-Even Merge Sort |
| UCMS | Unified Column Merge Sort, this sorting network system |

FIG. 26

The original list of 32 unsorted values for the 4-column UCMS example is 11 18 30 29 2 5 31 32 10 12 16 19 1 9 23 20 24 27 3 4 7 13 22 14 21 25 17 15 26 28 8 6

Sequence 0: Unsorted List of 32 Into 16 Sorted Pairs

| Row | 16 | 15 | 14 | 13 | 12 | 11 | 10 | 9 | 8 | 7 | 6 | 5 | 4 | 3 | 2 | 1 |
|-----|----|----|----|----|----|----|----|----|----|----|----|----|----|----|----|----|
| 1 | -- | 11 | 30 | 2 | 31 | 10 | 16 | 1 | 23 | 24 | 3 | 7 | 22 | 21 | 17 | 26 | 8 |
| 0 | -- | 18 | 29 | 5 | 32 | 12 | 19 | 9 | 20 | 27 | 4 | 13 | 14 | 25 | 15 | 28 | 6 |

Paired But Not Yet Sorted

| Row | 16 | 15 | 14 | 13 | 12 | 11 | 10 | 9 | 8 | 7 | 6 | 5 | 4 | 3 | 2 | 1 |
|-----|----|----|----|----|----|----|----|----|----|----|----|----|----|----|----|----|
| 1 | -- | 18 | 30 | 5 | 32 | 12 | 19 | 9 | 23 | 27 | 4 | 13 | 22 | 25 | 17 | 28 | 8 |
| 0 | -- | 11 | 29 | 2 | 31 | 10 | 16 | 1 | 20 | 24 | 3 | 7 | 14 | 21 | 15 | 26 | 6 |

Paired And Sorted

Sequence 0, Stage 1 : Unsorted List of 32 Broken Into 16 Pairs ; Pairs Then Sorted

FIG. 27

Sequence 1: Four 2 Rows x 4 Columns Rectangles
Merge Sort Stage Flow is From Top to Bottom in Each Rectangle Column
R/C : Row/Col Deltas Between Successive Diag Selections

| Row | 3 | 2 | 1 | 0 |   | Row | 3 | 2 | 1 | 0 |   | Row | 3 | 2 | 1 | 0 |   | Row | 3 | 2 | 1 | 0 |
|---|---|---|---|---|---|---|---|---|---|---|---|---|---|---|---|---|---|---|---|---|---|---|
| 1 | -- | 18←30←5←32 | | | | 1 | -- | 12←19←9←23 | | | | 1 | -- | 27←4←13←22 | | | | 1 | -- | 25←17←28←8 | | |
| 0 | -- | 11←29←2←31 | | | | 0 | -- | 10←16←1←20 | | | | 0 | -- | 24←3←7←14 | | | | 0 | -- | 21←15←26←6 | | |

Sequence 1, Stage 1 : Build Four 2x4 Rectangles and Sort All Rows

| Row | 3 | 2 | 1 | 0 |   | Row | 3 | 2 | 1 | 0 |   | Row | 3 | 2 | 1 | 0 |   | Row | 3 | 2 | 1 | 0 |
|---|---|---|---|---|---|---|---|---|---|---|---|---|---|---|---|---|---|---|---|---|---|---|
| 1 | -- | 32 | 30 | 18 | 5 | 1 | -- | 23 | 19 | 12 | 9 | 1 | -- | 27 | 22 | 13 | 4 | 1 | -- | 28 | 25 | 17 | 8 |
| 0 | -- | 31 | 29 | 11 | 2 | 0 | -- | 20 | 16 | 10 | 1 | 0 | -- | 24 | 14 | 7 | 3 | 0 | -- | 26 | 21 | 15 | 6 |

Sequence 1, Stage 2 : 1/1 Row/Column Diagonal Sort

| Row | 3 | 2 | 1 | 0 |   | Row | 3 | 2 | 1 | 0 |   | Row | 3 | 2 | 1 | 0 |   | Row | 3 | 2 | 1 | 0 |
|---|---|---|---|---|---|---|---|---|---|---|---|---|---|---|---|---|---|---|---|---|---|---|
| 1 | -- | 32 | 31 | 29 | 11 | 1 | -- | 23 | 20 | 16 | 10 | 1 | -- | 27 | 24 | 14 | 7 | 1 | -- | 28 | 26 | 21 | 15 |
| 0 | -- | 30 | 18 | 5 | 2 | 0 | -- | 19 | 12 | 9 | 1 | 0 | -- | 22 | 13 | 4 | 3 | 0 | -- | 25 | 17 | 8 | 6 |

Sequence 1, Stage 3 : 1/2 Row/Column Diagonal Sort

| Row | 3 | 2 | 1 | 0 |   | Row | 3 | 2 | 1 | 0 |   | Row | 3 | 2 | 1 | 0 |   | Row | 3 | 2 | 1 | 0 |
|---|---|---|---|---|---|---|---|---|---|---|---|---|---|---|---|---|---|---|---|---|---|---|
| 1 | -- | 32 | 31 | 30 | 18 | 1 | -- | 23 | 20 | 19 | 12 | 1 | -- | 27 | 24 | 22 | 13 | 1 | -- | 28 | 26 | 25 | 17 |
| 0 | -- | 29 | 11 | 5 | 2 | 0 | -- | 16 | 10 | 9 | 1 | 0 | -- | 14 | 7 | 4 | 3 | 0 | -- | 21 | 15 | 8 | 6 |

Sequence 1, Stage 4 : 1/3 R/C Diagonal Sort ; No "IntRow" Sort Since There Are No Internal Rows

| Row | 3 | 2 | 1 | 0 |   | Row | 3 | 2 | 1 | 0 |   | Row | 3 | 2 | 1 | 0 |   | Row | 3 | 2 | 1 | 0 |
|---|---|---|---|---|---|---|---|---|---|---|---|---|---|---|---|---|---|---|---|---|---|---|
| 1 | -- | 32 | 31 | 30 | 29 | 1 | -- | 23 | 20 | 19 | 16 | 1 | -- | 27 | 24 | 22 | 14 | 1 | -- | 28 | 26 | 25 | 21 |
| 0 | -- | 18 | 11 | 5 | 2 | 0 | -- | 12 | 10 | 9 | 1 | 0 | -- | 13 | 7 | 4 | 3 | 0 | -- | 17 | 15 | 8 | 6 |

Sequence 1 Complete: Each of the Four 2x4 Rectangles is Now Sorted

FIG. 28

Sequence 2: Merge Sort Final Rectangle – 8 Rows x 4 Columns
Stage Flow is Left to Right, Starting in Top Rectangle Row

| Row | 3 | 2 | 1 | 0 |
|-----|---|---|---|---|
| 7 | – | 32←23←27←28 |
| 6 | – | 31←20←24←26 |
| 5 | – | 30←19←22←25 |
| 4 | – | 29←18←14←21 |
| 3 | – | 18←12←13←17 |
| 2 | – | 11←10←7←15 |
| 1 | – | 5←9←4←8 |
| 0 | – | 2←1←3←6 |

Stage 1: Sort All Rows

| Row | 3 | 2 | 1 | 0 |
|-----|---|---|---|---|
| 7 | – | 32 | 28 | 27 | 23 |
| 6 | – | 31 | 26 | 24 | 20 |
| 5 | – | 30 | 25 | 22 | 19 |
| 4 | – | 29 | 21 | 16 | 14 |
| 3 | – | 18 | 17 | 13 | 12 |
| 2 | – | 15 | 11 | 10 | 7 |
| 1 | – | 9 | 8 | 5 | 4 |
| 0 | – | 6 | 3 | 2 | 1 |

Stage 2: 2/1 R/C Diagonal Sort

| Row | 3 | 2 | 1 | 0 |
|-----|---|---|---|---|
| 7 | – | 32 | 30 | 27 | 23 |
| 6 | – | 31 | 29 | 24 | 20 |
| 5 | – | 28 | 25 | 22 | 19 |
| 4 | – | 26 | 21 | 16 | 14 |
| 3 | – | 18 | 17 | 13 | 12 |
| 2 | – | 15 | 11 | 10 | 7 |
| 1 | – | 9 | 8 | 5 | 4 |
| 0 | – | 6 | 3 | 2 | 1 |

Stage 3: 1/1 R/C Diagonal Sort

| Row | 3 | 2 | 1 | 0 |
|-----|---|---|---|---|
| 7 | – | 32 | 31 | 29 | 26 |
| 6 | – | 30 | 28 | 25 | 22 |
| 5 | – | 27 | 24 | 21 | 19 |
| 4 | – | 23 | 20 | 17 | 14 |
| 3 | – | 18 | 16 | 13 | 12 |
| 2 | – | 15 | 11 | 10 | 7 |
| 1 | – | 9 | 8 | 5 | 4 |
| 0 | – | 6 | 3 | 2 | 1 |

Stage 4: 1/2 Diagonal Sort

| Row | 3 | 2 | 1 | 0 |
|-----|---|---|---|---|
| 7 | – | 32 | 31 | 30 | 28 |
| 6 | – | 29 | 26 | 27 | 24 |
| 5 | – | 25 | 22 | 23 | 20 |
| 4 | – | 21 | 19 | 18 | 16 |
| 3 | – | 17 | 14 | 15 | 12 |
| 2 | – | 13 | 11 | 10 | 8 |
| 1 | – | 9 | 7 | 6 | 4 |
| 0 | – | 5 | 3 | 2 | 1 |

Stage 5: 1/3 Diag+IntRow Sort

| Row | 3 | 2 | 1 | 0 |
|-----|---|---|---|---|
| 7 | – | 32 | 31 | 30 | 29 |
| 6 | – | 28 | 27 | 26 | 25 |
| 5 | – | 24 | 23 | 22 | 21 |
| 4 | – | 20 | 19 | 18 | 17 |
| 3 | – | 16 | 15 | 14 | 13 |
| 2 | – | 12 | 11 | 10 | 9 |
| 1 | – | 8 | 7 | 6 | 5 |
| 0 | – | 4 | 3 | 2 | 1 |

Seq. 2 Done: Sorted Order

R/C : Row/Col Deltas Between Successive Diag Selections

Stage 5: The Last Stage in Sequence 2
– Includes UCMS 1/(Ncols-1) R/C Diagonal Sort
– Also, Includes "IntRow" Sort For even Ncols values > 2, IntRow Sort in Last Stage
– Internal values of a row are sorted, from 1 to (Ncols-2)
– Internal rows are sorted, from 1 to (Nrows-2)

FIG. 29

The original list of 9 unsorted values for the 3-column standard UCMS example is
4 6 9 2 7 1 8 5 3

Sequence 0: Unsorted List of 9 ; 3 Lists of Length 3

| Row | | 2 | 1 | 0 |
|---|---|---|---|---|
| 2 | -- | ↑4 | ↑6 | ↑9 |
| 1 | -- | ↑2 | ↑7 | ↑1 |
| 0 | -- | ↑8 | ↑5 | ↑3 |

| Row | | 2 | 1 | 0 |
|---|---|---|---|---|
| 2 | -- | 8 | 7 | 9 |
| 1 | -- | 4 | 6 | 3 |
| 0 | -- | 2 | 5 | 1 |

Lists of 3/3/3 Built But Not Yet Sorted

Lists of 3/3/3 Built And Sorted

Sequence 1: Final Single Rectangle With 3 Rows x 3 Columns
Stage Flow is Left to Right, Starting in Top Rectangle Row
R/C : Row/Col Deltas Between Successive Diag Selections

| Row | | 2 | 1 | 0 |
|---|---|---|---|---|
| 2 | -- | 8←7←9 | | |
| 1 | -- | 4←6←3 | | |
| 0 | -- | 2←5←1 | | |

| Row | | 2 | 1 | 0 |
|---|---|---|---|---|
| 2 | -- | 9 | 8 | 7 |
| 1 | -- | 6 | 4 | 3 |
| 0 | -- | 5 | 2 | 1 |

Stage 1: Build 3x3 Rectangle: Sort All Rows

Stage 2 : 1/1 R/C Diag Sort

| Row | | 2 | 1 | 0 |
|---|---|---|---|---|
| 2 | -- | 9 | 8 | 7 |
| 1 | -- | 6 | 5 | 3 |
| 0 | -- | 4 | 2 | 1 |

| Row | | 2 | 1 | 0 |
|---|---|---|---|---|
| 2 | -- | 9 | 8 | 7 |
| 1 | -- | 6 | 5 | 4 |
| 0 | -- | 3 | 2 | 1 |

Stage 3 : 1/2 R/C Diagonal Sort

Final Sorted List of 9 Values

FIG. 30

The original list of 8 unsorted values for the 2-column standard UCMS example is
4 6 2 7 3 1 5 8

Sequence 0: Unsorted List of 8 Into 4 Sorted Pairs

Paired But Not Yet Sorted

| Row | A | B | C | D |
|---|---|---|---|---|
| 1 | -- | ↑4 | ↑6 | ↑2 | ↑7 |
| 0 | -- | ↓3 | ↓1 | ↓5 | ↓8 |

Paired And Sorted

| Row | A | B | C | D |
|---|---|---|---|---|
| 1 | -- | 4 | 6 | 5 | 8 |
| 0 | -- | 3 | 1 | 2 | 7 |

Sequence 0, Stage 1 : Unsorted List of 8 Broken Into 4 Pairs ; Each Pair Sorted

Sequence 1: Two 2 Rows x 2 Columns Rectangles
Merge Sort Stage Flow is From Top to Bottom in Each Rectangle Column

Sequence 1: 2 x 2 Rectangle 1

| Row | 1 | 0 | |
|---|---|---|---|
| 1 | -- | 4 ← 6 | // 6, 4 swapped |
| 0 | -- | 3 ← 1 | // No change : 3, 1 |

Sequence 1: 2 x 2 Rectangle 0

| Row | 1 | 0 | |
|---|---|---|---|
| 1 | -- | 5 ← 8 | // 8, 5 swapped |
| 0 | -- | 2 ← 7 | // 7,2 swapped |

Sequence 1, Stage 1 : Two 2x2 Rectangles Created ; Rows Sorted

| Row | 1 | 0 | |
|---|---|---|---|
| 1 | -- | 6 ↗ 4 | // No change : 4, 3 |
| 0 | -- | 3   1 | |

| Row | 1 | 0 | |
|---|---|---|---|
| 1 | -- | 8 ↗ 5 | // 7,5 swapped |
| 0 | -- | 7   2 | |

Sequence 1, Stage 2 : Two 2x2 Rectangles: 1/1 Row Column Diagonal Sort

Sequence 2: Final 4 Rows x 2 Columns Rectangle
Stage Flow is Left to Right, Starting in Top Rectangle Row
R/C : Row/Col Deltas Between Successive Diag Selections

| Row | 1 | 0 | |
|---|---|---|---|
| 3 | -- | 6 ← 8 | // 8, 6 swapped |
| 2 | -- | 4 ← 7 | // 7, 4 swapped |
| 1 | -- | 3 ← 5 | // 5, 3 swapped |
| 0 | -- | 1 ← 2 | // 2, 1 swapped |

| Row | 1 | 0 | |
|---|---|---|---|
| 3 | -- | 8 ↗ 6 | // No change : 6, 5 |
| 2 | -- | 7 ↗ 4 | // No change : 4, 2 |
| 1 | -- | 5   3 | |
| 0 | -- | 2   1 | |

Sequence 2, Stage 1 : 4x2 Rectangle; Sort Rows    Sequence 2, Stage 2 : 2/1 R/C Diagonal Sort

| Row | 1 | 0 | |
|---|---|---|---|
| 3 | -- | 8 ↗ 6 | // 7, 6 swapped |
| 2 | -- | 7 ↗ 4 | // 5, 4 swapped |
| 1 | -- | 5 ↗ 3 | // No change : 3, 2 |
| 0 | -- | 2   1 | |

| Row | 1 | 0 |
|---|---|---|
| 3 | -- | 8 7 |
| 2 | -- | 6 5 |
| 1 | -- | 4 3 |
| 0 | -- | 2 1 |

Sequence 2, Stage 3 : 1/1 R/C Diagonal Sort    Final 2-Column Sorted List of 8 Values

FIG. 31

| Sequence Number $q$ | Number of Sorters | Number of Rectangles $Num\_recangles_q$ | $Nrows_q$ in Sequence $q$ |
|---|---|---|---|
| 0 | $\frac{N_{final}}{Nrows_0}$ | | $Nrows_0$ |
| $q \geq 1$ | | $\frac{N_{final}}{Nrows_0 * Ncols^q}$ | $Nrows_0 * Ncols^{q-1}$ |

ALGORITHM 1: Top Level Flow of Standard UCMS Sorting Network
// Ncols, the number of lists to be merged, and columns in the rectangles.
// Nrows₀, the number of rows in the Sequence 0 2-d array.
// $N_{final}$, the number of values in the input unsorted list and output sorted list.
// $q_{final}$, the last sequence number ; $q_{final} \geq 1$.
Input: The 1-d list of $N_{final}$ unsorted values
Output: The 1-d list of $N_{final}$ sorted values 1. Transfer input 1-d list of $N_{final}$ unsorted values to Sequence 0 2-d array ;
   // Sequence 0 2-d array has $Nrows_0$ rows and ($N_{final}/Nrows_0$) columns.
2. In Sequence 0, sort each column of the 2-d array with an $Nrows_0$-sorter ;
   // The minimum value in each column goes to row 0; the maximum goes to row ($Nrows_0$-1).
   // Now setup Sequence 1 merge sort.
3. Set sequence variable $q = 1$ ;
4. $Nrows_1 = Nrows_0$ ;
5. $Num\_rectangles_1 = N_{final}/(Nrows_1 * Ncols)$ ;
6. repeat // process each merge sort sequence
7.   Use 2-d array from Sequence (q – 1) to create $Num\_rectangles_q$ rectangles in Sequence q ;
     // Each group of Ncols columns in Sequence (q – 1) array produces one rectangle
8.   Process the rectangles through the stages of Sequence q ;
9.   Transfer sorted data from the Sequence q rectangles to the Sequence q output 2-d array ;
     // The sorted $N_q$ values in each rectangle become a column in the output array.
10.  if $q < q_{final}$ then // setup the next sequence
11.    Set sequence variable $q = q + 1$ ;
12.    $Nrows_q = Nrows_{q-1} * Ncols$ ;
13.    $Num\_rectangles_q = Num\_rectangles_{q-1}/Ncols$ ;
14.  end
15. until $q == q_{final}$;
   // The output array from Sequence $q_{final}$ has $N_{final}$ rows and 1 column.
16. Transfer the single column of Sequence $q_{final}$ output data to the final 1-d list of $N_{final}$ sorted values ;

FIG. 34

UCMS Standard Sequence 1 Stages With Column Delta and IntRows Specifications

| Column Delta | 2 | 3 | 4 | 5 | 6 | 7 | 8 | 9 | <== | Ncols |
|---|---|---|---|---|---|---|---|---|---|---|
|  | All Rows | All Rows | All Rows | All Rows | All Rows | All Rows | All Rows | All Rows | <== | Initial Row Sort |
| 1 | 1/1 | 1/1 | 1/1 | 1/1 | 1/1 | 1/1 | 1/1 | 1/1 | <== | Row/Col Diag |
| Ncols - 7 |  |  |  |  |  |  |  | 1/2 | <== | Row/Col Diag |
| Ncols - 6 |  |  |  |  |  |  | 1/2 | 1/3 | <== | Row/Col Diag |
| Ncols - 5 |  |  |  |  |  | 1/2 | 1/3 | 1/4 | <== | Row/Col Diag |
| Ncols - 4 |  |  |  |  | 1/2 | 1/3 | 1/4 | 1/5 | <== | Row/Col Diag |
| Ncols - 3 |  |  |  | 1/2 | 1/3 | 1/4 | 1/5 | 1/6 | <== | Row/Col Diag |
| Ncols - 2 |  |  | 1/2 | 1/3 | 1/4 | 1/5 | 1/6 | 1/7 | <== | Row/Col Diag |
| Ncols - 1 |  | 1/2 | 1/3 | 1/4 | 1/5 | 1/6 | 1/7 | 1/8 | <== | Row/Col Diag |
| Ncols - 1 |  | IntRows |  | IntRows |  | IntRows |  |  | <== | Final Row Sort |

The last 2 (Ncols-1) rows both refer to the last stage in any merge sort Sequence q, with q >= 1

FIG. 35

| Sequence | Nrows_q | Seq_0 Columns | Num_ Rectangles_q | Num_ Extra_ Stages_q | Max_ Row_ Delta_q | Sort All Cols | Sort All Rows | 32/1 | 16/1 | 8/1 | R/C Diagonal Stage 4/1 | 2/1 | 1/1 | 1/2 |
|---|---|---|---|---|---|---|---|---|---|---|---|---|---|---|
| 0 | 3 | 81 | | | | 1 | | | | | | | | |
| 1 | 3 | 27 | | | | | 2 | | | | | | 3 | 4 |
| 2 | 9 | 9 | | 2 | 4 | | 5 | | | | | 6 | 7 | 8 | 9 |
| 3 | 27 | 3 | | 4 | 16 | | 10 | | | 11 | 12 | 13 | 14 | 15 | 16 |
| 4 | 81 | 1 | | 5 | 32 | | 17 | 18 | 19 | 20 | 21 | 22 | 23 | 24 |

FIG. 36

The original list of 8 unsorted values for the 3-column non-standard UCMS example is
4 6 2 7 3 1 5 8

Sequence 0: Unsorted List of 8 ; 1 List of Length 2 ; 2 Lists of Length 3

| Row | 2 | 1 | 0 |
|---|---|---|---|
| 2 | -- | ↑4 | ↑6 |
| 1 | -- | ↑2 | ↑7 | ↑3 |
| 0 | -- | ↑1 | ↑5 | ↑8 |

Lists of 2/3/3 Built But Not Yet Sorted

| Row | 2 | 1 | 0 |
|---|---|---|---|
| 2 | -- | | 7 | 8 |
| 1 | -- | 2 | 5 | 6 |
| 0 | -- | 1 | 4 | 3 |

Lists of 2/3/3 Built And Sorted

Sequence 1: Merge Sort of Final Rectangle
Stage Flow is Left to Right, Starting in Top Rectangle Row
R/C : Row/Col Deltas Between Successive Diag Selections

| Row | 2 | 1 | 0 |
|---|---|---|---|
| 2 | -- | | 7 ← 8 |
| 1 | -- | 2 ← 5 ← 6 |
| 0 | -- | 1 ← 4 ← 3 |

Stage 1: Build 3x3 Rectangle: Sort All Rows

| Row | 2 | 1 | 0 |
|---|---|---|---|
| 2 | -- | | 8 ↗ 7 |
| 1 | -- | 6 ↗ 5 ↗ 2 |
| 0 | -- | 4 ↗ 3 ↗ 1 |

Stage 2 : 1/1 Diagonal Sort

| Row | 2 | 1 | 0 |
|---|---|---|---|
| 2 | -- | | 8 ↗ 7 |
| 1 | -- | 6 ↗ 5 ↗ 3 |
| 0 | -- | 4 ↗ 2 ↗ 1 |

Stage 3 : 1/2 R/C Diagonal Sort

| Row | 2 | 1 | 0 |
|---|---|---|---|
| 2 | -- | | 8 | 7 |
| 1 | -- | 6 | 5 | 4 |
| 0 | -- | 3 | 2 | 1 |

Final Sorted List of 8 Values

FIG. 37

```
module ucms_network_Ncols_4_N_final_32_Num_Bits_8

( //      8 bits                                  32 values in lists
    input  [ 7 : 0 ]  input_unsorted_list_one_dimensional  [ 31 : 0 ] ,
    output [ 7 : 0 ]  output_sorted_list_one_dimensional   [ 31 : 0 ]
   ) ;

//      8 bits                                  2 rows    16 columns
   wire [ 7 : 0 ]  unsorted_lists_2_d_for_sequence_0  [ 1 : 0 ] [ 15 : 0 ] ;
   wire [ 7 : 0 ]  sorted_lists_2_d_from_sequence_0   [ 1 : 0 ] [ 15 : 0 ] ;

//      8 bits                                  8 rows    4 columns
   wire [ 7 : 0 ]  sorted_lists_2_d_from_sequence_1   [ 7 : 0 ] [ 3 : 0 ] ;

//      8 bits                                  32 rows   1 column
   wire [ 7 : 0 ]  sorted_lists_2_d_from_sequence_2   [ 31 : 0 ] [ 0 : 0 ] ;

sequence_0_Ncols_4_N_final_32_Num_Bits_8      sequence_0_instance
     (
       .in_data_for_sequence_0(   unsorted_lists_2_d_for_sequence_0  ) ,
       .out_data_from_sequence_0( sorted_lists_2_d_from_sequence_0   )  ) ;

sequence_1_Ncols_4_N_final_32_Num_Bits_8      sequence_1_instance
     (
       .in_data_for_sequence_1(   sorted_lists_2_d_from_sequence_0   ) ,
       .out_data_from_sequence_1( sorted_lists_2_d_from_sequence_1   )  ) ;

sequence_2_Ncols_4_N_final_32_Num_Bits_8      sequence_2_instance
     (
       .in_data_for_sequence_2(   sorted_lists_2_d_from_sequence_1   ) ,
       .out_data_from_sequence_2( sorted_lists_2_d_from_sequence_2   )  ) ;

genvar              one_d_list_index ;

generate for ( one_d_list_index   =                      31   ;
           one_d_list_index  >=                       0   ;
           one_d_list_index   =   one_d_list_index - 1    ) begin // tranfer the 1-d unsorted input list
       //    to the 2-d input array used in Sequence 0
       //
       // there are 2 rows and 16 columns in the Sequence 0 array //                                           row                  column assign  unsorted_lists_2_d_for_sequence_0 [ one_d_list_index / 16 ] [ one_d_list_index % 16 ]

=  input_unsorted_list_one_dimensional[ one_d_list_index ] ;

// tranfer the single column from the last sequence 2-d output array
       //    to the 1-d sorted output list assign  output_sorted_list_one_dimensional [ one_d_list_index ]

=  sorted_lists_2_d_from_sequence_2 [ one_d_list_index ] [ 0 ] ;

end endgenerate endmodule
```

FIG. 38

```
module sequence_0_Ncols_4_N_final_32_Num_Bits_8

( //      8 bits                              2 rows    16 columns
   input  [ 7 : 0 ]  in_data_for_sequence_0   [ 1 : 0 ] [ 15 : 0 ] ,
   output [ 7 : 0 ]  out_data_from_sequence_0 [ 1 : 0 ] [ 15 : 0 ]
   ) ;

genvar                       column_index ;

generate

// Instantiate the 16 2-sorters for ( column_index   =                           15  ;
          column_index   >=                           0  ;
          column_index   =         column_index - 1    ) begin sort_2_values_8_bits       sequence_0_sort_2
        (
         .In_1( in_data_for_sequence_0      [ 1 ] [ column_index ] ) ,
         .In_0( in_data_for_sequence_0      [ 0 ] [ column_index ] ) , // max value
         .Out_1( out_data_from_sequence_0 [ 1 ] [ column_index ] ) ,
         .Out_0( out_data_from_sequence_0 [ 0 ] [ column_index ] )
         // min value
         ) ;

end endgenerate endmodule
```

FIG. 39

```
module sequence_1_Ncols_4_N_final_32_Num_Bits_8
  ( //      8 bits                          rows     columns
    input  [ 7 : 0 ] in_data_for_sequence_1 [ 1 : 0 ] [ 15 : 0 ] ,
    output [ 7 : 0 ] out_data_from_sequence_1 [ 7 : 0 ] [ 3 : 0 ]    ) ;

parameter   NCOLS        = 4 ;

genvar          rectangle_index, col_index, row_index ;

generate for ( rectangle_index = 0 ; rectangle_index < 4 ; rectangle_index++ ) begin //     8 bits                     2 rows     4 columns
        wire [ 7 : 0 ] row_sort_in_data  [ 1 : 0 ] [ 3 : 0 ] ;
        wire [ 7 : 0 ] row_sort_out_data [ 1 : 0 ] [ 3 : 0 ] ;
        wire [ 7 : 0 ] diag_1_1_out_data [ 1 : 0 ] [ 3 : 0 ] ;
        wire [ 7 : 0 ] diag_1_2_out_data [ 1 : 0 ] [ 3 : 0 ] ;
        wire [ 7 : 0 ] diag_1_3_out_data [ 1 : 0 ] [ 3 : 0 ] ;

//                   (   input data   )                  (   output data   )

// Start with sequence 1, stage 1, row sort seq_1_row_sort_stage           seq_1_row_sort_instance
          ( .row_sort_in_data( row_sort_in_data ) , .row_sort_out_data( row_sort_out_data ) );

// sequence 1, stage 2, diagonal stage with row delta = 1 , column delta = 1 seq_1_diag_1_1_stage           seq_1_diag_1_1_instance
          ( .diag_1_1_in_data( row_sort_out_data ) , .diag_1_1_out_data( diag_1_1_out_data ) );

// sequence 1, stage 3, diagonal stage with row delta = 1 , column delta = 2 seq_1_diag_1_2_stage           seq_1_diag_1_2_instance
          ( .diag_1_2_in_data( diag_1_1_out_data ) , .diag_1_2_out_data( diag_1_2_out_data ) );

// sequence 1, stage 4, last stage in sequence ; diagonal stage with R/C = 1/3 = 1/(NCOLS-1)

seq_1_diag_1_3_stage           seq_1_diag_1_3_instance
          ( .diag_1_3_in_data( diag_1_2_out_data ) , .diag_1_3_out_data( diag_1_3_out_data ) );

// map sequence input and output data for ( col_index = 3   ; col_index >=  0 ; col_index-- ) begin for ( row_index = 1   ; row_index >=  0 ; row_index-- ) begin // split off 4 columns from sequence input data to rectangle row_sort_in_data array assign  row_sort_in_data [ row_index ] [ col_index ]
                  = in_data_for_sequence_1 [ row_index ] [ col_index + ( rectangle_index * NCOLS ) ] ;

// map the final sorted data from this rectangle into a single column of the output data assign out_data_from_sequence_1 [ ( row_index * NCOLS ) + col_index ] [ rectangle_index ]
                  = diag_1_3_out_data [ row_index ] [ col_index ] ;

end // END OF "for ( row_index = 1   ; ... "

end // END OF "for ( col_index = 3   ; ... "

end // END OF "for ( rectangle_index = 0 ; ... "

endgenerate endmodule
```

FIG. 40

```
module sequence_2_Ncols_4_N_final_32_Num_Bits_8
( //        8 bits                          rows      columns
   input  [ 7 : 0 ]   in_data_for_sequence_2 [ 7 : 0 ] [ 3 : 0 ] ,
   output [ 7 : 0 ]   out_data_from_sequence_2 [ 31 : 0 ] [ 0 : 0 ]    ) ;

parameter   NCOLS         = 4 ;

genvar             rectangle_index, col_index, row_index ;

generate for ( rectangle_index  =  0 ; rectangle_index <  1 ; rectangle_index++ ) begin //      8 bits                    2 rows    4 columns
         wire [ 7 : 0 ]  row_sort_in_data   [ 7 : 0 ] [ 3 : 0 ] ;
         wire [ 7 : 0 ]  row_sort_out_data  [ 7 : 0 ] [ 3 : 0 ] ;
         wire [ 7 : 0 ]  diag_2_1_out_data  [ 7 : 0 ] [ 3 : 0 ] ;
         wire [ 7 : 0 ]  diag_1_1_out_data  [ 7 : 0 ] [ 3 : 0 ] ;
         wire [ 7 : 0 ]  diag_1_2_out_data  [ 7 : 0 ] [ 3 : 0 ] ;
         wire [ 7 : 0 ]  diag_1_3_out_data  [ 7 : 0 ] [ 3 : 0 ] ;

// Start with sequence 2, stage 1, row sort seq_2_row_sort_stage              seq_2_row_sort_instance
            ( .row_sort_in_data( row_sort_in_data ) , .row_sort_out_data( row_sort_out_data ) );

// sequence 2, stage 2, diagonal stage with row delta = 1 , column delta = 1 seq_2_diag_2_1_stage              seq_2_diag_2_1_instance
            ( .diag_2_1_in_data( row_sort_out_data ) , .diag_2_1_out_data( diag_2_1_out_data ) );

// sequence 2, stage 3, diagonal stage with row delta = 1 , column delta = 1 seq_2_diag_1_1_stage              seq_2_diag_1_1_instance
            ( .diag_1_1_in_data( diag_2_1_out_data ) , .diag_1_1_out_data( diag_1_1_out_data ) );

// sequence 2, stage 4, diagonal stage with row delta = 1 , column delta = 2 seq_2_diag_1_2_stage              seq_2_diag_1_2_instance
            ( .diag_1_2_in_data( diag_1_1_out_data ) , .diag_1_2_out_data( diag_1_2_out_data ) );

// sequence 2, stage 5, last stage in sequence ; diagonal stage with R/C = 1/3 = 1/(NCOLS-1)

seq_2_diag_1_3_stage              seq_2_diag_1_3_instance
            ( .diag_1_3_in_data( diag_1_2_out_data ) , .diag_1_3_out_data( diag_1_3_out_data ) );

// map sequence input and output data for ( col_index  =  3   ; col_index >=  0 ; col_index-- ) begin for ( row_index  =  7   ; row_index >=  0 ; row_index-- ) begin // split off 4 columns from sequence input data to rectangle row_sort_in_data assign  row_sort_in_data [ row_index ] [ col_index ]
                     = in_data_for_sequence_2 [ row_index ] [ col_index + ( rectangle_index * NCOLS ) ] ;

// map the sorted data from this rectangle into a single column of the output data assign out_data_from_sequence_2  [ ( row_index * NCOLS ) + col_index ] [ rectangle_index ]
                     = diag_1_3_out_data [ row_index ] [ col_index ] ;

end // END OF "for ( row_index  =  7    ; ... "

end // END OF "for ( col_index  =  3    ) ... "

end // END OF "for ( rectangle_index = 0 ; ... "

endgenerate endmodule
```

FIG. 41

```
module seq_1_row_sort_stage ( //       8 bits                      2 rows   4 columns
     input  [ 7 : 0 ]  row_sort_in_data   [ 1 : 0 ] [ 3 : 0 ] ,
     output [ 7 : 0 ]  row_sort_out_data  [ 1 : 0 ] [ 3 : 0 ]
     ) ;

genvar                        row_index ;

// Instantiate the 2 4-sorters for this rectangle generate for ( row_index   =                              1   ;
              row_index  >=                              0   ;
              row_index   =              row_index - 1     ) begin sort_4_values_8_bits   row_sort_4_sorter
              (
                .In_3(  row_sort_in_data [ row_index ] [ 3 ]   ) ,
                .In_2(  row_sort_in_data [ row_index ] [ 2 ]   ) ,
                .In_1(  row_sort_in_data [ row_index ] [ 1 ]   ) ,
                .In_0(  row_sort_in_data [ row_index ] [ 0 ]   ) , // max value
                .Out_3( row_sort_out_data [ row_index ] [ 3 ]   ) ,
                .Out_2( row_sort_out_data [ row_index ] [ 2 ]   ) ,
                .Out_1( row_sort_out_data [ row_index ] [ 1 ]   ) ,
                .Out_0( row_sort_out_data [ row_index ] [ 0 ]   )
                // min_value
              ) ;

end endgenerate endmodule
```

FIG. 42

```
module seq_2_diag_2_1_stage ( // 8-bit values      Port List        8 rows  4 columns input  [ 7 : 0 ] diag_2_1_in_data  [ 7 : 0 ] [ 3 : 0 ] ,
    output [ 7 : 0 ] diag_2_1_out_data [ 7 : 0 ] [ 3 : 0 ]  ) ;

// ~~~~~~~~~~~~~~~~~~~~~~~~~~~~~~~~~~~~~~~~~~~~~~~
    // The passthrough assignments
    // ~~~~~~~~~~~~~~~~~~~~~~~~~~~~~~~~~~~~~~~~~~~~~~~

// ...

assign diag_2_1_out_data[  7 ] [   3 ]
        = diag_2_1_in_data  [  7 ] [   3 ] ;

// ...

// ~~~~~~~~~~~~~~~~~~~~~~~~~~~~~~~~~~~~~~~~~~~~~~~
    // The sorter block instantiations
    // ~~~~~~~~~~~~~~~~~~~~~~~~~~~~~~~~~~~~~~~~~~~~~~~

// ...

sort_4_values_8_bits
                    sorter_from_row_1_column_3
    (
     .In_3 ( diag_2_1_in_data [   7 ] [   0 ] ) ,
     .In_2 ( diag_2_1_in_data [   5 ] [   1 ] ) ,
     .In_1 ( diag_2_1_in_data [   3 ] [   2 ] ) ,
     .In_0 ( diag_2_1_in_data [   1 ] [   3 ] ) , // max value
     .Out_3 ( diag_2_1_out_data [   7 ] [   0 ] ) ,
     .Out_2 ( diag_2_1_out_data [   5 ] [   1 ] ) ,
     .Out_1 ( diag_2_1_out_data [   3 ] [   2 ] ) ,
     .Out_0 ( diag_2_1_out_data [   1 ] [   3 ] )
     // min value
    ) ;

// ...

endmodule
```

FIG. 43

```
ALGORITHM 2: Creation of Module Code for a Rectangle Diagonal Stage
Input: Nrows, Ncols, the number of rows and columns in the rectangle
Input: Row_Delta, the number of rows between successive sorter location selections
Input: Col_Delta, the number of columns between successive sorter location selections
Output: The System Verilog Module Code for Sorters and Passthroughs
1  Initialize all locations of rectangle array Used_In_Sorter to 0, i.e. false ;
2  Initialize string variable module_code ; row_limit = Nrows - Row_Delta - 1 ;
3  for col_start = Ncols - 1 downto Col_Delta by -1 do  // Create all diagonal sorters
4      if col_start < Ncols - Col_Delta then
5          row_limit = Row_Delta - 1 ;
6      end
7      for row_start = 0 to row_limit do
8          Initialize location_list to empty ; locations_in_list = 0 ;
9          next_row = row_start ; next_col = col_start ;
10         while (next_row < Nrows) and (next_col ≥ 0) do  // next_row, next_col still in the rectangle?
11             Add location {next_row, next_col} to next highest position in location_list ;
12             locations_in_list = locations_in_list + 1 ;
13             next_row = next_row + Row_delta ; next_col = next_col - Col_delta ;
14         end
15         if locations_in_list ≥ 2 then  // Found at least 2 locations to sort
16             Initialize sorter_text for (locations_in_list)-sorter ;
17             foreach location in location_list do  // Preserve min to max order
18                 Add location as next highest input and output ports text of sorter_text ;
19                 Set Used_In_Sorter[location] to 1, i.e. true ;
20             end
21             Finalize sorter_text and add it to module_code ;
22         end
23     end
24 end
25 if EVEN( Ncols ) and ( Ncols ≥ 4 ) and ( Col_Delta == Ncols - 1 ) and ( Nrows > 2 ) then
      // This is the IntRow Sort section.
26     for row_num = 1 to Nrows - 2 do
27         Initialize sorter_text for (Ncols - 2)-sorter ;
28         for col_num = 1 to Ncols - 2 do  // Preserve min to max order
29             Add location{row_num, col_num} as next highest input and output ports text of sorter_text ;
30             Set Used_In_Sorter[location] to 1, i.e. true ;
31         end
32         Finalize sorter_text and add it to module_code ;
33     end
34 end
35 foreach location in Used_In_Sorter do  // Create passthroughs
36     if Used_In_Sorter[location] == 0 then
37         Create passthrough text for location and add it to module_code ;
38     end
39 end
40 Finalize module_code and write it to stage module SV file ;
```

FIG. 44

The original list of 9 unsorted values for the 3-column standard UCMS example is
4 6 9 2 7 1 8 5 3

Sequence 0: Unsorted List of 9 ; 3 Lists of Length 3

| Row | 2 | 1 | 0 |
|---|---|---|---|
| 2 | -- | ↑4 | ↑6 | ↑9 |
| 1 | -- | ↑2 | ↑7 | ↑1 |
| 0 | -- | ↑8 | ↑5 | ↑3 |

| Row | 2 | 1 | 0 |
|---|---|---|---|
| 2 | -- | 8 | 7 | 9 |
| 1 | -- | 4 | 6 | 3 |
| 0 | -- | 2 | 5 | 1 |

Lists of 3/3/3 Built But Not Yet Sorted         Lists of 3/3/3 Built And Sorted

Sequence 1: Find the Median of the Final Single Rectangle With 3 Rows x 3 Columns Stage Flow is Left to Right, Starting in Top Rectangle Row
R/C : Row/Col Deltas Between Successive Diag Selections

| Row | 2 | 1 | 0 | |
|---|---|---|---|---|
| 2 | -- | 8 ← 7 ← 9 | Min of Max's |
| 1 | -- | 4 ← 6 ← 3 | Median of Medians |
| 0 | -- | 2 ← 5 ← 1 | Max of Min's |

| Row | 2 | 1 | 0 |
|---|---|---|---|
| 2 | -- | | | 7 |
| 1 | -- | | 4 | |
| 0 | -- | 5 | | |

Stage 1: Build 3x3 Rectangle: Sort All Rows         Stage 2 : 1/1 R/C Median of 3

| Row | 2 | 1 | 0 |
|---|---|---|---|
| 2 | -- | | | |
| 1 | -- | | 5 | |
| 0 | -- | | | |

Final Median of 9 Values

FIG. 45

The original list of 25 unsorted values for the 5-column UCMS example is
18 10 22 14 6 12 25 8 19 13 4 17 16 24 9 23 2 21 7 1 3 11 15 5 20

Sequence 0: Unsorted List of 25; 5 Lists of Length 5

| Row | 4 | 3 | 2 | 1 | 0 |
|---|---|---|---|---|---|
| 4 | -- | ↑18 | ↑10 | ↑22 | ↑14 | ↑6 |
| 3 | -- | ↑12 | ↑25 | ↑8 | ↑19 | ↑13 |
| 2 | -- | ↑4 | ↑17 | ↑16 | ↑24 | ↑9 |
| 1 | -- | ↑23 | ↑2 | ↑21 | ↑7 | ↑1 |
| 0 | -- | ↑3 | ↑11 | ↑15 | ↑5 | ↑20 |

| Row | 4 | 3 | 2 | 1 | 0 |
|---|---|---|---|---|---|
| 4 | -- | 23 | 25 | 22 | 24 | 20 |
| 3 | -- | 18 | 17 | 21 | 19 | 13 |
| 2 | -- | 12 | 11 | 16 | 14 | 9 |
| 1 | -- | 4 | 10 | 15 | 7 | 6 |
| 0 | -- | 3 | 2 | 8 | 5 | 1 |

5 Lists of 5 Built But Not Yet Sorted     5 Lists of 5 Built And Sorted

Sequence 1: Find the Median of the Final Single Rectangle With 5 Rows x 5 Columns
Stage Flow is Left to Right, Starting in Top Rectangle Row
R/C : Row/Col Deltas Between Successive Diag Selections

| Row | 4 | 3 | 2 | 1 | 0 |
|---|---|---|---|---|---|
| 4 | -- | 23← | 25← | 22← | 24← | 20 |
| 3 | -- | 18← | 17← | 21← | 19← | 13 |
| 2 | -- | 12← | 11← | 16← | 14← | 9 |
| 1 | -- | 4← | 10← | 15← | 7← | 6 |
| 0 | -- | 3← | 2← | 8← | 5← | 1 |

| Row | 4 | 3 | 2 | 1 | 0 |
|---|---|---|---|---|---|
| 4 | -- |   |   |   | 22 | 20 |
| 3 | -- |   |   | 18 | 17 | 13 |
| 2 | -- |   | 14 | 12 | 11 |   |
| 1 | -- | 15 | 10 | 7 |   |   |
| 0 | -- | 8 | 5 |   |   |   |

Stage 1: Build 5x5 Rectangle: Sort Rows
From Top Row: Min 2 of 5 ; Min 3 of 5 ;
Mid 3 of 5 ; Max 3 of 5 ; Max 2 of 5

Stage 2: R/C 1/1 Diagonal
Min 1 of 4 ; Median of 5 ; Max 1 of 4

| Row | 4 | 3 | 2 | 1 | 0 |
|---|---|---|---|---|---|
| 4 | -- |   |   |   |   |   |
| 3 | -- |   |   |   | 13 |   |
| 2 | -- |   | 12 |   |   |   |
| 1 | -- | 14 |   |   |   |   |
| 0 | -- |   |   |   |   |   |

| Row | 4 | 3 | 2 | 1 | 0 |
|---|---|---|---|---|---|
| 4 | -- |   |   |   |   |   |
| 3 | -- |   |   |   |   |   |
| 2 | -- |   |   | 13 |   |   |
| 1 | -- |   |   |   |   |   |
| 0 | -- |   |   |   |   |   |

Stage 3: R/C 1/2 Diagonal ; Median of 3     Median of 25 has been determined

FIG. 46

The original list of 25 unsorted values for the 5-column UCMS example is
18 10 22 14 6 12 25 8 19 13 4 17 16 24 9 23 2 21 7 1 3 11 15 5 20

Sequence 0: Unsorted List of 25; 5 Lists of Length 5

| Row | 4 | 3 | 2 | 1 | 0 |
|-----|---|---|---|---|---|
| 4 | -- | 18 | 10 | 22 | 14 | 6 |
| 3 | -- | 12 | 25 | 8 | 19 | 13 |
| 2 | -- | 4 | 17 | 16 | 24 | 9 |
| 1 | -- | 23 | 2 | 21 | 7 | 1 |
| 0 | -- | 3 | 11 | 15 | 5 | 20 |

| Row | 4 | 3 | 2 | 1 | 0 |
|-----|---|---|---|---|---|
| 4 | -- | 23 | 25 | 22 | 24 | 20 |
| 3 | -- | | | | | |
| 2 | -- | | | | | |
| 1 | -- | | | | | |
| 0 | -- | | | | | |

5 Lists of 5 Built But Not Yet Sorted

5 Lists of 5 Built And Sorted: Max Row

Sequence 1: Find the Max of the Row of Max's
Stage Flow is Left to Right, Starting in Top Rectangle Row

| Row | 4 | 3 | 2 | 1 | 0 |
|-----|---|---|---|---|---|
| 4 | -- | 23←25←22←24←20 |
| 3 | -- | | | | | |
| 2 | -- | | | | | |
| 1 | -- | | | | | |
| 0 | -- | | | | | |

| Row | 4 | 3 | 2 | 1 | 0 |
|-----|---|---|---|---|---|
| 4 | -- | 25 | | | | |
| 3 | -- | | | | | |
| 2 | -- | | | | | |
| 1 | -- | | | | | |
| 0 | -- | | | | | |

Stage 1: Sort the Max Row

Max of 25 has been determined

FIG. 47

SINGLE-STAGE HARDWARE SORTING BLOCKS AND ASSOCIATED MULTIWAY MERGE SORTING NETWORKS

CROSS-REFERENCE TO RELATED APPLICATIONS

This application is a continuation of U.S. application Ser. No. 17/190,843 filed Mar. 3, 2021, which claims the benefit of U.S. Provisional Application No. 62/984,880, filed on Mar. 4, 2020, all of which are incorporated by reference.

FIELD OF THE INVENTION

The invention relates generally to sorting lists of values in hardware. More specifically, the invention relates to single-stage sorting blocks and associated multiway merge sorting networks.

BACKGROUND OF THE INVENTION

Hardware sorting systems use single-stage 2-sorters, or comparators, and 2-max and 2-min filters in their sort processes. These single-stage hardware blocks have 2 input values, a block which compares those 2 input values, and the comparison result signal is used as the output multiplexer (MUX) select line, or control input signal, for the block's output ports. A 2-max filter only presents the maximum (max) of the 2 inputs, a 2-min filter presents the minimum (min) of the 2 inputs. A 2-sorter presents both the max and min sorted outputs. A schematic of a 2-sorter, with both 2-max and 2-min output ports, is shown in FIG. 1. A hardware 2-sorter may be made into a 2-max or 2-min rank order filter by removing the output multiplexer logic for the output port not used, but there is no propagation delay improvement for such a rank order hardware block. Propagation delay is the time required for an input signal to propagate to an output along the slowest path in a single-stage or network sorting block.

Single-stage hardware N-sorters directly sort more than 2 values at a time when N≥3. Certain 3-sorters, for example those for a 3-way merge sort process, create their sorters from 3 serial stages of 2-sorters. Therefore, these 3-sorters are very slow, taking 3 times longer than a single 2-sorter. A sorting network using these 3-sorters becomes a two level network of 2-sorter networks. A sorting network consists of a network of small single-stage hardware sorters and filters, connected in such a way as to sort lists larger than what can be sorted by a single-stage sorter or filter. The small N-sorters and N-filters used in traditional sorting networks are 2-sorters and 2-max and 2-min filters.

An advantage to N-sorters when N≥3 include that fewer hardware resources may be used for a single-stage hardware sorter versus a multi-stage network of 2-sorters.

Single stage hardware 2-sorters may be connected to operate in parallel in each stage of the sorting process. This is considered a sorting network with a purpose to sort unsorted input values in a fast and efficient manner, and to output the full sorted list of those same values. When a sorting network only uses 2-sorters, even small lists with more than 2 values must be sorted with a sorting network.

Single stage sorting blocks are used in various sorting algorithms, such as Odd-Even Merge Sort (O-EMS) and Bitonic Merge Sort. Both algorithms take the same amount of time to sort a list of values, but Bitonic Merge Sort uses more hardware resources in its networks than O-EMS. O-EMS can also be used to build fast max or min sorting network rank order filters, but Bitonic Merge Sort does not determine a max or min value until it has performed a full list sort. Both algorithms use merge sorts of 2 sorted lists, and the only single-stage hardware sorters that are used in these sorting networks are 2-sorters.

For merging two large, sorted lists, John von Neumann's Merge Sort is typically used. However, the basic algorithm is very slow, as only the max or min of 2 values is selected in each clock cycle. Because of this, merge sequences from O-EMS sorting networks are often used to increase the number of output values in each clock cycle.

Rank order filters may be used to select an element from an ordered output list. Rank order filters do not produce a full list of sorted values from an unsorted list. Rather, they produce only a partial list of the sorted values, and often there is only one filtered value that is output. Typical rank order filters produce the max, median, and/or min values from an unsorted input list. Multiway merge sorting networks may be used as rank order filters, for example, to sort network median rank order filters or to sort network max and min rank order filters.

What is needed is an improved system and methods for designing single-stage hardware sorting blocks, and further using the single-stage hardware sorting blocks to reduce the number of stages in multistage sorting processes, or to define multiway merge sorting networks. The invention satisfies this need.

SUMMARY OF THE INVENTION

The invention is directed to a general methodology for the systematic design of single-stage hardware N-sorter with N≥3. All of the hardware sorters produced in accordance with this and the following hardware N-sorter embodiments produce a "stable sort". That is, any duplicated values in the input list are distributed to the output ports in the same relative order found in the input list. This may be important, for example, when the values to be sorted are keys in key/value pairs.

The single-stage sorting blocks comprise a set of at least 3 input values, contained in one or more lists. There is one list of sorted output values, containing the input values, now in sorted order. A full sorter presents all sorted output values, and a filter presents a subset of the full sorted list. The output ports are defined using output multiplexers, one port multiplexer per each output value bit.

At least three 2-input comparisons are implemented in parallel. The comparison result signals may be used directly as select lines for the output multiplexers, or they may be combined in various ways in order to define the output multiplexer (MUX) select lines, or control input signals. The multiplexer select line operations inside the output bit multiplexers are all performed in parallel.

The systematic design of single-stage hardware N-sorters according to the invention is appropriate for any type of hardware in which a design can be implemented using a Hardware Description Language (HDL), such as a Field Programmable Gate Array (FPGA). It is contemplated that the invention may be implemented in any known HDL language, for example, System Verilog (SV). It is further contemplated that the invention may be implemented in C (including C++) language.

The invention is also directed to single-stage rank order N-filters, which present as outputs M only a subset of the N sorted inputs, with M<N. N-filters also work on a list of totally unordered input values. Some of these N-filters, such as hardware median filters, simply output values from the full sorted output list, without any change in the design for the specific values that are output. However, single-stage hardware N-max and N-min filters are often specially designed in order to improve the speed of the filters, versus the speed of the associated full N-sorter.

The invention is also directed to single-stage N-sorters used to enable fast multiway merge sorting networks. A multiway merge sorting network includes one or more merge sequences, in which 3 or more sorted lists are merged into a single sorted output list. After the final merge sequence, all of the unsorted inputs are presented in a full sorted output list of those unsorted input values.

The invention is also directed to the design of rank order sorting network filters, where only a subset of the sorted output values are produced and provided as filter outputs. These rank order sorting network filters have reduced resource usage, versus the corresponding network that outputs all of the sorted input values. In some cases, such as max and min sorting network filters, the filter speed is much faster than the corresponding network which outputs all of the sorted input values. Max and min multiway merge sorting network filters, where 3 or more max/min values are merged in each stage, are also shown to be much faster than prior art max-and-or-min sorting network filters using 2-way merge sort, which are restricted to only using 2-max and 2-min single-stage hardware filters.

The invention and its attributes and advantages will be further understood and appreciated with reference to the detailed description below of presently contemplated embodiments, taken in conjunction with the accompanying drawings.

DESCRIPTION OF DRAWINGS

The preferred embodiments of the invention will be described in conjunction with the appended drawings provided to illustrate and not to limit the invention.

FIG. 3 illustrates code for a port list creation.

FIG. 5 illustrates code for comparison signals.

FIG. 6 illustrates code for output port assignments.

FIG. 8 illustrates code for product terms.

FIG. 9 illustrates 3-sorter code created using the general hardware design embodiments according to the invention.

FIG. 10 is a block diagram of a modified general hardware N-sorter.

FIG. 11 is a hardware sorter table.

FIG. 12 illustrates propagation delay and resource usage of N-sorters and N-max filters using a 4-LUT logic block.

FIG. 13 illustrates a 4-sorter code according to the invention.

FIG. 14 illustrates a 5-sorter code according to the invention.

FIG. 15 illustrates another embodiment of a 5-sorter code according to the invention.

FIG. 16 illustrates OR Signals for 6-, 7-, 8-, and 9-sorters in 2nd MUX select line block.

FIG. 17 illustrates a 9-sorter Sum of Products (SOP) equation in 4-LUTs.

FIG. 18 illustrates code including input equations combined.

FIG. 19 illustrates bit multiplexer code.

FIG. 20 illustrates bit multiplexer behavioral code.

FIG. 21 illustrates pseudocode for 4-min and 4-max single stage hardware filters.

FIG. 22 illustrates pseudocode for 5-max single stage hardware filters.

FIG. 23 illustrates pseudocode for 8-max single stage hardware filters.

FIG. 25 is a table of UCMS 4-column sorted order.

FIG. 26 is a table of UCMS notations and abbreviations.

FIG. 27 is a UCMS sorting network example for Sequence 0: 4-column, Nfinal=32.

FIG. 28 is a UCMS sorting network example for Sequence 1: 4-column, Nfinal=32.

FIG. 29 is a UCMS sorting network example for Sequence 2: 4-column, Nfinal=32.

FIG. 30 is a UCMS sorting network example for sequence flow: 3-column, Nfinal=9, Ncols=3.

FIG. 31 is a UCMS sorting network example for sequence flow: 2-column, Nfinal=8, Ncols=2.

FIG. 34 is an algorithm for the top level UCMS network.

FIG. 35 is a table of UCMS Sequence 1 stages.

FIG. 36 is a table of various parameters and stage order: Nfinal=243, Ncols=3.

FIG. 37 is a non-standard sequence flow: Nfinal=8, Ncols=3.

FIG. 38 is code for 4-column UCMS example: Nfinal=32, Ncols=4.

FIG. 39 is code for 4-column UCMS example, Sequence 0: Nfinal=32, Ncols=4.

FIG. 40 is code for 4-column UCMS example, Sequence 1: Nfinal=32, Ncols=4.

FIG. 41 is code for 4-column UCMS example, Sequence 2: Nfinal=32, Ncols=4.

FIG. 42 is code for 4-column UCMS example row sort, Sequence 1: Nfinal=32, Ncols=4.

FIG. 43 is code for passthrough and 4-Sorter instantiation from 4-column example Stage: R/C=2/1.

FIG. 44 is an algorithm used to create module code for a diagonal stage.

FIG. 45 is a median of 3×3 window using UCMS sequence flow: Nfinal=9, Ncols=3.

FIG. 46 is a median of 5×5 window using UCMS sequence flow: Nfinal=25, Ncols=5.

FIG. 47 is a max of a 5×5 window using UCMS sequence flow: Nfinal=25, Ncols=5.

DETAILED DESCRIPTION

The invention is directed to designing single-stage hardware sorting blocks, and further using the single-stage hardware sorting blocks to reduce the number of stages in multistage sorting processes, or to define multiway merge sorting networks.

The invention is discussed with respect Hardware Description Language (HDL) in the form of SystemVerilog (SV) for exemplary purposes only; any HDL is contemplated. It is further noted that the invention may be implemented in C (including C++) language.

Single-Stage Hardware N-Sorter

Figure 1:
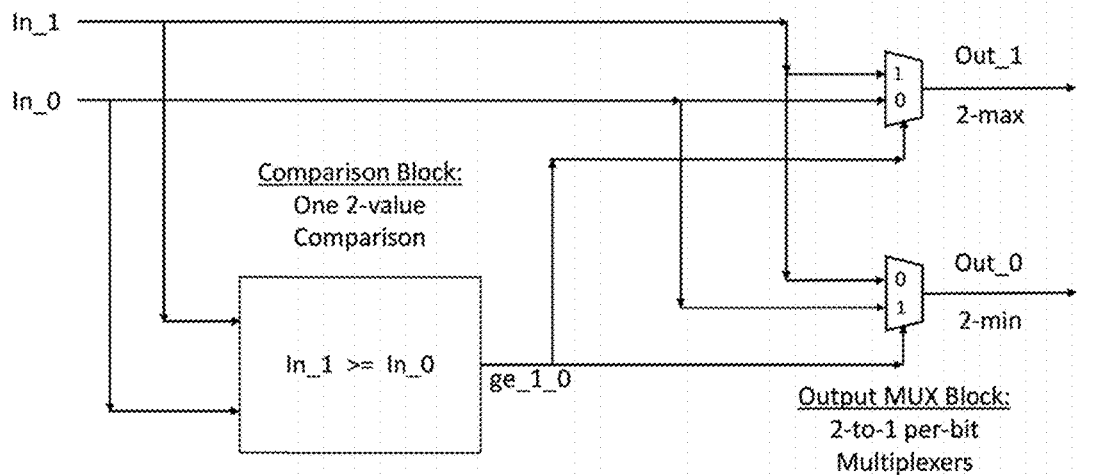
FIG. 1 is a block diagram illustrating a prior art 2-sorter.
Figure 2:
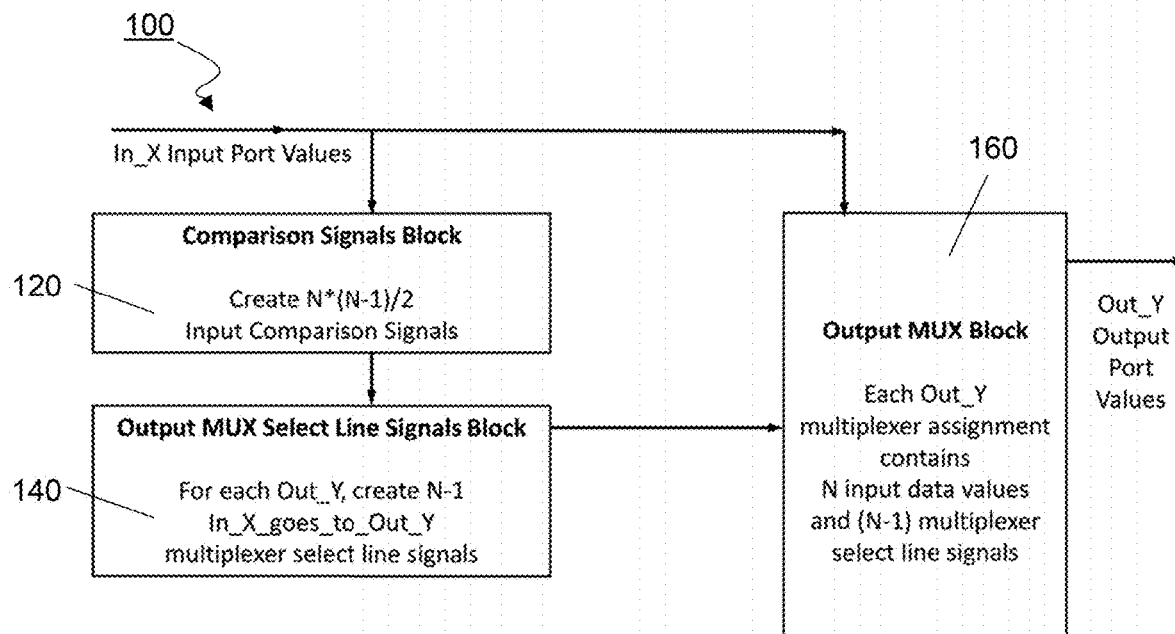
FIG. 2 is a block diagram illustrating a general hardware N-sorter.

FIG. 2 is a block diagram illustrating a general hardware N-sorter 100 according to the invention. These hardware N-sorters sort a list of N input values, and return the full sorted list of the same N values as outputs. A single-stage hardware sorter has one set of N input ports, one set of N output ports, and whatever internal logic is needed to produce the sorted list of values at the output ports. At the output ports, a single-stage hardware N-sorter produces a fully sorted list of N values for any permutation of the N input values. In contrast to a single-stage hardware sorter, a network sorter has multiple operation stages. In each stage of the network sorter, several single-stage hardware N-sorters operate in parallel. Network sorters, using multiway merge sort, are discussed further below.

For any hardware sorter in this embodiment, the unsorted input list of N values is applied to the sorter input ports, which are labeled In_Nm1 down to In_0, where Nm1 is the number N-1. The sorted output list of values is presented at the sorter output ports, which are labeled Out_Nm1 down to Out_0, with Out_Nm1 being the maximum value, and Out_0 the minimum value.

The various embodiments are discussed with respect to target 8-bit unsigned numbers for exemplary purposes only. FIG. 3 shows a SV port list code for a 9-sorter. As shown, the input and output ports are unsigned values with bit indices from MAX_BIT_INDEX down to 0. The number BITS_PER_VALUE is then defined as (MAX_BIT_INDEX+1). In this figure, MAX_BIT_INDEX is equal to 7, so BITS PER VALUE is 8; the input and output ports are 8-bit unsigned values. Although the example port list shown in FIG. 3 is used for 8-bit unsigned numbers, any number type and any bit width is contemplated.

Figure 4:
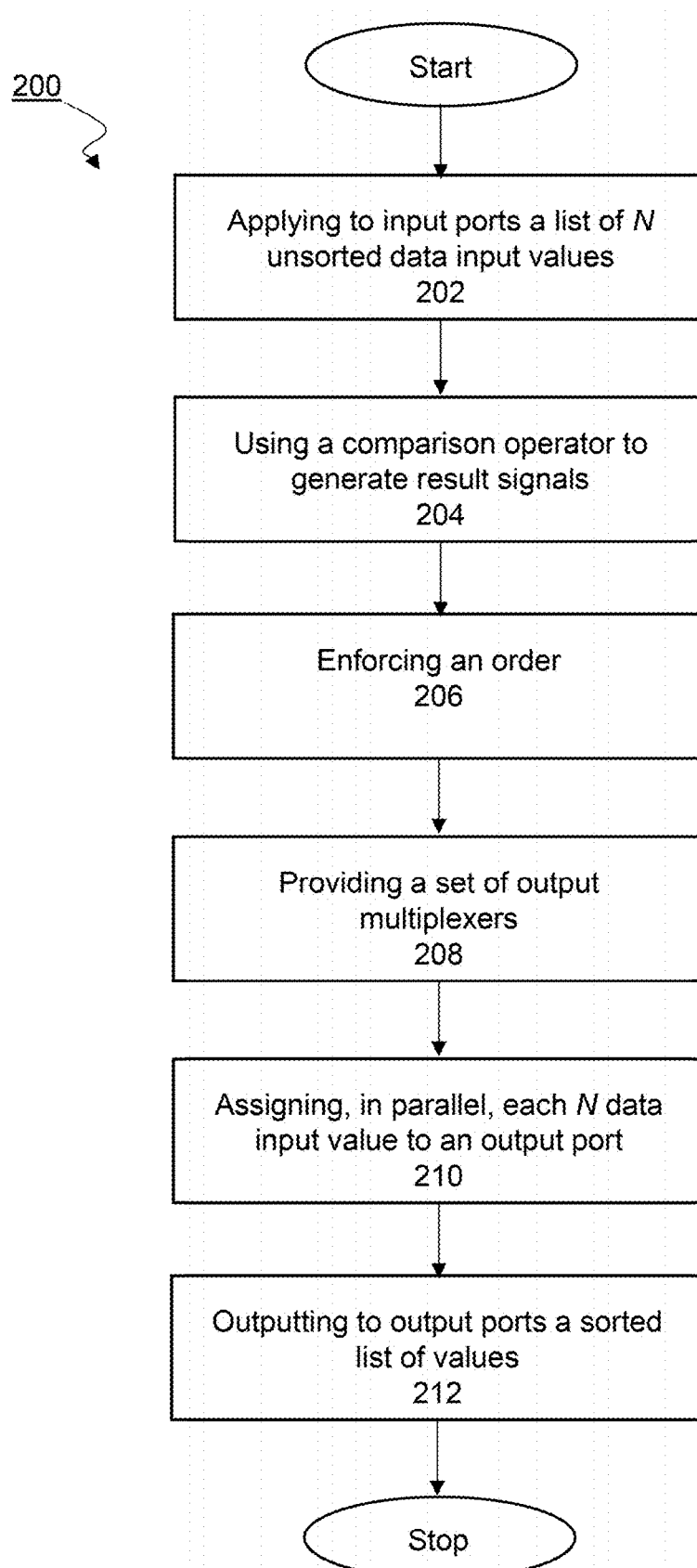
FIG. 4 is a flow chart directed to the design steps of a general hardware N-sorter.

FIG. 4 is a flow 200 chart directed to the design steps of a general hardware N-sorter according to the invention. As shown in FIG. 2, the N-sorter 100 includes a Comparison Signals Block 120, a Output MUX Select Line Signals Block 140, and an Output MUX (Multiplexer) Block 160.

The Comparison Signals Block 120 is the first design block in any single-stage hardware N-sorter. As shown by step 202 of FIG. 4, a list of N unsorted data input values are applied to input ports, where N≥3, and each N-sorter internal input data value is supplied by an input port. The Comparison Signals Block 120 performs, in parallel, all possible 2-value comparisons for the N input values as shown by step 204. This is performed using a comparison operator to generate, in parallel, all N*(N−1)/2 possible 2-value comparison result signals for the list of N data input values. It should be noted that it is assumed that efficient comparison hardware is created whenever a comparison of 2 values is specified by a given hardware type. As a result, there may be no need to modify any of the 2-value comparison hardware blocks that are automatically created. The input which is located higher in the input list is on the left side of the comparison operator, and the input which is located lower in the input list is on the right side of the operator.

The following is discussed with respect to a comparison operator that is 'greater than or equal' (≥)for exemplary purposes only. This is one embodiment of the invention and any comparison operator is contemplated.

At step 206, an order is enforced for identical input values. An input value located higher in the input list is judged to be greater than an identical input value located lower in the input list. This enforced order—in which the input value on the left side of the "≥" operator must have a larger numeric suffix than the input value on the right side of the operator—is essential for at least two reasons.

First, the enforced order allows groups of duplicate values to be successfully sorted in the same manner as if all input values were distinct. Second, when the enforced order is combined with "≥" comparison operator, an N-sorter always produces a stable sort, a sort in which the output order of duplicate values (e.g., keys in key/value pairs) is the same as the input order of those duplicate values.

It should be noted that any enforced is contemplated so long as groups of duplicate values are processed as if they are distinct values, and the order of duplicate values in the output list matches the relative order of those values in the input list.

FIG. 5 illustrates the code for the 36 comparison signals for a 9-sorter. Each of the N input values is compared, one at a time, to every other value. This specification uses the "≥" "greater than or equal" operator for each comparison, and the comparison signal names all begin with "ge" to help emphasize the comparison operator that is being used.

It should be noted that a sorter smaller than a 9-sorter uses a subset of the code shown in FIG. 5, A 2-sorter only needs the ge_1_0 declaration, a 3-sorter only needs the ge_2_1, ge_2_0, and ge_1_0 declarations, and a 4-sorter requires only the ge_3_2, ge_3_1, ge_3_0, ge_2_1, ge_2_0, and ge_1_0 declarations. For a sorter smaller than a 9-sorter, the unneeded declarations listed can be disregarded (e.g., deleted or commented out). For a sorter larger than a 9-sorter comparison variables are added, for example a 10-sorter adds 9 comparison variables from ge_9_8 down to ge_9_0, in which In_9 is compared to the other 9 In_X's. The ge_9_8 variable would compare In_9 to In_8, and the ge_9_0 variable would compare In_9 to In_0. In these additional signal comparison definitions, In_9 is always on the left side of the comparison operator.

The Output MUX Block 160 of FIG. 2 is also found in every N-sorter. In this block, for each of the N output ports, one of the N data inputs is selected to go to that particular output port. More specifically, as shown by step 208 of FIG. 4, a set of multiplexers is provided, with each multiplexing having N data input signals and N-1 multiplexer select line signals, i.e., whatever select line input signals are required in order to choose the correct input data line to be sent to the multiplexer output. As shown in FIG. 2, the data lines come directly from the input ports to the multiplexers, and enter the group of Output MUX Blocks 160 at the top. The multiplexer select line signals enter the group of Output MUX Blocks 160 from the left, and are delayed by the amount of series logic used to produce the select line signals.

Output port assignments are created in a straightforward manner, as shown in FIG. 6. Output port assignments may use ternary or conditional syntax, and use multiplexer select line signals to determine which of the N inputs goes to a particular output. Since there are N input signals and N-1 input MUX select line signals in each output port assignment, there are always (2*N)-1 input signals per assignment in the general hardware design. As an example, a 9-sorter output assignment would have (2*9)-1=17 input signals in the assignment.

In the Output MUX Select Line Signals Block 140 shown in FIG. 2, the MUX select line signals required by the Output MUX Block 160 are built. The multiplexer select line signals propagate through an amount of series logic used to produce the multiplexer select line signals.

Using Hardware Description Language (HDL) in the form of SystemVerilog (SV), the MUX select line signals have a "In_X_goes_to_Out_Y" naming convention. The MUX select line signals determine which In_X input value goes to a particular Out_Y port. For example, when one of these signals is a 1, then that particular In_X input value is distributed to Out_Y. For a particular Out_Y signal, a maximum of one In_X_goes_to_Out_Y signal can have a value of 1 for a specific set of N input values. It should be noted that there is no In_0_goes_to_Out_Y signal used in the conditional assignment. If none of the In_Nm1_goes_to_Out_Y down to In_1_goes_to_Out_Y signals are true, then In_0 must be the input value that goes to output Out_Y.

Each In_X_goes_to_Out_Y signal is defined by a Sum-of-Products (SOP) equation, in which each product term contains the true or complemented signal states for the N-1 comparison signals in which In_X is compared to other input values.

The In_X_goes_to_Out_Y multiplexer select line signals may be created according to a version of comparison counting. It should be noted that the counting is not performed in the hardware that is ultimately built, but that the counting is performed in the process used to create a particular In_X_goes_to_Out_Y SOP signal, which is then implemented in hardware in a simple manner, for example by being installed in a Look Up Table (LUT) described in further detail below.

At step 212 of FIG. 4, a sorted list of values is output to output ports, wherein the order of duplicate values in the output list matches the order of those values in the unsorted input list.

Figure 7:
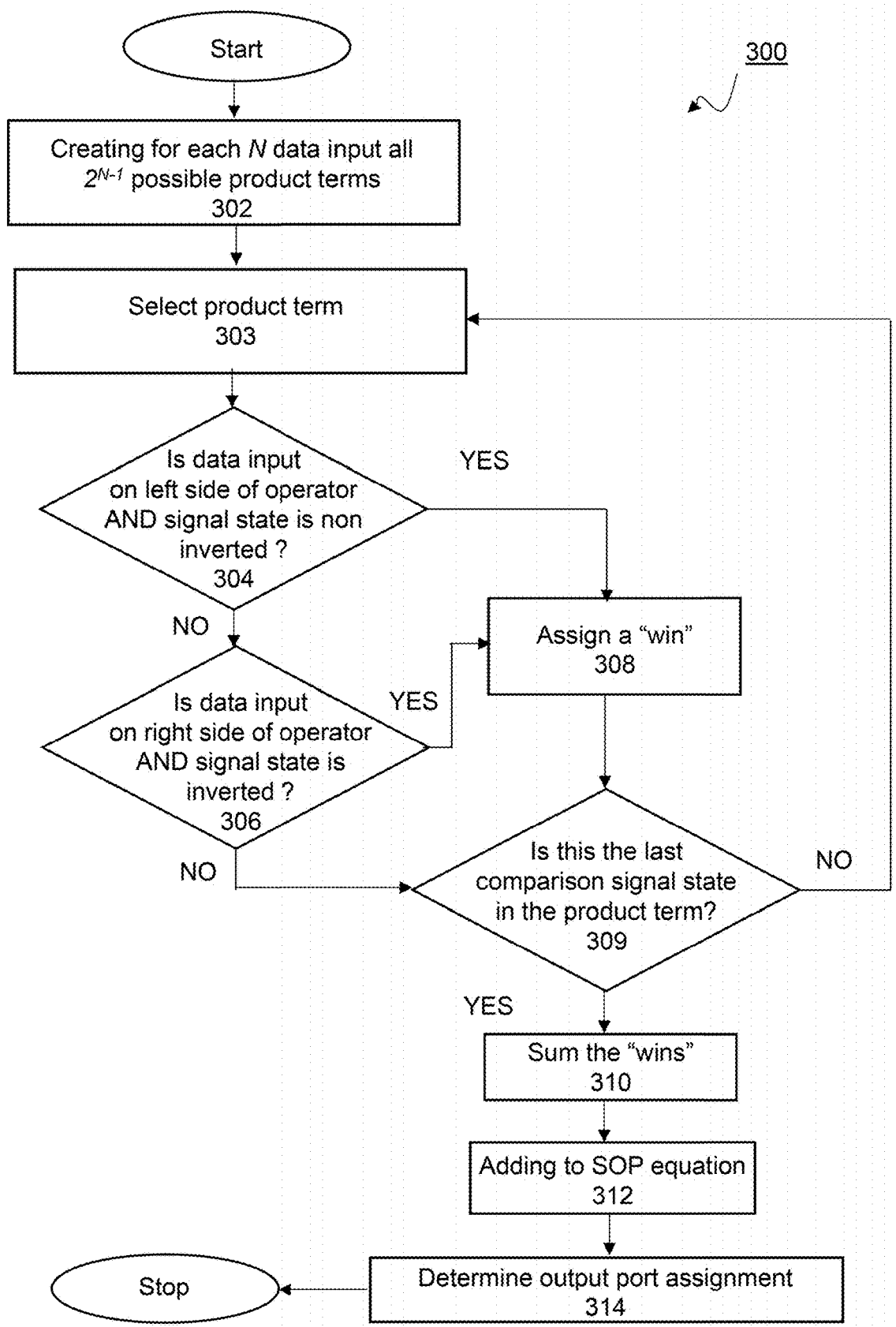
FIG. 7 is a flow chart directed to the design steps for building multiplexer select line signals.

FIG. 7 is a flow chart 300 directed to the design steps for building multiplexer select line signals according to an embodiment of the invention. At step 302 all $2^{N-1}$ possible product terms are created for each of the N data inputs, with each product term containing all of the N-1 comparison signals for this input, and with each comparison signal specified in its inverted or non-inverted state. At step 303, a product term is selected. At step 304, it is determined if the data input signal is on the left side of the comparison operator, and the comparison signal state is non-inverted. If "yes", a "win" is assigned at step 308. If no, at step 306, it is determined if the data input signal is on the right side of the operator, and the comparison signal state is inverted. If "yes", a "win" is assigned at step 308. After a "win" is assigned at step 308, it is determined if this is the last comparison for the product term at step 309. If no", the next comparison result signal and its state in the product term is selected at step 303. At step 310, the "wins" for each product term are summed. Once_the_Number_of_Wins is determined for a given product term, that product term is added to the SOP equation for signal In_X_goes_to_Out_(Number_of_Wins).

All $2^{N-1}$ product terms are distributed to the various In_X_goes_to_Out_Y equations. During the creation of the various In_X_goes_to_Out_Y equations, an In_0_goes_to_Out_Y equation can be created. However, as mentioned previously, In_0_goes_to_Out_Y signals are not used in the Output MUX Block, so no In_0_goes_to_Out_Y equations are put into the SV code for the hardware sorter embodiments.

For an N-sorter, there are N In_X_goes_to_Out_Y equations for each of the N-1 inputs, from In_Nm1 down to In_1. There are then a total N*(N-1) In_X_goes_to_Out_Y equations created in the SV code, each of which is ultimately used as a MUX select line signal in one of the N Output MUX Block equations.

At step 312, each product term is added to the input's particular SOP equation in which each product term in the SOP equation has that same number of "wins". An example of such an In_X_goes_to_Out_Y SOP equation is shown in FIG. 8, which shows the 56 product terms for the 9-sorter signal In_5_goes_to_Out_5. The highlighted product term in FIG. 8 contains the 0 state of ge_7_5, and the 1 states of ge_5_4, ge_5_3, ge_5_1, and ge_5_0, for a total of 5 wins.

The common feature for each product term in FIG. 8 is that each product term in the SOP equation has 5 wins.

At step 314, it is determined which output port the input value is assigned to, which is indicated by the number of "wins". The invention provides a general hardware design with straightforward creation of Comparison signals, Output MUX Select Line signals, and Output MUX signals, that produce an efficient and fast hardware N-sorter that correctly processes duplicate list values, and produces a stable sort of duplicate list values as well. FIG. 9 shows the SV code for a 3-sorter designed in accordance with the invention, which correctly processes duplicate values, and produces a stable sort of those duplicate values.

Single-Stage Hardware N-Sorter with Particular Hardware Type

Advantageously, the above described general design system and methods may be modified for use in FPGAs or when using a particular hardware type. Examples of hardware types include a logic block with either 4 or 8 6-input Look Up Tables (LUTs), and a set of 2-to-1 multiplexers used to combine LUT outputs, if needed.

For discussion purposes, a 4-LUT design logic block is used that has 4 LUTs, 3 2-to-1- multiplexers, 27 LUT and multiplexer select line inputs, and 7 outputs. These logic blocks may be referred to as "slices" or "slice logic blocks". When adapting the general N-sorter design methodology for use in the target FPGAs, the speed of the N-sorter operation is considered by minimizing the number of series slices that an N-sorter's slowest signals propagate through from the input ports to the output ports. Also, the number of LUTs needed for each output multiplexer as well as the total number of LUT resources required for a given sorter design are minimized.

FIG. 10 illustrates a block diagram of a modified general hardware N-sorter according to the invention. According to this embodiment, the general hardware N-sorter design is modified for logic blocks with LUTs and multiplexers, e.g., a logic block with 4 6-input LUTs or an 8-LUT logic block. As shown in FIG. 10, the N-sorter 400 includes a Comparison Signals Block 410, two Output MUX Select Line Signals Blocks 420A, 420B, and an Output MUX (Multiplexer) Block 440. Each block in FIG. 10 represents a group of slices operating in parallel, and the number of slice groups in series is listed for each of the possible paths that go through the Comparison Signals Block 410. The possible paths through the Comparison Signals Block 410 are the slowest paths, the paths that determine propagation delay. The fastest sorters are those in which the slowest signals propagate through only 2 slice groups, and the slowest sorters are those in which its slowest signals travel through all 4 slice groups in FIG. 10.

FIG. 11 is directed to a table that lists various parameters for both the general design embodiment sorters and the sorters created in this LUT sorter embodiment. Row 3 of this table lists the number of N data inputs, plus the number of comparison signals required to sort those inputs. In this data row, it can be seen that both a 2-sorter and 3-sorter have 6 or fewer such signals. As a result, the associated In_X_goes_to_Out_Y signals is implemented in the same 6-input LUT that implements an Output Multiplexer. Therefore, the signals for these two sorters propagate only through the Comparison Signals Block and the Output MUX Block shown in FIG. 10.

When there are Output MUX Block 440 changes, changes are required for the output MUX select lines as well. The select line signal changes are implemented in the 1st MUX Select Line Signals Block 420A and possibly the 2nd MUX Select Line Signals Block 420B.

Since the 2-sorter and 3-sorter output bit multiplexers only require sorter input data and comparison result signals as their inputs, these two sorters have the minimum 2 series slices. With the input signals for both the 2-sorter and 3-sorter propagating through only 2 slice logic blocks, both sorters have approximately the same propagation delay. The signals for these two sorters propagate only through the Comparison Signals Block 410 and the Output MUX Block 440 with the signal flow path identified as "1 2-sorter Equivalent" in FIG. 10.

The estimated propagation delay and the LUT resource usage values for the single-stage hardware N-sorters discussed in this embodiment are shown in the top half of the table of FIG. 12. The LUT resource usage values in this table assume that the data values are 8-bit unsigned integers. The data in the bottom half of the FIG. 12 table pertains to single-stage hardware rank order filters, discussed further below.

The first single-stage hardware sorter that requires SV code modification in this embodiment is the 4-sorter. In Row 3 of the FIG. 11 table, it can be seen that the 4-sorter and larger sorters have significantly more than 6 data input plus comparison signals. In order to implement an output multiplexer, none of these sorters fit the comparison result signals and the N input values into a single 6-input LUT.

However, if In_X_goes_to_Out_Y signals are separately created and then used as the output MUX select line signals, it may be possible to fit all of the needed select line signals, plus the N input values, into a single output MUX LUT. This requires the input signal data flow to go through at least the 1st MUX Select Line Signals Block 420A shown in FIG. 10, so that In_X_goes_to_Out_Y signals can be defined from the comparison signals created in the Comparison Signals Block 410. To see if it is possible to fit all of the select line signals, plus the N input values, into a single 6-input LUT, refer to Row 5 of the FIG. 11 table.

For the 4-sorter, this row of the table indicates that 7 such signals are needed, one more than can be fit into a 6-input LUT. At first glance, it appears that, for the 4-sorter, more than 1 6-input LUT will be needed per output value bit.

FIG. 13 shows SV code for the 4-sorter output port Out 2. In the SV code implemented in the 1st MUX Select Line Signals Block 420A, the functionality of the three select line signals, In_3_goes_to_Out2, In_2_goes_to_Out_2, and In_1_goes_to_Out_2, is combined into 2 select line signals, In_3_OR_2_goes_to_Out_2 and In_3_OR_1_goes_to_Out_2. The *_goes_to_Out_2 truth table in FIG. 13 shows how this functionality is combined.

The uncommented SV code in FIG. 13 shows the definitions of signals In_3_OR_2_goes_to_Out_2 and In_3_OR_1_goes_to_Out_2, how they are combined into 2-bit bus mux_selects_Out_2, and how this 2-bit bus is used in the final Out_2 assignment. Since there are only 6 signals in this final Out_2 assignment, each output bit multiplexer fits into a single 6-input LUT. Each output bit LUT is a 4-to-1 multiplexer, with 2 select lines and 4 data lines. The SV code for the 3 other 4-sorter output port assignments is written in the same way that the Out_2 code is written.

The input signals must now propagate through 3 slice logic blocks in series. The middle slice block is the 1st MUX Select Line Signals Block 420A shown in FIG. 10. Since the 4-sorter input signals must propagate through 3 slice logic blocks, the 4-sorter propagation time is estimated to be 1.5 2-sorter equivalent time units.

A bit output multiplexer for a 4-sorter can be fit into a single 6-input LUT, using the 4-to-1 multiplexer design discussed above. For sorters larger than a 4-sorter, more than 1 LUT is required per output bit multiplexer. In this embodiment, multiple LUTs required for an output bit multiplexer are placed in the same slice logic block. For 5-sorters up to 8-sorters, 2 LUTs are required per output bit multiplexer. The outputs of the 2 LUTs are combined in a 2-to-1 multiplexer to produce the final bit multiplexer output.

SV code used to build the 5-sorter Out_2 bit multiplexers is shown in FIG. 14. Out_2 assignment code using the principles of the general hardware design embodiment is shown towards the top of the figure, but is commented out. The assignment has 5 data inputs, and 4 select line inputs, for a total of 9 inputs. The uncommented code below this shows how this assignment is modified and distributed to 2 LUTs and their common MUX Block. LUT_A is effectively a 2-sorter, and LUT B a 3-sorter.

Simple SV behavioral code is used to define LUT_A and LUT_B, and this behavioral code defines 2 LUTs for each bit of the input data, i.e., 2 LUT_A and LUT_B LUTs for each bit of the input values. The outputs of these two LUTs are combined in the same slice logic block that contains them. Because of this, structural code is used to instantiate "primitives" in order to combine the outputs of the 2 LUTs. The primitive only handles signals with a bit width of 1, so an SV "generate" block is used to separately instantiate one primitive per bit of the output port values. The MUX select line signal is In_4_OR3_goes_to_Out_2, and the code used to create it is shown in FIG. 15. With the inclusion of this signal, the select lines for the Out_2 output bit multiplexers created at the bottom of FIG. 15 now contain all of the functionality of the 4 select line signals shown in the commented Out_2 assignment at the top of the figure.

The creation of the In_4_OR_3_goes_to_Out_2 signal shown in FIG. 15 is similar to the creation of the two 4-sorter MUX select line signals shown in FIG. 13. However, the SOP equation for the 5-sorter In_4_OR_3_goes_to_Out_2 signal contains a total of 7 comparison signals, so this SOP equation cannot be fit into a 6-input LUT. A 7-input LUT can be created using 2 LUTs and their common MUX Block, shown in FIG. 15.

The general hardware embodiment equation for signal In_4_OR_3_goes_to_Out_2 is displayed inside SV comments at the top of FIG. 15. The In_4 and In_3 portions of this OR equation contain a common comparison signal, ge_4_3. The portions of the commented equation in which ge_4_3 is a 1 are broken out into a separate LUT equation, and the same is done for the portions of the equation in which ge_4_3 is a 0. The ge_4_3 term is removed from each modified equation, and then ge_4_3 is used as the MUX select line for the block that combines the two LUT signals.

Unlike the MUX instantiations shown in FIG. 14, the MUX instantiation shown in FIG. 15 is not placed inside an SV generate block. All of the MUX input and output signals in FIG. 15 are simple signals, with a default bit width of 1.

The discussion and figures referenced above use output port Out_2 as an example. The other 4 output ports are designed in a like manner. The input signals for this 5-sorter travel through 3 slice logic blocks in series, like those of the 4-sorter. So the propagation delay of the 5-sorter, also like the 4-sorter, is estimated to be 1.5 times the 2-sorter propagation delay.

The output bit multiplexers for the 6- and 7-sorters are similar to the 5-sorter multiplexers whose SV code is shown in FIG. 14. For a 6-sorter, both output bit multiplexer LUTs are effectively 3-sorters. The 7-sorter has one output bit multiplexer LUT that is effectively a 3-sorter, and one that is a 4-sorter.

The MUX select line signals for these two sorters are defined in an equation which ORs 3 In_X_goes_to_Out_2 signals. Behavioral code for these two MUX select signals, the 6-sorter's In_5_OR_4_OR_3_goes_to_Out_2 signal and the 7-sorters' s In_6_OR_5_OR_4_goes_to_Out_2, is shown at the top of FIG. 16. All of the equations shown in FIG. 16 are used for output port Out_2. The equations for the signals used for other output ports are easily constructed in the same manner.

If these two signals are created directly using this behavioral code, then an additional series slice is needed in order to produce the OR signals. Instead, these two signals are created using additional slice resources not previously discussed, carry chain logic. The slice carry chain logic is used automatically by the synthesis tool when creating 2-value comparison signals, but this logic can also be used for other purposes, such as creating AND, OR functions of the 6-input LUT outputs.

It is posited that one skilled in the art can create a 3-LUT OR signal using the carry chain logic. When the carry chain logic is used, the slowest 6-sorter and 7-sorter signals still propagate through only 3 slices in series, just like the slowest 4-sorter and 5-sorter signals.

The output bit multiplexers for the 8-sorter are similar to those of 5-, 6, and 7-sorters, as they all use 2 LUTs per output value bit. The output MUX select signal for the 8-sorter, In_7_OR_6_OR_5_OR_4_goes_to_Out_2, is an OR of 4 In_X_goes_to_Out_2 signals, and is shown in the middle of FIG. 16.

Row 6 of the FIG. 11 table shows that there are 7 comparisons in each In_X_goes_to_Out_Y product term for an 8-sorter. The 8-sorter's individual In_X_goes_to_Out_2 SOP signals require 2 LUTs and their associated MUX, so the carry chain logic cannot be used to produce the OR signal.

In this case, the 4-LUT OR signal is produced in an additional series slice, in FIG. 10's 2nd MUX Select Line Signals Block, and the slowest sorter signals now propagate through 4 slice blocks in series. The process for creating an 8-sorter's 7-input In X_goes_to_Out_2 equation is the essentially the same process that was shown for creation of the 5-sorter signal In_4_OR_3_goes_to_Out_2 signal, previously discussed and shown in FIG. 15.

Implementation of Hardware 9-sorters Using 4 Logic Blocks in Series

As mentioned just above, the In_X_goes_to_Out_Y product terms for an 8-sorter require a 7-input LUT, which is created in a single slice logic block using two LUTs and their common MUX Block. There are 8 comparison signals in each 9-sorter In_X_goes_to_Out_Y product term, as is listed in Row 6 of the FIG. 11 table, so an 8-input LUT is required for these signals. As is shown in Row 7 in the sorter table, the 9-sorter's 8-input LUT requires the combination of 4 6-input LUTs in a single slice.

An example of how this is done uses the 9-sorter In_5_goes_to_Out_5 SOP equation shown previously in FIG. 8. This equation is broken up into 4 sections using blank lines. In each section, there is a specific paired state for signals ge_8_5 and ge_7_5. Each of these sections is now placed into a separate LUT signal, as shown in FIG. 17, and the ge_8_5 and ge_7_5 comparison signals are removed from the equations. Each equation now contains only 6 comparison signals, and therefore fit in a 6-input LUT.

The ge_8_5 and ge_7_5 signals are now used as MUX select line signals in order to combine the outputs of the four LUTs, as is shown in FIG. 18. This is the same type of process used to create the 5-sorter signal In_4_OR_3_goes_to_Out_2 signal, shown in FIG. 15, and the 8-sorter In_X_goes_to_Out_Y signals, except now there are two levels of MUX Blocks used to combine the LUT outputs.

Each of the 9-sorter's In_X_goes_to_Out_Y signals now requires 4 LUTs, which significantly increases a 9-sorter's resource usage. However, a 9-sorter's resource usage also increases due to another factor. Since there are now 9 data inputs for each output bit multiplexer, an output bit multiplexer no longer fits into 2 LUTs. At least 3 LUTs per bit are now required.

A portion of the 9-sorter 3 LUT design for Out_2 is shown in FIG. 19. Once again, output port Out_2 is used as an example. All of the other output ports are designed in a similar manner. This design uses all of the logic in a 4-LUT slice logic block. Output MUX select line signals shown for this design are shown at the bottom of FIG. 16. Since these OR signals are created in the 2nd MUX Select Line Signals Block, shown in FIG. 10, the input signals for this 9-sorter design propagate through 4 slice logic blocks in series.

Although only 3 LUTs are used to produce output bit signals in this design, the design appears to use all 4 slice logic LUTs. Row 11 in the FIG. 11 sorter table notes that this use of 3 LUTs in a slice logic block may effectively monopolize the use of all 4 LUTs.

As noted earlier, the propagation delay and hardware resource usage values for the 2-sorter up to 9-sorter designs, implemented using the 4-LUT slice logic block, are shown in the top half of FIG. 12. The LUT resource numbers in this table for the 9-sorter assume that all 4 LUTs in each output multiplexer slice block are used.

Until now, this set of embodiments has focused on designs in which the primary logic portions of hardware sorter designs are implemented in, and take advantage of, a 4-LUT slice logic block such as that found in multiple Xilinx FPGA product families. In two other Xilinx FPGA product families, Ultrascale and Ultrascale+, Xilinx provides an 8-LUT slice logic block.

An 8-LUT slice logic block is essentially a combination of two 4-LUT slice logic blocks, plus one additional 2-to-1 multiplexer, which combines MUX outputs of two 4-LUT logic block groups. As provided above, all of the 4-LUT sorter designs discussed above can be implemented in this 8-LUT slice logic block as well. Designs that can only be met with an 8-LUT slice logic block are now discussed.

Row 7 in the FIG. 11 sorter table shows that a 10-sorter requires 8 LUTs in a slice block for each In_X_goes_to_Out_Y product term. Only an 8 LUT slice block can be organized as the 9-input LUT needed for these signals.

Fitting the 9-input LUT signals into the 8-LUT slice block uses the same basic procedure used to fit the 9-sorter's 8-input LUT signals into a 4-LUT slice. The 9-sorter procedure was previously discussed and referenced FIGS. 8, 17, 18. For the 10-sorter, 3 comparison signals are removed from each In_X_goes_to_Out_Y product term, and these 3 signals are used as the MUX select lines.

The 10-sorter output bit multiplexers are implemented using 3 LUTs in a slice. As with the 9-sorter output bit multiplexers, a MUX Block is required for such a design, so it is reasonable to assume that this design monopolizes all 4 LUTs whose outputs ultimately feed into the MUX Block.

Using the 8-LUT slice logic block, it is possible to construct a 4-sorter in which the input signals propagate through only 2 FIG. 10 logic blocks, just like the 2-sorter and 3-sorter input signals.

FIG. 20 displays behavioral code for output port Out_2 indicating how this 4-sorter is designed. The FIG. 20 code is developed by initially creating all 24 (4 factorial) permutations of the distinct numbers 3, 2, 1, and 0, and treating each permutation as a 4-sorter input list. The states of the 4-sorter's 6 comparison signals are determined for each of the 24 permutations. For a given output port, 8 LUT equations are created, one for each permutation of the 3 comparison signals ge_3_2, ge_2_1, and ge_1_0. The comparison signals available for each LUT equation are the other 3 comparison signals, ge_3_1, ge_3_0, and ge_2_0. Finally, these 8 LUT equations are combined using 2-to-1 multiplexers, with the comparison signals ge_3_2, ge_2_1, and ge_1_0 used as MUX select lines.

The single-stage hardware sorter discussed above pertain to a full N-to-N sort of N input values. In an N-to-N single-stage hardware sorter, all N values become output values, except that now they are in a stable sorted order.

Single-Stage Hardware Rank Order Filters

Now, single-stage N-to-M hardware sorters are discussed, in which M<N. In other words, only the output ports for certain rank positions in the sorted list are created in the hardware. These types of sorters are often called rank order filters. Rank order filters often produce only a single output (max-filters, min-filters, median-filters), but can produce several outputs such as a lowest-2-of-5-values filter.

Figure 24:
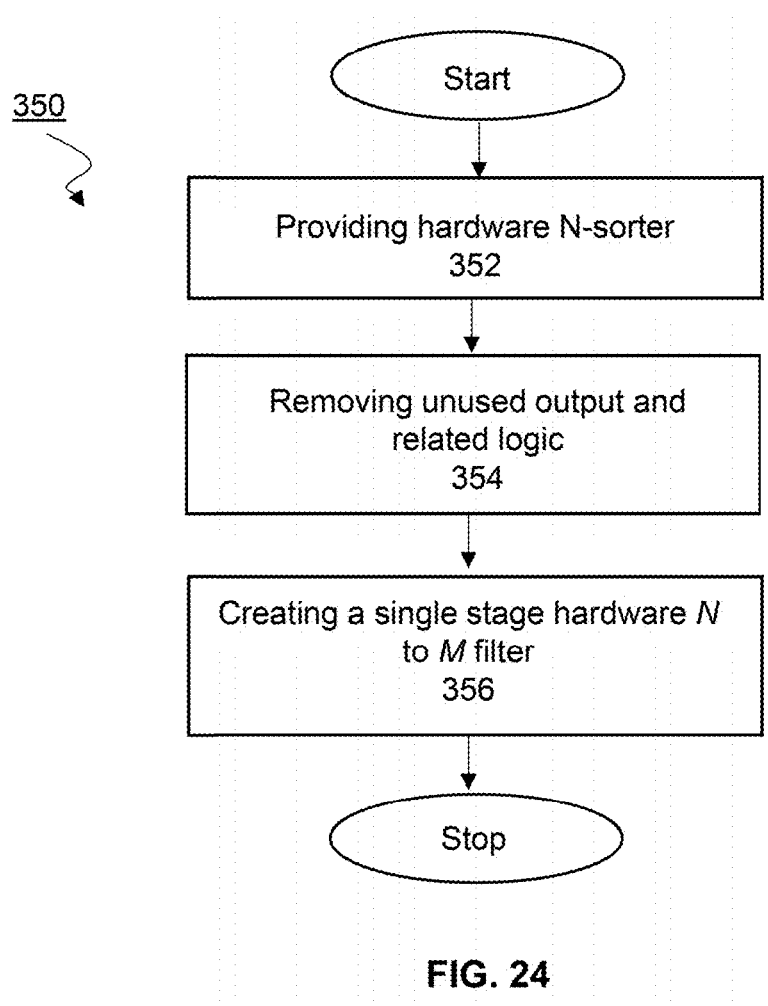
FIG. 24 illustrates a flow chart for creating N-to-M filter from a general hardware N-sorter.

FIG. 24 illustrates a flow chart 350 for creating N-to-M filter. At step 352, a hardware N-sorter is provided. At step 354, all of the unused outputs are removed as well as all of the logic that was only used for the removed outputs. At step 356, a single-stage hardware N-to-M filter is created. All of the N*(N−1)/2 comparison signals are still required. At its simplest, a N-to-M hardware filter has reduced hardware usage, but the same propagation delay as the full N-to-N hardware sorter.

An N-median filter always has approximately the same propagation delay as the full N-sorter, as the In_X_goes_to_Out_Y SOP equations for the median value in an N-sorter, with N odd, always have both states of each comparison signal in its various product terms. Examples of single-stage hardware N-median filters, which are easily created from the associated N-sorter, are 3-median, 5-median, 7-median, and 9-median filters.

Single-stage hardware N-median filters are important in applications to reduce noise. For example, finding the median of 9 values may be a task used to reduce noise in 3×3 pixel windows in images. This is normally implemented in multistage networks of 2-sorters, but can now be performed faster using a single-stage 9-median hardware filter created from a hardware 9-sorter.

In the bottom half of FIG. 12, propagation delay and LUT resource usage data for single-stage hardware N-max filters is listed, for filters implemented in a 4-LUT slice logic block. The propagation delay and hardware resource usage of a 9-median filter is also listed, as the 9-median values match those of the 9-max filter. The equivalence of the 9-max and 9-median data is emphasized using shading in FIG. 12.

When using a slice logic block, it is possible to create N-max and N-min hardware filters that are faster than the associated N-sorter. The propagation delay improvement is not possible for hardware filters when the input signals for the full hardware N-sorter only travel through 2 of the logic blocks shown in FIG. 10, as the inputs signals for these N-sorters already have the minimum possible propagation delay. The hardware N-sorters which already have the minimum possible propagation delay are the 2-sorter and the 3-sorter, when designed with either of the slice logic blocks.

Single-stage max and min filters for N>4 values have reduced propagation delay because the In_X_goes_to_Out_Y SOP equations for the max and min output values are unique. These SOP equations contain only one product term. Therefore, only one state of a component comparison signal is possible in an In_X_goes_to_Out_Y equation when Out_Y is the min or max value in the output list. Furthermore, when a given comparison signal is found in a 2nd In_X_goes_to_Out_Y equation for the same min or max Out_Y, the state of this comparison signal in the 2nd equation will always be the opposite state from that found in the 1st equation.

Examples of these unique max and min SOP equations are shown in FIG. 21, which shows SV pseudocode for both 4-max and 4-min hardware filters. The In_X_goes_to_Out_Y equations are commented out, since the In_X_goes_to_Out_Y signals themselves are not used. Rather the comparison signals are used directly to create the output bit multiplexers.

SV pseudocode shows SV equations, but without "assign" statements and "wire" declarations. Behavioral 2-to-1 multiplexer pseudocode is used in place of generate blocks and structural instantiations. The example SV code referenced in the application permits one skilled in the art to use the behavioral pseudocode examples referenced in this embodiment set to build successful rank order hardware designs.

As mentioned above, the propagation delay and hardware resource usage values for the 2-max up to 9-max filter designs, implemented using the 4-LUT slice logic block, are listed in the bottom half of FIG. 12. The details of these N-max designs, starting with the 4-max design, are now described followed by N-max designs that require the use of an 8-LUT logic block.

The equations found in FIG. 21 that are used to create the 4-max and 4-min outputs show the unique characteristics of the min and max In_X_goes_to_Out_Y SOP equations. These unique characteristics allow min and max filters to be easily implemented using the comparison result signals directly, in combination with the slice 2-to-1 MUXF*multiplexers and ternary/conditional notation for LUT equations. Although the 4-sorter input signals propagate through 3 of the logic blocks shown in FIG. 10, the 4-max and 4-min input signals only propagate through the minimum 2 blocks, the Comparison Signals Block and the Output MUX Block.

Note that the 4-min comparison signals in the In_X_goes_to_Out_Y equations are the same as found in the 4-max equations, but the 4-min comparison signals always have the opposite state from the states found in the 4-max equations. For the larger filters discussed in the rest of this embodiment set, only N-max filters will be defined. One skilled in the art will have no problem creating a comparable N-min filter using the N-max equations.

An N-max compact table is shown in commented lines below the final Out_3 equation in FIG. 21. This table shows which comparison signals and signal states direct a particular input to the max output port. This type of table is used by itself to guide the design of any hardware N-max filter, and this is exactly what has been done when creating the equations for larger N-max filters in the remainder of these embodiments.

FIG. 22 shows how a 5-max filter is created, in a manner similar to creation of a 4-max filter shown in FIG. 21. Commented In_X_goes_to_Out_Y equations are no longer shown, and they are replaced by a compact table which displays the same information. The 5-max design uses all of the resources in the 4-LUT slice logic block. The input signals for this 5-max filter propagate through only the minimum 2 logic blocks shown in FIG. 10, so the 5-max filter is estimated to have the same propagation delay as a 2-sorter.

SV Pseudocode for an 8-max hardware filter is shown in FIG. 23. The input signals for this hardware 8-max filter also propagate through only 3 of FIG. 10 logic blocks in series, even though 8-sorter input signals propagated through all 4 of the logic blocks in series, However, the 8-max filter output bit multiplexers now require 3 LUTs per output bit. Because the slice logic MUXF8 block is used in this design, it is reasonable to assume that the design effectively uses all 4 slice LUTs per output bit.

Definitions of the 2 In X_goes_to_Out_7 signals, and the 4 In_Xa_OR_Xb_goes_to_Out_7 signals are not shown. However, a skilled designer will be able to create the definitions of these signals, based on the previous example code.

Single-Stage N-Max Hardware Filters Using 8-LUT Slice Logic Blocks are now discussed. A 6-max design is implemented in an 8-LUT slice logic block using ge_5_4, ge_3_2, and ge_1_0 as the mux select lines. The inputs for such a design propagate through only the 2 minimum logic blocks shown in FIG. 10, and therefore this 6-max filter has an estimated propagation delay that is the same as that of a 2-sorter. The details of such an 8-LUT 6-sorter design are left to one skilled in the art, using the 4-LUT 4-max and 5-max design principles described above, and shown in FIG. 21 and FIG. 22.

The 9-max filter design using an 8-LUT slice block is very similar to the design using a 4-LUT slice block, and very similar to the full 9-sorter design. However, the slowest signals for the design using the 8-LUT block propagate through only 3 slice blocks in series, versus 4 series slices for the 4-LUT design. In the common design, there are two OR-of-3 signals used as output mux select signals. The bottom two signal definitions in FIG. 16 show examples of how these signals are created for a 9-sorter, and the bottom section of FIG. 19 shows how they are used. When using a 4-LUT slice block for a 9-max design, these signals are created in the 2nd MUX Select Line Signals Block at the bottom left in FIG. 10. However, when using an 8-LUT slice block for a 9-max design, these signals, the slowest signals in the 9-max design, are created in the 1st MUX Select Line Signals Block. Therefore, the slowest 9-max signals, using an 8-LUT slice block, now propagate through only 3 series slices.

Multiway Merge Sorting Networks

A group of sorting networks, and the equations and algorithms needed to build such networks is referred to as an Unified Column Merge Sort, or UCMS for short. A UCMS sorting network will be built in hardware, presumably using a type of hardware such as those designed using a Hardware Description Language (HDL).

The UCMS sorting networks use merge sort algorithms, which merge 3 or more sorted lists of values into a single sorted list. The UCMS system can also be used to build sorting networks which merge 2 sorted input lists in a single sorted output list. The main advantage of the UCMS system is in its ability to create fast and resource-efficient multiway merge sort networks, in which 3 or more sorted lists are merged into a single sorted list.

According to the invention, if a UCMS network merges k sorted lists, then single-stage hardware 2-sorters up to k-sorters will be connected in the UCMS network. The use of carefully designed single-stage hardware N-sorters, which sort 3 or more values at a time, is what allows a UCMS multiway merge sort network to operate faster, sometimes using fewer hardware resources, than O-EMS networks. The systematic design of the UCMS networks incorporate the single-stage hardware sorters described above.

When designing a merge sort process, UCMS combines the input sorted lists as columns in a 2-d rectangular structure, and then performs a sequence of operations on the rectangular structure, in order to produce a single sorted list in the rectangle. The number of sorted lists to be merged is therefore called Ncols, the number of columns in each rectangle.

The final sorted order for a 4-column, 8-row UCMS rectangle is shown in FIG. 25. There are 32 distinct values in this rectangle, 32 down to 1. The UCMS sorted order is a row major order, with the maximum list value at the top left, and the minimum value at the bottom right of the rectangle.

FIG. 26 provides a table of notations for UCMS rectangles and the overall UCMS multiway merge sort network. The columns in a UCMS rectangle are numbered from (Ncols-1) in the leftmost column to 0 in the rightmost column. The rows in the Sequence q rectangle are numbered from (Nrowsq-1) in the top row to 0 in the bottom row. The maximum value in each sorted column is found at the top, in row (Nrowsq-1), and the minimum value is found down in row 0. Likewise, the maximum value in a sorted row is found to the left, in column (Ncols-1), and the minimum value is found to the right, in column 0.

In principle, lists of any length Nfinal can be merge sorted in a UCMS network, whenever $N_{final}$>Ncols. However, in order to simplify the discussion of UCMS networks, a "standard" UCMS network is defined, one which satisfies Equation (1) below with all four parameters being positive integers:

$$Nfinal = Nrows_0 * Ncols^{qfinal} \qquad \text{Equation (1)}$$

The four parameters in Equation (1) are all positive integers, and they are defined in the FIG. 26.

The UCMS sorting network discussions that follow will primarily reference a 4-column standard UCMS example, in which Nfinal=32; Ncols=4; $Nros_0$=2; qfinal=2. FIG. 27 shows the sort operations in Sequence 0 of this 4-column example. The merge sort sequences for the 4-column UCMS example, Sequence 1 and Sequence 2, are shown in FIG. 28 and FIG. 29, respectively.

Standard UCMS 3-column and (prior art O-EMS) 2-column examples are also shown, in FIG. 30 and FIG. 31, respectively. The 3-column example parameters are Nfinal=9; Ncols=3; $Nrows_0$=3; qfinal=1, and the 2-column example parameters are Nfinal=8; Ncols=2; $Nrows_0$=2; qfinal=2.

In these figures, a sequence of arrows in a single line identifies a group of values to be sorted, and then placed back into the same rectangle locations, but now in sorted order. The Sequence 0 arrows indicate column sorts, where all values in each column are sorted. Merge sort sequence arrows either indicate a row sort or a diagonal sort. For a row sort, all selected values are in the same row. For a diagonal sort, which will be discussed in more detail later on, the selected values are all in different rows and columns.

The arrows point from the location where the minimum value will be placed toward the location where the maximum value will be placed. For a sort group of locations along a diagonal, the minimum sorted value will be put in the bottom left diagonal location, at the arrow base, and the maximum sorted value will be placed in the upper right diagonal location, at the arrow point. In a sort group of locations for a row sort, the minimum sorted value will be put in the farthest right arrow location, the arrow base, and the maximum value will be put into the farthest left arrow location, at the arrow point. For the Sequence 0 column sort, the minimum sorted location and the arrow base is at row 0; the maximum value and the arrow point is at the maximum Sequence 0 row location, $Nrows_0$-1.

After sorting, the sorted minimum value will go to the leftmost location in a sort group, and the sorted maximum value will go to the rightmost location in the sort group. There is one diagonal sort group of 4 values shaded in FIG. 29.

A UCMS sorting network always contains at least one merge sort sequence, and it may contain several. The number of merge sort sequences in a standard UCMS network is given by positive integer parameter qfinal. Since a merge sort sequence requires sorted input lists, there must be a mechanism to create the initial sorted lists. It is assumed that hardware $Nrows_0$-sorters are used to create the initial sorted lists, in a stage called Sequence 0. Sequences 1 and higher will always be merge sort sequences.

Sequence 0 for the 4-column UCMS example is shown in FIG. 27. As is shown in the first row of the table in FIG. 32, there are Nfinal/$Nrows_0$ hardware sorters in Sequence 0, and each single-stage sorter is an $Nrows_0$-sorter. For the 4-column example, there are then (32/2)=16 2-sorters in Sequence 0. For the 3-column example shown in FIG. 30, there are (9/3)=3 3-sorters in Sequence 0. Sequence 0 for the 2-column example shown in FIG. 31 has (8/2)=4 2-sorters.

Once again, for each of the 3 UCMS examples, each column of the Sequence 0 2-d array is sorted by a hardware $Nrows_0$-sorter. After sorting, the column values remain in the same column, but are now in sorted order, with the maximum value in row ($Nrows_0$-1), and the minimum value in row 0.

The direct sort Sequence 0 is a single-stage sequence. Merge sort sequences have 2 or more stages. In each "stage", all of the sort operations are performed in parallel, using hardware sorters. Historically, a sorting network stage always had the propagation delay of a 2-sorter, since only 2-sorters were used in each stage. UCMS stages typically contain hardware sorters other than 2-sorters, and the stage propagation delay is the propagation delay of the slowest hardware sorter in the stage. To standardize stage propagation delay values, the propagation delay of the slowest hardware sorter is referenced to the propagation delay of a 2-sorter in as reasonable manner as is possible.

For the 3 standard UCMS examples, all of the Sequence 0 single-stage hardware sorters are either 2-sorters or 3-sorters, both of which have essentially the same propagation delay when using hardware design blocks with 6-input LUTs, such as the 4-LUT slice logic block discussed above. Therefore, when using the 4-LUT slice logic block, all of the example Sequence 0 stages have a propagation delay equivalent to the propagation delay of 1 2-sorter.

Figures 32, 33:
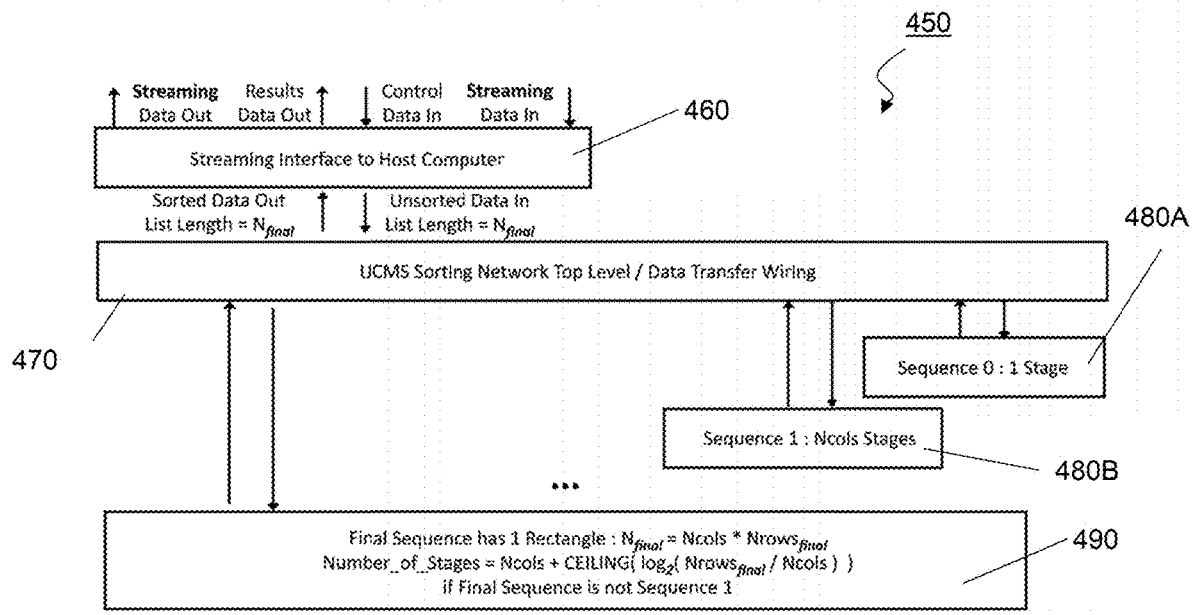
FIG. 32 is a table of a combined equation.
FIG. 33 illustrates a block diagram of a top level UCMS network.

Refer to FIG. 33, which gives a top level view of a UCMS network constructed in hardware. The UCMS network itself encompasses the "UCMS Sorting Network Top Level" block and the blocks connected below it. The Streaming Interface to Host Computer block is not a part of the UCMS network itself. The streaming interface block would be used to transfer data back and forth between a host computer and the UCMS network constructed in hardware.

FIG. 33 suggests that a list of unsorted data is streamed into the hardware from a host computer, and the list of sorted data is then streamed back out from the hardware to the host computer. However, the input list of data to be sorted may already reside in memory located in the hardware or directly accessible to it. The UCMS output list of sorted data may also be written to memory inside the hardware or accessible to it.

FIG. 34 displays the algorithm which shows the top level UCMS network flow, from the input 1-d unsorted list of values to the output 1-d sorted list of those same values. The standard flow begins with the set of parallel hardware sorts in Sequence 0, and then progresses through a series of merge sort sequences, until the final 1-d sorted list has been produced.

As specified in the FIG. 34 algorithm, the 2-d array of values in Sequence 0 has $Nrows_0$ rows, and (Nfinal/Nrowso) columns. Each column of the 2-d array is then sorted with an $Nrows_0$-sorter.

After Sequence 0, the algorithm shown in FIG. 34 loops through each of the merge sort sequences, numbered 1 to final. In each merge sort sequence, the single input 2-d array has Nrowsq rows and (Nfinal/$Nrows_0$) columns, with each column of data sorted from a maximum at row Nrowsq-1 to a minimum at row 0. In Sequence q, each successive set of Ncols columns in this input 2-d array is then split off from it and used to form a rectangle, with Nrowsq rows and Ncols columns in the rectangle. The number of rectangles in each Sequence q is:

$$Num\_rectanglesq=Nfinal/(Nrowsq*Ncols).$$

In the final sequence, Sequence final, there is only 1 rectangle. As shown in the FIG. 34 algorithm, $Nrows_1$=$Nrows_0$ when q=1 and Nrowsq=Nrowsq$_{-1}$*Ncols when q>1. These equations can be combined in the second row, Nrowsq column, of the FIG. 32 table, for q>1. The combined equation is $Nrows_0*Ncolsq^{q-1}$ Also shown in the FIG. 34 algorithm, Num_rectangles$_1$=Nfinal/($Nrows_1$*Ncols) when q=1, and Num_rectanglesq=Num_rectanglesq$_{-1}$/Ncols when q>1. These two equations can be combined, when q>1, and this combined equation is Nfinal/($Nrows_0*Ncols^q$).

After the single-stage Sequence 0, the first merge sort sequence is called Sequence 1. If Nfinal<$Ncols^2$, Sequence 1 is also the last merge sort sequence. Sequence 1 is a template for any merge sort sequences after Sequence 1, as all of the stages in Sequence 1 are found in any later sequence.

Note that Sequence 1 is the last sequence in the Ncols=3 FIG. 30. In this example, Nfinal=9<$Ncols^2$=$3^2$=9, so Sequence 1 is the last merge sort sequence. FIG. 30 shows that the single Sequence 1 rectangle is in correct sorted order after the last Sequence 1 stage. FIG. 35 shows the Sequence 1 stages for sorting networks with Ncols=2 to 9, reading down the appropriate column. In the first stage in any merge sort sequence, each row in each rectangle is sorted. Any stage after the initial row sort stage contains "diagonal" sort operations. In a diagonal sort stage, values to be sorted in a hardware sorter are selected along a diagonal in the rectangle. Each of the diagonals for a given stage has a specific row delta and column delta, when moving from one selected value to another selected value along the diagonal.

There is always a diagonal starting from the bottom left corner, at row 0, column (Ncols-1). If the row delta and column delta values (R/C) are both 1 (1/1), then the next selected value will be at row 1, column (Ncols-2). If Ncols and Nrowsq are both>2, then the next selected value will be at row 2, column (Ncols-3), and so on. Given a specific R/C value set, all possible diagonals are defined, and the values along each diagonal are sorted. In Sequence 1, the stage that follows the initial row sort stage is always an R/C 1/1 diagonal stage.

In FIG. 31, there are only 2 stages in Sequence 1, the initial row sort stage and the R/C 1/1 diagonal stage. This matches the Ncols=2 column in the FIG. 35 table. When (Ncols>2) in Sequence 1, there are additional diagonal stages after the R/C 1/1 stage. Each additional stage has a constant row delta of 1, and the column delta increments by 1, relative to the previous stage. The next stage after the R/C 1/1 stage is then an R/C 1/2 stage. If there is a stage after the R/C 1/2 stage, it will be an R/C 1/3 stage, and so on. The last stage in any sequence has an R/C value of 1/(Ncols−1).

This behavior is easy to see in FIG. 28 and FIG. 30. In the Ncols=3 example FIG. 30, there are 3 stages in Sequence 1, and the last stage has an R/C diagonal of 1/2. In the Sequence 1 FIG. 28 for the Ncols=4 example, there are 4 stages in Sequence 1, and the last stage has an R/C diagonal of 1/3. It should also be clear from these examples and the data in the FIG. 35 table that the number of stages in Sequence 1 is equal to Ncols.

The last row in the FIG. 35 table is labelled "Final Row Sort". The information in this row indicates whether there is an "IntRows" sort in the last sequence stage. An IntRows sort is a sort of the internal values in each internal row of the sequence rectangles. The internal values in a row are the values in column Ncols-2 down to column 1, all columns except the leftmost and rightmost columns. The internal rows are rows Nrowsq-2 down to row 1, all rows except top and bottom rows. An IntRows sort is required whenever Ncols is an even number>2, and Nrowsq>2. When Ncols=4, Ncols is obviously an even number >2. However, in the Ncols=4 Sequence 1 example shown in FIG. 28, Nrowsq=Nrows$_1$=2. There are no internal rows, so there is no IntRows sort in Stage 3, the final Sequence 1 stage.

An IntRows sort is shown in Stage 5 of the 4-column Sequence 2 FIG. 29. In this case, Nrows$_2$=8 and there are 6 internal rows. In each of the 6 rows, a 2-sorter is used to sort the values found at columns Ncols-2=2 and Ncols-3=1.

As mentioned above, Sequence 1 is a template for any additional merge sort sequences. Any Sequence q, where q>2, will have the same stages as Sequence 1, plus 1 or more extra stages. This means that Sequences 2 and higher will include all of the stages shown in the FIG. 35 table. The extra stages for Sequences 2 and higher are inserted after the initial row sort stage, and before the R/C 1/1 diagonal stage.

Going from Sequence 1 to Sequence 2, the number of rows in a rectangle is multiplied by Ncols, and the number of rectangles is divided by Ncols. For the 4-column UCMS example, there are 2 rows shown in each Sequence 1 rectangle shown in FIG. 28, and there are 2*Ncols=2*4=8 rows in each Sequence 2 rectangle shown in FIG. 29. There are 4 Sequence 1 rectangles, as shown in FIG. 28, and there is 4/Ncols=4/4=1 rectangle in Sequence 2, as shown in FIG. 29, so Sequence 2 is the last sequence for the 4-column example.

For the 2-column UCMS example, as shown in FIG. 31, there are 2 rows in each Sequence 1 rectangle and there are 2*Ncols=2*2=4 rows in each Sequence 2 rectangle. There are 2 Sequence 1 rectangles and there is 2/Ncols=2/1=1 rectangle in Sequence 2, so Sequence 2 is also the last sequence for the 2-column example.

In the 4-column UCMS example Sequence 2, there is one extra stage relative to Sequence 1, as can be seen when comparing FIG. 28 and FIG. 29. The extra stage is Stage 2, which is inserted between the Stage 1 row sort stage, and the R/C 1/1 Stage 3. Stage 2 has an R/C diagonal value of 2/1; there is a row delta of 2 and a column delta of 1 between successive diagonal location selections.

In the 2-column UCMS example Sequence 2, there is also one extra stage relative to Sequence 1, as shown in FIG. 31. Once again, the extra stage is Stage 2, which is inserted between the Stage 1 row sort stage, and the R/C 1/1 Stage 3. The 2-column Stage 2 also has an R/C diagonal value of 2/1.

Once Nrowsq is known for a Sequence q, with q>1, the number of extra stages and the row delta for the first extra stage are calculated. The row delta for the first extra stage, Stage 2 in the sequence, is also the maximum row delta in the sequence diagonal stages. The extra stage calculations are shown below:

$$\text{Number\_Extra\_Stages}_q = \text{CEILING}(\log_2(\text{Nrows}_q/\text{Ncols})).$$

$$\text{Maximum\_Row\_Delta}_q = \text{Stage\_2\_Row\_Delta}_q = 2^{Number\_Extra\_Stages_q}.$$

For Sequence 2 in the 4-column example, these equations evaluate to:

$$\text{Number\_Extra\_Stages}_2 = \text{CEILING}(\log_2(8/4)) = 1.$$

$$\text{Maximum\_Row\_Delta}_2 = \text{Stage\_2\_Row\_Delta}_2 = 2^1 = 2.$$

And for Sequence 2 in the 2-column example, these equations are nearly identical:

$$\text{Number\_Extra\_Stages}_2 = \text{CEILING}(\log_2(4/2)) = 1.$$

$$\text{Maximum\_Row\_Delta}_2 = \text{Stage\_2\_Row\_Delta}_2 = 2^1 = 2.$$

Sequence 2 in the 4-column and 2-column examples only had one extra stage, with a row delta of 2. If a merge sort sequence has several extra stages, the row delta is divided by 2 for each successive stage after Stage 2. As mentioned above, the final extra stage always has a row delta of 2. The last extra stage for any merge sort Sequence q, with q>1, will always have an R/C value of 2/1.

In the 4-column and 2-column UCMS examples, the last sequence was Sequence 2. In both cases, Sequence 2 had only 1 extra stage, when compared to the associated Sequence 1. The table in FIG. 36 lists parameters and the stage execution order for a more comprehensive example. The data in the table has been calculated for a UCMS network with Nfinal=243=3$^5$; Ncols=3. There are 24 stages in this network flow, and the stage order is indicated using the numbers in the columns in the right portion of the table, starting with the Sequence 0 "Sort All Cols" column. The shaded stages in this table are the extra stages for Sequences 2, 3, and 4.

A UCMS Ncols=2 merge sort algorithm operates on rectangles in which the 2 columns are constructed from the 2 sorted input lists. In O-EMS, the two sorted input lists are split into odd and even lists. The odd and even lists are separately sorted, and then merged together in the last sequence stage.

The equivalence of the two algorithms is displayed in the 2-column example shown in FIG. 31. In this figure, the even lists consist of the rectangle locations with even row numbers, which are shaded, and the odd lists are the rectangle locations with odd row numbers.

In the 2-column Sequence 1, the first stage is the row sort stage, in which even and odd rows are separately sorted. The last stage of the 2-stage Sequence 1 is the R/C 1/1 diagonal stage. This is the stage in which the sorted odd and even lists are merged together.

In the 2-column Sequence 2, there is an extra stage between the row sort stage and final R/C 1/1 stage. This intermediate stage is a diagonal stage with an R/C values of 2/1. Notice that in this intermediate stage, the sort operations only occur between values in the same odd or even list. In the final stage, which is once again the R/C 1/1 stage, the sorted odd list and the sorted even list are merged together. This short example does indicate that the O-EMS and UCMS Ncols=2 algorithms are the same.

FIG. 37 shows the sequence and stage flow for a non-standard UCMS sorting network example with Nfinal=8; Ncols=3; $Nrows_0$=2, 3, 3;qfinal=1. This sorting network is derived from the standard UCMS Ncols=3 example, shown in FIG. 30. Effectively, the upper left rectangle location is removed from the FIG. 30 example in order to produce the FIG. 37 flow.

With the upper left rectangle location now gone, Sequence 0 in FIG. 37 is modified versus FIG. 30, since there are only 2 3-sorters, and 1 2-sorter used in the FIG. 37 Sequence 0. Stage 1 in Sequence 1, the row sort stage, is also modified, and for the same reason.

The unsorted input list of 8 values for FIG. 37 is the same that was used for the standard Ncols=2 flow in FIG. 31. When comparing the two figures, it is clear that 6 stages are needed for the standard Ncols=2 flow, but only 4 stages are needed for the non-standard Ncols=3 flow, while sorting the same set of 8 values. As noted earlier, stages with 3-sorters have the same propagation delay as stages with 2-sorters, when the design is implemented using hardware with 6-input LUTs. The non-standard 3-column UCMS sorting network has a speedup of 6/4=1.5 versus the state-of-the-art O-EMS sorting network, identical to the UCMS 2-column sorting network.

The O-EMS/2-column sorting network uses 19 2-sorters in its Nfinal=8 sorting network, as shown in FIG. 31. Also as noted earlier, a 3-sorter uses 1.8 times the resources of a 2-sorter, when designing with 6-input LUTs. In the non-standard Ncols=3; Nfinal=8 sorting network, as shown in FIG. 37, there are 6 2-sorters and 5 3-sorters. So the total equivalent 2-sorter resources in this network is 6+(5*1.8)= 6+9=15. Even though the non-standard 3-column UCMS sorting network has a speedup of 1.5 versus the state-of-the-art O-EMS network, the O-EMS network uses 19/15=1.27 times the resources of the faster, non-standard Ncols=3 sorting network.

Standard UCMS sorting networks have been designed using automated network generation software for a number of sorting networks. Examples of UCMS SV source code are provided.

FIG. 38 shows top level SV code for the UCMS 4-column example with 8-bit unsigned values. This code effectively creates the "UCMS Sorting Network Top Level" block shown in FIG. 33. The SV module instantiates the 3 sequence modules, and passes signals from Sequence 0 to Sequence 1, and from Sequence 1 to Sequence 2. In addition, in the generate block, the 1-d input list is translated to the 2-d array needed by Sequence 0 module, and the final 2-d Sequence 2 output array is translated to the 1-d sorted output list.

FIG. 39 shows the simple Sequence 0 SV code for the UCMS 4-column example. Inside the generate block, the 16 Sequence 0 2-sorters are instantiated, one per column of the 2 row by 16 column Sequence 0 2-d data array.

FIG. 40 shows the Sequence 1 SV code for the UCMS 4-column example. A generate block is used to instantiate the series of 4 stage modules, which is performed once for each of the 4 Sequence 1 rectangles. Stage rectangle output data easily becomes the rectangle input data for the following stage. Two levels of "for" loops are used to split off the sequence input data into groups of 4 columns, which become the rectangle input data for the first row sort stage. These for loops also transfer the sorted rectangle output data from the last stage into a 1-d output list, which becomes 1 column in the sequence output 2-d array. The Sequence 2 SV code shown in FIG. 41 creates Sequence 2 hardware in the same manner that the code in FIG. 40 did that for Sequence 1.

FIG. 42 contains the SV code for the initial Sequence 1 stage, the row sort stage. A generate block is used to instantiate one 4-sorter per rectangle row, in the same way that a generate block in the FIG. 39 code was used to instantiate one 2-sorter per column of the Sequence 0 2-d array.

The SV code for a diagonal stage tends to be more complex. Each diagonal sorter is instantiated separately, not in a generate block. It is possible that a generate block may be used for some diagonal stages, but that is not discussed here. Not all rectangle locations are connected to a sorter in a diagonal stage. Those locations that are not connected to a sorter are "passed through" the stage.

FIG. 43 shows one passthrough and one diagonal 4-sorter instantiation, from the Sequence 2 R/C 2/1 diagonal stage. The passthrough location is at the upper left of the rectangle, and is shaded in the Stage 2 rectangle in FIG. 29. The diagonal locations from the 4-sorter in FIG. 43 are also shaded in the Stage 2 rectangle in FIG. 29.

The algorithm used to create SV source code for any diagonal stage module is shown in FIG. 44. Given the rectangle size, and the diagonal R/C value, the algorithm produces instantiations for all diagonal sorters, all pass-throughs, and, when appropriate, all IntRows sorters.

The UCMS sorting network system, as discussed above, is a unified and methodical system, utilizing single-stage hardware N-sorters instantiated in multiway merge sort networks. It is assumed that this system can be modified for improved performance in certain ways.

For example, it has been shown just above that a sorting network with Nfinal=8 was designed to be quicker and use fewer resources when using a non-standard Ncols=3 multi-way merge, versus the prior art Ncols=2 O-EMS 2-way merge. An Ncols=2 sorting network, with $N_{final}$>8, could use the Ncols=3 non-standard network to sort the first groups of 8 values, before continuing on with a standard Ncols=2 2-way merge algorithm.

A single-stage hardware 8-sorter could also be used to sort the first groups of 8 values. The hardware 8-sorter is even faster than the non-standard Ncols=3 network, when using 6-input LUT slice logic blocks, but uses a large number of LUT resources to obtain this speed.

Similar UCMS network modifications can presumably be made to improve performance in some way. If the modifications use principles discussed above, such as use of non-standard UCMS networks, or the use of single-stage hardware sorters in place of portions of a sorting network, such modifications will be in keeping with the various embodiments that have been disclosed here.

The information and equations that have been presented so far in this set of embodiments are enough to allow a designer to implement any standard UCMS network that satisfies Equation (1). Such a network takes an unsorted list of Nfinal values, and then produces a correctly sorted full list of those same Nfinal values. It has also been shown how a non-standard UCMS network is created easily from a standard network. In the particular example that was discussed, the non-standard 3-way network was shown to outperform a comparable state-of-the-art O-EMS network, for both speed and resource usage, when both are implemented using the 6-input LUTs commonly found in modern FPGAs.

As previously discussed, in a rank order filter, only certain output locations are produced from an unsorted list of input values. Often, the rank order filter only produces one value, e.g., the max, min, or median of the unsorted input list. However, UCMS sorting networks are used effectively to produce several types of rank order filters.

One prior art use of multiway sorting networks to produce rank order filters were the efforts by several researchers to extract the median of 3×3 images. A diagram showing the UCMS 3×3 median filter is shown in FIG. 45. The algorithm used for the UCMS 3×3 median filter is essentially the same prior art algorithm used by these researchers. However, in order to implement a 3-sorter or filter operation with 3 inputs, those researchers either used a 3-stage network of hardware 2-sorters or incompletely defined hardware 3-sorters to implement their sorting network. UCMS uses the single-stage hardware 3-sorters and filters discussed in earlier embodiments.

Note that the sorting network in FIG. 45 uses several different hardware sorters and filters. In Stage 0, the column sort stage, single-stage hardware 3-sorters are used. In Stage 1 of Sequence 1, 3 different single-stage hardware rank order filters are used. A 3-min hardware filter is used in Row 2, the row of max column values. A 3-median hardware filter is used in Row 1, the row of median column values, and a 3-max hardware filter is used in Row 0, the row of min column values. In the final stage, Stage 2 of Sequence 1, one single-stage 3-median filter is used.

The unsorted input list for the 3×3 median example is shown at the top of FIG. 45. This is the same input list for the full 3×3 sorting network example shown in FIG. 30. Note that the full Nfinal=9 sort requires 4 stages, but finding the median of those the 9 unsorted values only requires 3 stages. Since these 3 stages only use 2-sorters and 3-sorters, each of the 3 stages only uses the minimum stage time, a stage with only 2-sorters, when implemented using a 4-LUT logic block.

Although this 3-stage sorting network determines the median of the 3×3 values quickly, an even quicker solution is available, a 9-median single-stage hardware filter. When using a slice logic block with 4 6-input LUTs, the input signals for this filter propagate through 4 logic blocks, which is the equivalent of 2 2-sorter stages in series. A full hardware 9-sorter uses a large number of resources. However, a hardware 9-median filter eliminates all logic and output muxes, except those required for the median value. The reduced hardware usage of the 9-median hardware filter, along with its reduced propagation delay, may make it the best choice for calculating a 3×3 median value.

FIG. 46 shows a UCMS sorting network median filter for a 5×5 set of unsorted input values. The algorithm shown in this figure, which uses single-stage hardware sorters and filters, has not been shown in prior art. Sequence 0 in the FIG. 46 example uses 5 5-sorters. The row sort stage, Stage 1 in Sequence 1, uses 5 different rank order filters, each of which outputs at least 2 values in its sorted list. From the top row down to the bottom row, the rank order filters used are Min-2-of-5, Min-3-of-5, Mid-3-of-5, Max-3-of-5, and Max-2-of-5. Stage 2 in Sequence 1, the R/C 1/1 stage, uses 3 different rank order filters, Min-of-4, Median-of-5, and Max-of-4. The final stage in Sequence 1, the R/C 1/2 Stage 3, uses a single Median-of-3 rank order filter.

A full UCMS sorting network for the 5×5 set of input values is not shown, but it would require 2 more stages, a R/C 1/3 Stage 4 and a R/C 1/4 Stage 5. In addition to using fewer resources than a full sort of the 5×5 values, the UCMS median rank order sorting network for the 5×5 values uses 2 fewer stages.

Although the examples discussed above target a 3×3 or 5×5 square of values, the median stage reduction is a more general phenomenon. When Ncols is odd and Nrowsfinal is odd, determining the median of Nfinal values will require fewer stages than a full sort of those Nfinal values. When Ncols=3, the median stage reduction is 1, the reduction is 2 when Ncols=5, it is 3 when Ncols=7, and so on.

As discussed above, using a prior art O-EMS methodology, the max or min (or both) of an unsorted list of $2^p$ values is determined in p 2-sorter stages. Using the methodologies of multiway sorting networks, this relationship can be generalized. With Ncols≥3, the max of an unsorted list of $Ncos^p$ values is determined in p stages, each of which contains Ncols-max rank order filters.

The methodology for finding the min of an unsorted list uses the same number of resources, and has the same propagation delay, as finding the list max. If both the min and max are produced, the number of required resources increases, but the propagation delay does not change. Because of this, only finding the max of an unsorted list will be discussed here.

In the same amount of time used by prior art max networks using 2-max filters, UCMS max filter networks, using single-stage hardware N-max filters with N>3, are able to find the max of much larger lists. For example, as shown in FIG. 47, the max of 25 values is determined in 2 stages, using 5-max hardware filters. In effectively the same amount of time, prior art O-EMS methodology using 2-max filters will only determine the max of 4 unsorted input values.

Furthermore, it will take a prior art O-EMS sorting network using 2-max filters 3 stages to find the max of 8 values. Using UCMS 5-max filters, the max of 125 values is determined in 3 stages, and these 3 stages take approximately the same amount of time as the 3 prior art O-EMS stages.

The UCMS sorting network system is a unified and methodical system, utilizing single-stage hardware N-sorters instantiated in multiway merge sort networks. The UCMS sorting network system satisfies Equation (1) above and can be modified for improved performance. In a rank order filter, only certain output locations are produced from an unsorted list of input values. Often, the rank order filter only produces one value, e.g., the max, min, or median of the unsorted input list. However, UCMS sorting networks are used effectively to produce several types of rank order filters.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and

The invention claimed is:

1. A method for constructing a hardware multiway merge sorting network to merge 3 or more sorted input lists of values into a single sorted output list, using a sequence "q" of merge sorting stages, the method comprising steps of:
   combining Ncols sorted input lists, with Ncols>=3, each with a list length Nrowsq, into a rectangular structure, by setting each input list as a column in the rectangular structure, which then has a Ncols number of columns and a Nrowsq number of rows,
   defining several stages of sorting operations performed on the rectangular structure, so that the values in the rectangle are fully sorted after the merge sequence last stage,
   wherein each stage has both input and output signal connections defined in Ncols x Nrowsq 2-d arrays,
   wherein in each stage, the stage sorting operations are performed by single-stage hardware N-sorters, with Ncols>=N>=2, in which the outputs of each N-sorter are connected to the stage output 2-d array using the same 2-d coordinates which connect the stage input signal array to the N-sorter inputs, and
   stage input array signals which are not connected to an N-sorter input are passed through directly to the stage output 2-d array location matching the input 2-d array location.

2. The method according to claim 1, further comprising the step of:
   numbering the columns from Ncols-1 at the leftmost of the columns to 0 at the rightmost of the columns and the rows from Nrowsq-1 at the topmost of the rows to 0 for the bottommost row.

3. The method according to claim 2, whereby the final sorted order of the rectangular structure is a row major order, with the overall maximum value at the top left row Nrowsq-1 column Ncols-1 location, and
   the overall minimum value at the bottom right row 0 column 0 location, with each row order defined from the maximum at column Ncols-1 down to the minimum at column 0 and
   in the first stage of the merge sequence, the row sorting stage, each row is sorted by a single-stage hardware Nrowsq-sorter, with the sorter output values placed in sorted order from the maximum value at column Ncols-1 to the minimum value at column 0.

4. The method according to claim 3, further comprising diagonal stages, wherein the input and matching output array locations, which are connected to a stage single-stage hardware N-sorter, are selected along a diagonal in the 2-d array, and
   in which each diagonal group in a particular stage has the same row delta R and column delta C between successive array locations, with the base the diagonal selected at the lowest row and maximum column in the diagonal, and
   each successive array location in a diagonal being R rows up, with a higher row number, and C columns to the right, with a lower column number, than the previous diagonal location, until the tip of the diagonal is reached, at the last diagonal location still within the rectangle 2-d array, with the base of the first defined stage diagonal located at column C row 0, and
   subsequent diagonals with a base on row 0 being defined with incrementing column numbers until and including column Nclos-1, and
   diagonal bases on successive rows, if the base location is not already in a diagonal which was started at a lower row, start with a base at column C increment by 1 column along the row, and end with a base at column Ncols-1, and with the final, highest row containing diagonal bases being row Nrowsq-1-R.

5. The method according to claim 4, further comprising the step of placing in sorted order the diagonal sorted values produced by each single-stage hardware N-sorter, into the stage output array locations which match the stage input array locations for the N-sorter, with the minimum diagonal sorted value placed at the lower left max column and min row, diagonal location, and with the maximum sorted value placed at the upper right, min column and max row, diagonal location.

6. The method according to claim 5, further comprising the step of passing stage input signals at input array passthrough locations, through to the matching stage output array locations, where a passthrough location in the stage input 2-d array is defined as a location which has no connection to a single-stage hardware N-sorter in that stage.

7. The method according to claim 6, further comprising the step of
   constructing the last Ncols-1 stages in a merge sequence, all of said Ncols-1 stages being diagonal stages, in which each diagonal group is sorted by a single-stage hardware N-sorter, by constructing the first of the Ncols-1 stages as a R/C 1/1 stage, and then constructing each subsequent stage as having diagonal groups with a row delta R of 1 and column delta C incremented by 1 relative to column delta of the preceding stage, and
   the final merge sequence stage having a row delta of 1 and a column delta of Ncols-1, wherein the final sequence stage when Ncols is even, Ncols>2,and Nrowsq>2, said final sequence stage further comprising the step of performing IntRows sorts on the internal values of internal rows, wherein the internal rows are rows Nrowsq-2 to row 1, and the internal columns are column Ncols-2 to column 1, and
   the IntRows sorted row order being nonincreasing from the maximum at column Ncols-2 to the minimum at column 1, wherein the IntRows sorting operations are performed by single-stage hardware (Ncols-2) sorters.

8. The method according to claim 7, further comprising the step of defining extra merge sequence diagonal stages when Nrowsq>Ncols, the extra diagonal stages placed after the row sort stage and prior to the R/C 1/1 stage, the number of extra stages defined by the equation:

$$\text{Num\_Extra\_Stagesq} = \text{CEILING}(\log_2(\text{Nrowsq}/\text{Ncols}))$$

and the first extra stage after the initial merge sequence row sort stage is a diagonal stage with a column delta of 1 and row delta of:

$$\text{Stage-2-Row\_Deltaq} = 2^{\wedge}\text{Num\_Extra-Stagesq}$$

and any subsequent extra stages have a row delta 1/2 that of the preceding stage, still with a column delta of 1, and the final extra stage, the stage before the R/C 1/1 stage, has a column delta of 1 and row delta of 2, R/C=2/1, wherein all diagonal sort groans in the extra diagonal stages are sorted using single-stage hardware N-sorters.

9. The method according to claim 8, further comprising the steps of:

using a sequence "q" rectangle including unused locations, said unused locations found in the top row, row Nrowsq-1, starting column Ncols-1, and decrementing in column number as needed, and/or, said unused locations found in the bottom row, row 0, starting at column 0, and incrementing in column number as needed, such that the used locations in the rectangle still exhibit the continuous row major order, resulting in smaller sorted input list columns, and up to 2 smaller row N-sorters in the initial merge sequence row sort stage, and smaller diagonal N-sorters in one or more merge sequence diagonal stages.

10. The method according to claim 3, further comprising the step of:

utilizing a rectangle in which the rectangle max value and/or min value are the only outputs of a one-stage merger sequence, and if the max, rectangle value is an output, the top Nrowsq-1 row is constructed using the max values of the input sorted lists, and the max value is then determine using a single-stage Ncols-max filter which processes the Nrowsq-1 row values, and if the min rectangle value is an output, the bottom row 0 is constructed using the min values of the input sorted lists, and the min value is then determine using a single-stage Ncols-min filter which process the row 0 values, and no other rows in rectangle are constructed and processed, and no other stages after initial row sort stage are implemented.

11. The method according to claim 8, wherein Ncols and Nrowsq are both odd, and the rectangle output is the median value at the row (Nrowsq-1)/2, column (Ncols-1)/2 location, and in each stage starting with the row sort stage, stage outputs that cannot produce a median are eliminated from the output rectangle, which produces modified and possibly fewer hardware N-sorters in the stage, and the median value is determined after the diagonal stage with a row delta of 1 and a column delta of (Ncols-1)/2, whereby there is a merge sequence stage reduction of (Ncols-1)/2 stages when determining the median value, relative to fully sorting the same rectangle.

12. The method according to claim 8, further comprising the step of:

sorting an unsorted input list with N_final values, using one or more merge sequences in which Ncols sorted input lists are merged into a single sorted output list, said sorting network satisfying the equation:

$$N\_final = Nrows\_0 * Ncols^{\wedge}q\_final$$

where Nrows 0 is an integer with Ncols>=Nrows_0>=2, and q_final is an integer>=1, whereby in the first operation stage (sequence "0"), the N_final unsorted values are placed into a 2-D array with Nrows_0 rows and (N_final/Nrows_0) columns, and each column is sorted with a single-stage hardware N_rows_0 -sorter, with the column sorted order ranging from the minimum at row 0 to the maximum at row Nrows_0-1, and the 2-D array containing sorted columns is sent out to the next sequence, which is a merge sort sequence, and a loop is entered, wherein in each sequence "q", with q>=1, the sorted columns of the 2-D array coming from a sequence "q-1" are broken up into groups of Ncols columns, with each group of Ncols columns then defining a sequence "q" rectangle, after which all sequence "q" rectangles are merge sorted in parallel, and after each sequence "q" rectangle is sorted, its sorted values are transferred to a 1-D sorted list, and if there are multiple rectangles in the sequence "q", the 1-D sorted list from each rectangle becomes a column in the 2-D array of output values sent onto the next sequence, and the process returns to the start of the loop to process the next sequence "q", or else if there is only 1 rectangle in sequence "q" (sequence "q_final"), the N_final values in this last rectangle are in sorted order, and they are transferred to the final 1-D sorted list of N_final values, thereby completing the sorting process.

13. The method according to claim 12, wherein the output list consists of only the max and/or min of the input list, and therefore the sequence "0" output array contains only a max and/or min sequence "0" rows, and a merge sequence "q" output array contains only the max and/or min sequence "q" output rows, and as the max and/or min values are determined in the first merge sequence "q" row sort stage, the number of overall stages required to determine the max and/or min value of $Ncols^{\wedge}p$ input values=p.

* * * * *